United States Patent
Kim

(10) Patent No.: US 12,493,378 B2
(45) Date of Patent: Dec. 9, 2025

(54) TOUCH INPUT DEVICE

(71) Applicant: HiDeep Inc., Seongnam-si (KR)

(72) Inventor: Bonkee Kim, Seongnam-si (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 17/921,700

(22) PCT Filed: Mar. 29, 2021

(86) PCT No.: PCT/KR2021/003827
§ 371 (c)(1),
(2) Date: Oct. 27, 2022

(87) PCT Pub. No.: WO2021/221320
PCT Pub. Date: Nov. 4, 2021

(65) Prior Publication Data
US 2023/0168771 A1     Jun. 1, 2023

(30) Foreign Application Priority Data
Apr. 28, 2020    (KR) ........................ 10-2020-0051501

(51) Int. Cl.
*G06F 3/041*     (2006.01)
*G06F 1/16*     (2006.01)
*G06F 3/044*     (2006.01)

(52) U.S. Cl.
CPC .......... *G06F 3/0418* (2013.01); *G06F 1/1641* (2013.01); *G06F 1/1643* (2013.01);
(Continued)

(58) Field of Classification Search
CPC ............... G06F 3/0418; G06F 3/04182; G06F 3/04186; G06F 3/0445; G06F 1/1677;
(Continued)

(56) References Cited

U.S. PATENT DOCUMENTS

2011/0216033 A1*   9/2011   Mamba ................. G06F 3/0446
                                                                 345/174
2019/0179451 A1*   6/2019   Kim ....................... G06F 3/044
(Continued)

FOREIGN PATENT DOCUMENTS

| CN | 103353816 A | 10/2013 |
| CN | 108508967 A | 9/2018 |

(Continued)

OTHER PUBLICATIONS

Office Action issued for the concurrent Chinese Application No. 202180032879.6; issued on Aug. 29, 2025.

*Primary Examiner* — Dennis P Joseph
(74) *Attorney, Agent, or Firm* — The Belles Group, P.C.

(57) ABSTRACT

A touch input device according to an embodiment comprises: a touch sensor including a plurality of driving electrodes, a plurality of receiving electrodes forming mutual capacitance with the plurality of driving electrodes, and a plurality of receiving dummy electrodes not forming mutual capacitance with the plurality of driving electrodes; and a touch detector including a plurality of receivers composed of a plurality of first terminals for receiving a plurality of first sensing signals, and a plurality of second terminals for receiving a plurality of second sensing signals. The touch detector detects a touch input of an object by subtracting at least one second sensing signal output through at least one second terminal from at least one first sensing signal output through at least one first terminal of at least one receiver.

5 Claims, 73 Drawing Sheets

(52) U.S. Cl.
CPC ........ *G06F 3/04166* (2019.05); *G06F 3/0445* (2019.05); *G06F 3/0446* (2019.05); *G06F 3/0412* (2013.01); *G06F 3/0443* (2019.05); *G06F 2203/04102* (2013.01); *G06F 2203/04104* (2013.01)

(58) Field of Classification Search
CPC .... G06F 3/04166; G06F 3/044; G06F 1/1641; G06F 3/0446; G06F 2203/04104; G06F 3/0412

See application file for complete search history.

(56) References Cited

U.S. PATENT DOCUMENTS

| | | | | |
|---|---|---|---|---|
| 2021/0004120 | A1* | 1/2021 | Kim | G06F 3/04182 |
| 2021/0103360 | A1* | 4/2021 | Manca | G06F 3/0446 |
| 2022/0043481 | A1* | 2/2022 | Shin | G06F 1/1641 |

FOREIGN PATENT DOCUMENTS

| | | | |
|---|---|---|---|
| CN | 108803921 | A | 11/2018 |
| KR | 20130109691 | A | 10/2013 |
| KR | 20170057090 | A | 5/2017 |
| KR | 20180097356 | A | 8/2018 |
| KR | 20180122761 | A1 | 11/2018 |
| KR | 20190067621 | A | 6/2019 |

\* cited by examiner

Unrecognized  Split

FIG. 38b

| -1 | -1 | -5 | -14 | -6 | -13 | -15 | -9 | 0 | -2 |
|---|---|---|---|---|---|---|---|---|---|
| -4 | -1 | -8 | -11 | -14 | -11 | 1 | -10 | -2 | -2 |
| -6 | -3 | 93 | 168 | 205 | 178 | 180 | 139 | -1 | -2 |
| -4 | 21 | 193 | 170 | 192 | 153 | 170 | 165 | 6 | -1 |
| 0 | 8 | 180 | 179 | 195 | 162 | 160 | 65 | -4 | 0 |
| -1 | -4 | 72 | 183 | 200 | 130 | 10 | -20 | -3 | -1 |
| -1 | -1 | -10 | -5 | 10 | -19 | -18 | -14 | -2 | -3 |
| -2 | -2 | -3 | -6 | -3 | -3 | -4 | -4 | -2 | -1 |
| 1 | 0 | -1 | -3 | -2 | -2 | -1 | -2 | 0 | 1 |
| -1 | 1 | -1 | -2 | -1 | -3 | -3 | -2 | 1 | -1 |
| -2 | -1 | -1 | -3 | -1 | -1 | -1 | -1 | 0 | 1 |
| -1 | 0 | -2 | -4 | -1 | -2 | -1 | -2 | 0 | -1 |
| -1 | -1 | -3 | -5 | -4 | -6 | -7 | -4 | 1 | 1 |
| -1 | -5 | 6 | 35 | 87 | 107 | 87 | -25 | -5 | -2 |
| -1 | -31 | 145 | 171 | 201 | 178 | 196 | 107 | -12 | -3 |
| -1 | -1 | 141 | 154 | 190 | 169 | 190 | 140 | -7 | -3 |
| 0 | -4 | 24 | 142 | 189 | 176 | 197 | 122 | -2 | -4 |
| 0 | -3 | -14 | -16 | 43 | 81 | 78 | 6 | -1 | -1 |
| 1 | 1 | -7 | -13 | -2 | -18 | -17 | -9 | 0 | 1 |
| 3 | 1 | -2 | -8 | -6 | -15 | -11 | -3 | 0 | 0 |
| 1 | 1 | -5 | -13 | -5 | -17 | -13 | -5 | 2 | -1 |

FIG. 49a

| RX | TX | RX | TX | RX | TX | RX | TX | RX | TX | RX | TX | RX | TX |
|---|---|---|---|---|---|---|---|---|---|---|---|---|---|
|  | 1 |  | 4 |  | 7 |  | 10 |  | 1 |  | 4 |  | 7 |
| 1 | 2 | 1 | 5 | 1 | 8 | 1 | 11 | 5 | 2 | 5 | 5 | 5 | 8 |
|  | 3 |  | 6 |  | 9 |  | 12 |  | 3 |  | 6 |  | 9 |

TOUCH INPUT DEVICE

CROSS-REFERENCE TO RELATED PATENT APPLICATIONS

The present application is a U.S. national stage application under 35 U.S.C. § 371 of PCT Application No. PCT/KR2021/003827, filed Mar. 29, 2021, which claims priority to Korean Patent Application No. 10-2020-0051501, filed Apr. 28, 2020. The disclosures of the aforementioned priority applications are incorporated herein by reference in their entireties.

TECHNICAL FIELD

The present invention relates to a touch input device, and more particularly, to a touch input device including a touch sensor to accurately detect whether or not a touch by an object input to a touch surface is performed and/or a touch location even when the touch input device is placed in a state affected by low ground mass (LGM).

BACKGROUND TECHNOLOGY

Various types of input devices are used to operate a computing system. For example, input devices such as buttons, keys, joysticks, and touch screens are being used. Due to easy and convenient operations of the touch screens, the use of the touch screens is increasing when operating a computing system.

A touch screen may constitute a touch surface of a touch input device including a touch sensor panel, which may be a transparent panel with a touch-sensitive surface. Such a touch sensor panel may be attached to the front side of a display screen such that the touch-sensitive surface covers a visible side of the display screen. It allows a user to operate a computing system by simply touching the touch screen with a finger or the like. In general, computing systems can recognize touches and touch locations on a touch screen and interpret those touches to perform calculations accordingly.

Meanwhile, a conventional touch screen uses a method of subtracting the sensing signal sensed by a plurality of receiving electrodes by using a differential circuit. There was a problem in that when signals from two channels are simultaneously input, the signals are canceled and disappear, resulting in a detection error.

In addition, in a conventional method, in order to reduce noise, the frequency of a driving signal for driving a display and the frequency of a driving signal for driving a touch screen are synchronized and used in some cases. However, since the precision of touch detection is lowered when noise is present in the corresponding frequency band, although it is necessary to change the frequency of the driving signal, since the synchronization of a signal frequency is broken, a frequency change becomes impossible, so there is a problem in that it is difficult to improve the precision.

In order to improve the precision of touch sensing, research and development for technical means is required to solve the problems of the difficulty of changing a frequency according to a differential driving method using a synchronization signal and the error of two sensing signals for touch sensing being offset.

Also, when a touch input device on which a touch sensor is mounted is touched, there is a case where the touch sensor is affected by low ground mass (LGM) due to floating. For example, there is a case in which a signal to be normally sensed disappears, or a signal to be sensed is split, resulting in the signal appears as a touch at two or more points.

In particular, it can be seen that the above phenomenon is more severe when a foldable device is touched in an out-folded state.

DETAILED DESCRIPTION OF THE INVENTION

Technical Problem

The present invention has been derived to solve the above-described problems, and provides a touch sensor capable of detecting a touch signal in the same or similar manner as in a state in which a touch input device is not affected by LGM, and a touch input device including the same.

In particular, an object of the present invention is to provide a touch input device that enables a frequency hopping when external noise is applied by using a signal that is not synchronized with a display driving signal as a touch driving signal without canceling sensing signals related to touch sensing.

In addition, a touch sensor capable of recognizing two or more multi-touches with high sensitivity even when a touch input device is affected by LGM, and a touch input device including the same are provided.

Another object of the present invention is to enable a touch input device to acquire touch input information from which a LGM interference signal is removed even when floating occurs by gripping the touch input device in an out-folded state.

Technical Solution

A touch input device according to an embodiment comprises: a touch sensor including a plurality of driving electrodes, a plurality of receiving electrodes forming mutual capacitance with the plurality of driving electrodes, and a plurality of receiving dummy electrodes not forming mutual capacitance with the plurality of driving electrodes; and a touch detector including a plurality of receivers composed of a plurality of first terminals for receiving a plurality of first sensing signals, and a plurality of second terminals for receiving a plurality of second sensing signals, wherein the touch detector detects a touch input of an object by subtracting at least one second sensing signal output through at least one second terminal from at least one first sensing signal output through at least one first terminal of at least one receiver, wherein the at least one first sensing signal is formed between the at least one driving electrode and the at least one receiving electrode, and wherein the at least one second sensing signal is formed between the at least one driving electrode and the at least one receiving dummy electrode.

The touch input device may further comprise: a display module composed of a first display area and a second display area, wherein the touch sensor is formed in the display module, wherein the touch sensor receives a plurality of touch inputs of the object to at least one of the first display area and the second display area, and wherein the touch detector detects at least one of the plurality of touch inputs.

The touch input device may further comprise: a first body supporting the first display area; a second body supporting the second display area; and a hinge connecting the first body and the second body such that an angle between the first body and the second body is variable.

The touch detector may detect at least one of the plurality of touch inputs when the touch input device is in an out-folded state.

The plurality of touch inputs may include one first touch input to the first display area and a plurality of second touch inputs to the second display area, and the touch detector may detect the one first touch input.

The plurality of touch inputs may be a plurality of first touch inputs to the first display area or a plurality of second touch inputs to the second display area, and the touch detector may detect the plurality of first touch inputs or the plurality of second touch inputs.

Each of the plurality of receiving dummy electrodes may be disposed inside each of the plurality of receiving electrodes.

A center of each of the plurality of receiving dummy electrodes may coincide with a center of each of the plurality of receiving electrodes.

A sum of areas of the plurality of receiving dummy electrodes may be equal to a sum of areas of the plurality of receiving electrodes.

The plurality of receiving dummy electrodes may be formed by removing a portion inside the plurality of receiving electrodes.

The plurality of receiving electrodes may be disposed between the plurality of driving electrodes and the plurality of receiving dummy electrodes, and the plurality of receiving electrodes may be set to ground.

The plurality of receiving electrodes and the plurality of receiving dummy electrodes may be disposed on a different layer from the plurality of driving electrodes, and a first region in which the plurality of driving electrodes overlap the plurality of receiving electrodes may be wider than a second region in which the plurality of driving electrodes overlap the plurality of receiving dummy electrodes.

A width of the first region may be greater than a width of the second region.

The touch input device may further comprise: a display panel, wherein the at least one first sensing signal may include information on capacitance reducing the mutual capacitance generated by at least one of a coupling between the object and the at least one driving electrode and a coupling between the object and the at least one receiving electrode, and wherein the at least one second sensing signal may include information on capacitance reducing the mutual capacitance generated by at least one of a coupling between the object and the at least one driving electrode and a coupling between the object and the at least one receiving dummy electrode.

The touch detector may include a driver that applies a touch driving signal asynchronous to a display driving signal applied for driving the display panel to the plurality of driving electrodes, wherein the driver applies a touch driving signal having a first frequency to the plurality of driving electrodes, and applies a touch driving signal having a second frequency hopping to a frequency different from the first frequency to the plurality of driving electrodes.

The at least one receiving electrode may be disposed adjacent to the at least one driving electrode, the at least one receiving dummy electrode may be disposed to be spaced apart from the at least one driving electrode by a predetermined distance, and the at least one receiving dummy electrode may be connected to a channel different from that of the at least one receiving electrode.

A touch input device according to an embodiment comprises: a touch sensor including a plurality of receiving electrodes, a plurality of driving electrodes forming mutual capacitance with the plurality of receiving electrodes, and a plurality of driving dummy electrodes not forming mutual capacitance with the plurality of receiving electrodes; and a touch detector including a plurality of receivers composed of a plurality of first terminals for receiving a plurality of first sensing signals, and a plurality of second terminals for receiving a plurality of second sensing signals, wherein the touch detector detects a touch input of an object by subtracting at least one second sensing signal output through at least one second terminal from at least one first sensing signal output through at least one first terminal of at least one receiver, wherein the at least one first sensing signal is formed between at least one receiving electrode and at least one driving electrode, and wherein the at least one second sensing signal is formed between the at least one receiving electrode and at least one driving dummy electrode.

The touch input device may further comprise: a display module composed of a first display area and a second display area, wherein the touch sensor is formed in the display module, wherein the touch sensor receives a plurality of touch inputs of the object to at least one of the first display area and the second display area, and wherein the touch detector detects at least one of the plurality of touch inputs.

The touch input device may further comprise: a first body supporting the first display area; a second body supporting the second display area; and a hinge connecting the first body and the second body such that an angle between the first body and the second body is variable, wherein the touch detector detects at least one of the plurality of touch inputs when the touch input device is in an out-folded state, wherein the plurality of touch inputs include one first touch input to the first display area and a plurality of second touch inputs to the second display area, and wherein the touch detector detects the one first touch input.

The plurality of touch inputs may be a plurality of first touch inputs to the first display area or a plurality of second touch inputs to the second display area, and the touch detector may detect the plurality of first touch inputs or the plurality of second touch inputs.

The at least one first sensing signal may include information on capacitance reducing the mutual capacitance generated by at least one of a coupling between the object and the at least one driving electrode and a coupling between the object and the at least one receiving electrode, and the at least one second sensing signal may include information on capacitance reducing the mutual capacitance generated by at least one of a coupling between the object and the at least one driving dummy electrode and a coupling between the object and the at least one receiving electrode.

Effects of the Invention

According to the present invention, even in a state in which a touch input device is affected by LGM, a touch signal may be detected in the same or similar manner as in a state in which the touch input device is not affected by LGM.

Also, even in a state in which a touch input device is affected by LGM, two or more multi-touches may be recognized with high sensitivity.

Also, even when floating occurs by gripping a touch input device in an out-folded state, touch input information from which a LGM interference signal is removed may be acquired.

According to the present invention, since an asynchronous driving method is used, a frequency hopping is freely possible when external environmental noise or CMI noise is applied, thereby fundamentally solving the problem of a synchronous driving. Further, since a differential circuit using a dummy electrode is included, a problem caused by signal cancellation can also be fundamentally solved. Moreover, since it is possible to drive a touch sensor using a frequency different from that of an external wireless charger, when an interference occurs during wireless charging, the touch sensor may be driven by frequency hopping so as to have a frequency different from that of a touch driving signal.

BRIEF DESCRIPTION OF THE DRAWINGS

FIGS. 1 and 2 are output data for explaining a principle of generating an LGM interference signal in a touch input device.

FIG. 6 is a partially enlarged view of another example in which a touch sensor is formed as a single layer.

FIG. 7 is raw data output from a touch input device when an object is brought into contact with a touch surface of the touch input device having the touch sensor shown in FIG. 6.

FIG. 8 is a partially enlarged view of another example in which a touch sensor is formed as a single layer.

FIG. 9 is raw data when an object is brought into contact with a touch input device having the structure of the touch sensor shown in FIG. 8.

FIG. 15 is a view for explaining an electrode used as a dummy receiving electrode among a plurality of receiving electrodes of the touch sensor shown in FIG. 8.

Figure 20:
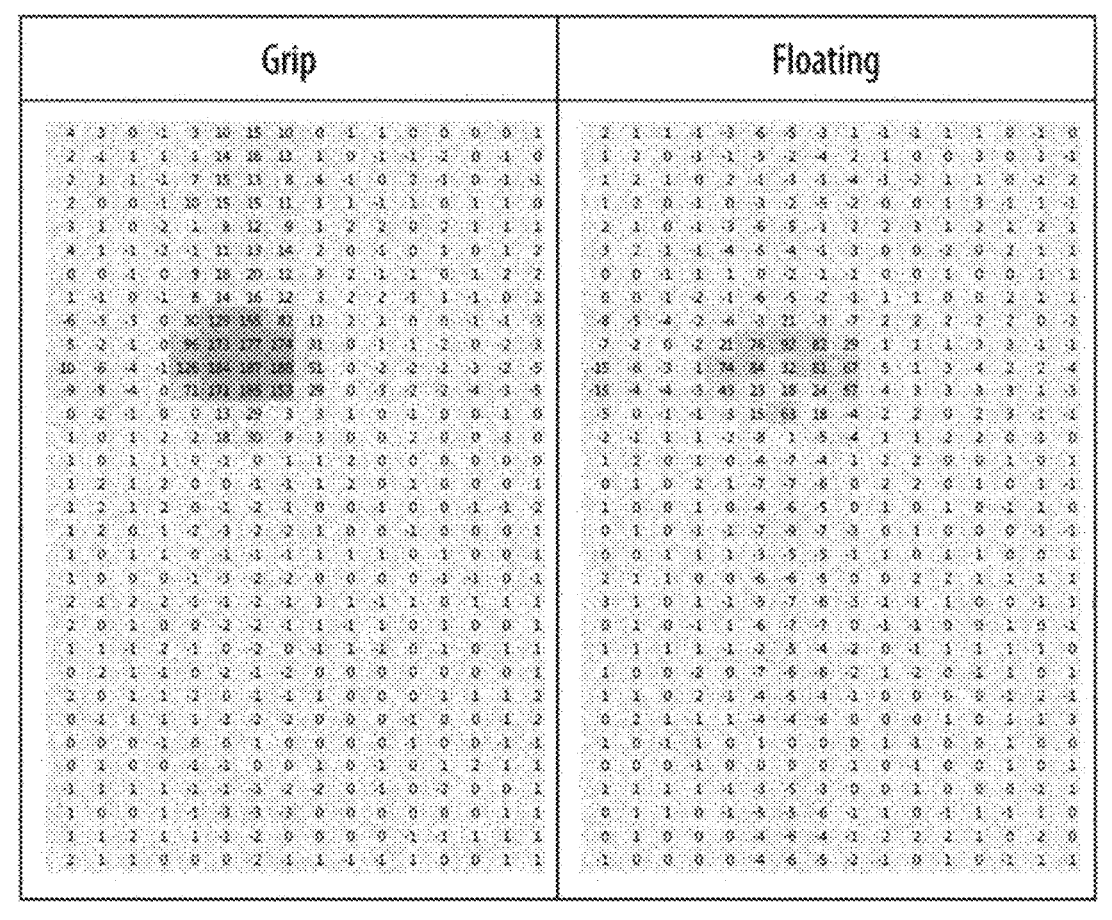

FIG. 20 is raw data output in each of a grip state and a floating state of the touch sensor shown in FIG. 6 when tested with a 15-pi conductive rod.

FIG. 23 is raw data output in each of a grip state and a floating state of the touch sensor shown in FIG. 8 when tested with a 20-pi conductive rod.

FIG. 24 is raw data output in each of a grip state and a floating state of the touch sensor shown in FIG. 6 when tested with a human thumb.

EMBODIMENTS OF THE INVENTION

Figure 3:
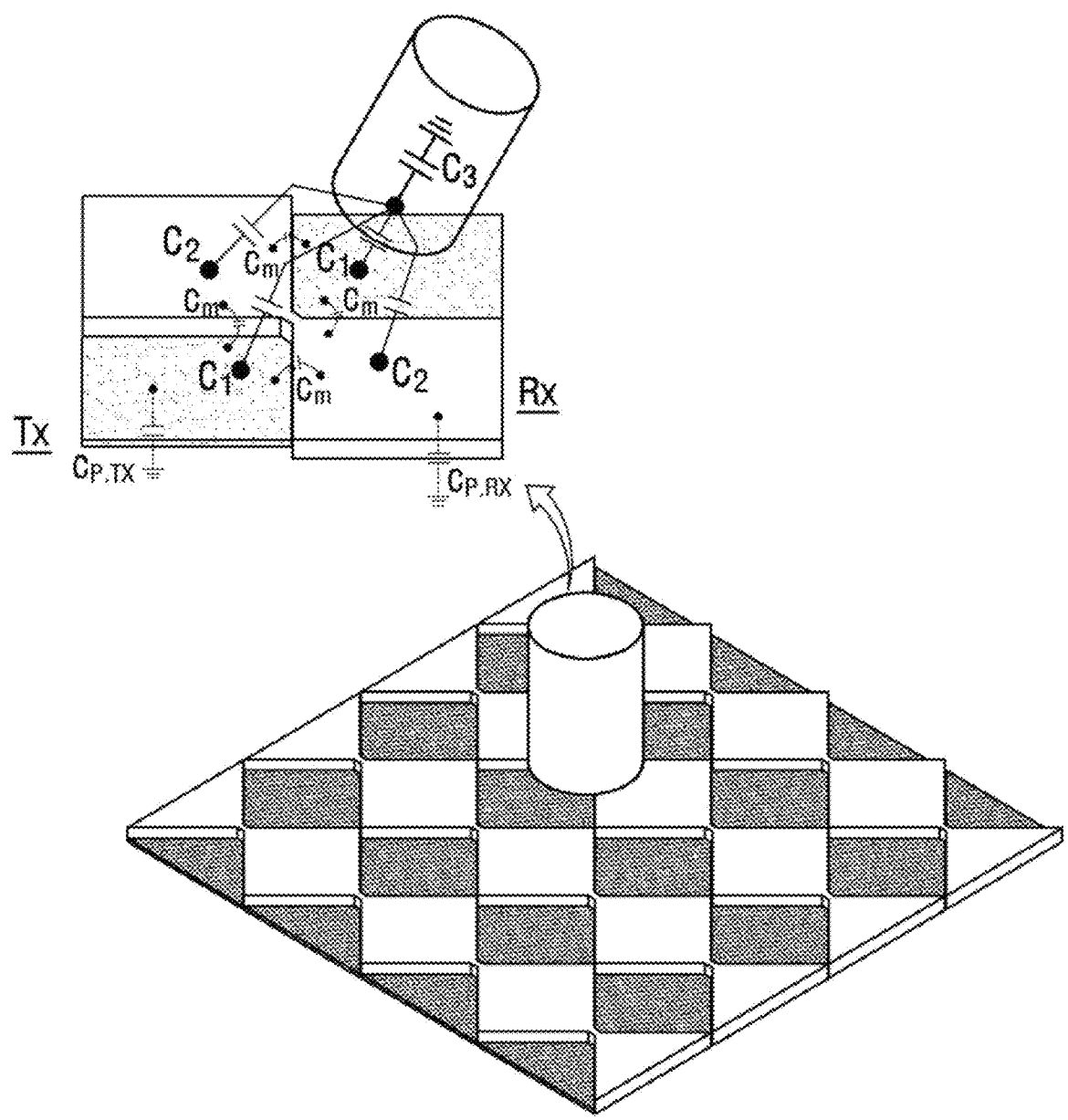
FIGS. 3 and 4 are diagrams for explaining a principle of generating an LGM interference signal in a floating state of a touch input device having a touch sensor implemented as two layers.

The detailed description of the present invention to be described later refers to accompanying drawings which show by way of illustration specific embodiments in which the present invention may be practiced. These embodiments are described in sufficient detail to enable those skilled in the art to practice the present invention. It should be understood that various embodiments of the present invention are different but need not be mutually exclusive. For example, certain shapes, structures, and characteristics described herein with respect to one embodiment may be embodied in other embodiments without departing from the spirit and scope of the present invention. In addition, it should be understood that the location or arrangement of individual components within each disclosed embodiment may be changed without departing from the spirit and scope of the present invention. Accordingly, the detailed description set forth below is not intended to be taken in a limiting sense, and the scope of the present invention, if properly described, is limited only by the appended claims, along with all scope of equivalents to what is claimed. Like reference numerals in the drawings refer to the same or similar functions throughout various aspects.

The First Embodiment

A touch input device according to the present invention includes a touch sensor. The touch sensor includes patterns having a predetermined shape, and the predetermined patterns may include a plurality of driving electrodes TX0 to TXn and a plurality of receiving electrodes RX0 to RXm. For the operation of the touch sensor, it may include a touch driver applying a driving signal to the plurality of driving electrodes TX0 to TXn, and a touch sensing unit that detects a touch and a touch location by receiving a sensing signal including information on the amount of capacitance change that is changed according to the touch on a touch surface from the plurality of receiving electrodes RX0 to RXm.

The plurality of driving electrodes TX0 to TXn and the plurality of receiving electrodes RX0 to RXm of the touch sensor may form an orthogonal array, but the present invention is not limited thereto, and the plurality of driving electrodes TX0 to TXn and the plurality of receiving electrodes RX0 to RXm may have any number of dimensions and their application arrangements, including diagonals, concentric circles, and three-dimensional random arrangements, etc. Here, n and m are positive integers, and may have the same or different values, and may have different sizes according to embodiments.

The plurality of driving electrodes TX0 to TXn and the plurality of receiving electrodes RX0 to RXm may be arranged to cross each other, respectively. The driving electrode TX may include a plurality of driving electrodes TX0 to TXn extending in a first axial direction, and the receiving electrode RX may include a plurality of receiving electrodes RX0 to RXm extending in a second axial direction intersecting the first axial direction.

The plurality of driving electrodes TX0 to TXn and the plurality of receiving electrodes RX0 to RXm may be formed on different double layers. For example, it may be a bar or diamond pattern. Here, the layer on which the plurality of driving electrodes TX0 to TXn is formed may be disposed on the layer on which the plurality of receiving electrodes RX0 to RXm are formed, or may be disposed in reverse. An insulating layer for preventing a short circuit between the plurality of driving electrodes and the plurality of receiving electrodes may be formed between the double layers.

A touch sensor including a plurality of driving electrodes TX0 to TXn and a plurality of receiving electrodes RX0 to RXm may be disposed between the cover layer and the display panel together with the OCA disposed above and below (add-on). In addition, the touch sensor may be directly disposed on the upper surface of the display panel (e.g., the upper surface of the encapsulation layer of the display panel) (on-cell). Meanwhile, the touch sensor including the plurality of driving electrodes TX0 to TXn and the plurality of receiving electrodes RX0 to RXm may be disposed inside the display panel (e.g., between the encapsulation layer of the display panel and the organic light emitting layer) (in-cell).

The display panel may be a rigid OLED panel or a flexible OLED panel. In the case of a rigid OLED panel, the encapsulation layer and the TFT layer may be formed of glass, and in the case of a flexible OLED panel, the encapsulation layer may be formed of a thin film, and the TFT layer may be formed of a PI film. Meanwhile, the display panel may be an OLED panel or an LCD panel.

The touch sensor may be a touch sensor attached to the cover window glass (add-on). Here, the touch sensor may be attached to the upper surface of the cover window glass in the form of a film. The touch sensor may be formed on the color filter glass of the display panel (on-cell). Here, the touch sensor may be formed on the upper surface of the color filter glass or may be formed on the lower surface of the color filter glass. The touch sensor may be formed in a TFT layer (in-cell). Here, the touch sensor may be formed on the upper surface of the TFT layer (TFT array), or may be formed on the lower surface of the TFT layer (TFT array). In addition, one of the driving electrodes and the receiving electrodes may be formed on the color filter glass of the display panel, and the other one may be formed on the TFT layer.

Again, the plurality of driving electrodes TX0 to TXn and the plurality of receiving electrodes RX0 to RXm may be formed of a transparent conductive material (e.g., Indium Tin Oxide (ITO) made of tin oxide (SnO2), indium oxide (In2O3), etc. or Antimony Tin Oxide (ATO)) and the like. However, this is only an example, and the driving electrodes TX and the receiving electrodes RX may be formed of another transparent conductive material or an opaque conductive material. For example, the driving electrodes TX and the receiving electrodes RX may include at least one of silver ink, copper, nano silver, and carbon nanotubes (CNT). In addition, the driving electrodes TX and the receiving electrodes RX may be implemented with a metal mesh.

The touch driver may apply a driving signal to the driving electrodes TX0 to TXn. The touch sensing unit may detect a touch and a touch location through the receiving electrodes RX0 to RXm by receiving a sensing signal including information on the amount of change in the mutual capacitance Cm generated between the driving electrodes TX0 to TXn to which the driving signal is applied and the receiving electrodes RX0 to RXm. The sensing signal includes a noise signal as well as a signal coupled by a mutual capacitance Cm generated between the driving electrodes TX to which the driving signal is applied and the receiving electrodes RX. The noise signal may include display noise information (e.g., Zebra noise), information on the amount of change according to the change of the image displayed on the display, and information on the LGM interference signal (e.g., the amount of change in negative capacitance) generated in the floating state.

The touch sensing unit may include each of the receiving electrodes RX0 to RXm and a receiver (not shown) connected through a switch. The switch is turned on in a time period for detecting a signal of the corresponding receiving electrode RX so that a sensing signal from the receiving electrodes RX can be detected by the receiver. The receiver may be configured to include an amplifier and a feedback capacitor coupled to a feedback path between the negative (−) input terminal of the amplifier and the output terminal of the amplifier. At this time, the positive (+) input terminal of the amplifier may be connected to the ground. In addition, the receiver may further include a reset switch connected in parallel with the feedback capacitor. The reset switch may reset the current to voltage conversion performed by the receiver. The negative input terminal of the amplifier may be connected to the corresponding receiving electrode RX to receive a current signal including information on the capacitance Cm, then integrate and convert it into a voltage. The touch sensing unit may further include an ADC (not shown: analog to digital converter) that converts data integrated through the receiver into digital data. Subsequently, the digital data may be input to a processor (not shown) and processed to obtain touch information on the touch sensor. The touch sensing unit may include an ADC and a processor in addition to the receiver.

On the other hand, a control unit for overall controlling the touch input device according to the present invention may be provided. The control unit controls the operation of the touch driving unit and the touch sensing unit. For example, the control unit may generate a driving control signal and transmit it to the touch driving unit so that the driving signal is applied to the driving electrodes TX set in advance at a predetermined time. In addition, the control unit may generate a sensing control signal and transmit it to the touch sensing unit so that the touch sensing unit receives a sensing signal from the preset receiving electrodes RX at a predetermined time and performs a preset function.

The touch driving unit and the touch sensing unit may constitute a touch detecting unit capable of detecting whether the touch sensor is touched and the touch position. In addition, the touch detecting unit may be implemented in a form that further includes a control unit. The touch detecting unit may be implemented by being integrated on a touch sensing integrated circuit (IC). The driving electrodes TX and the receiving electrodes RX included in the touch sensor may be connected to the touch driving unit and the touch sensing unit included in the touch sensing IC through, for example, a conductive trace and/or a conductive pattern printed on a circuit board. The touch sensing IC may be positioned on a circuit board on which a conductive pattern is printed, for example, a touch circuit board (hereinafter, referred to as a touch PCB). According to an embodiment, the touch sensing IC may be mounted on a main board for operating the touch input device.

As described above, a predetermined capacitance Cm is generated at each intersection of the driving electrodes TX and the receiving electrodes RX, and when an object such as a finger, an electronic pen, or a stylus, approaches or comes into contact with the touch sensor, the value of the capacitance Cm is changed. In this case, the capacitance may be a mutual capacitance Cm. Such electrical characteristics may be sensed by the touch sensing unit to detect whether the touch sensor is touched and/or a touch position. For example, it is possible to detect whether a touch is made and/or the location of a touch on the surface of the touch sensor made of a two-dimensional plane consisting of a first axis and a second axis.

Figure 1:
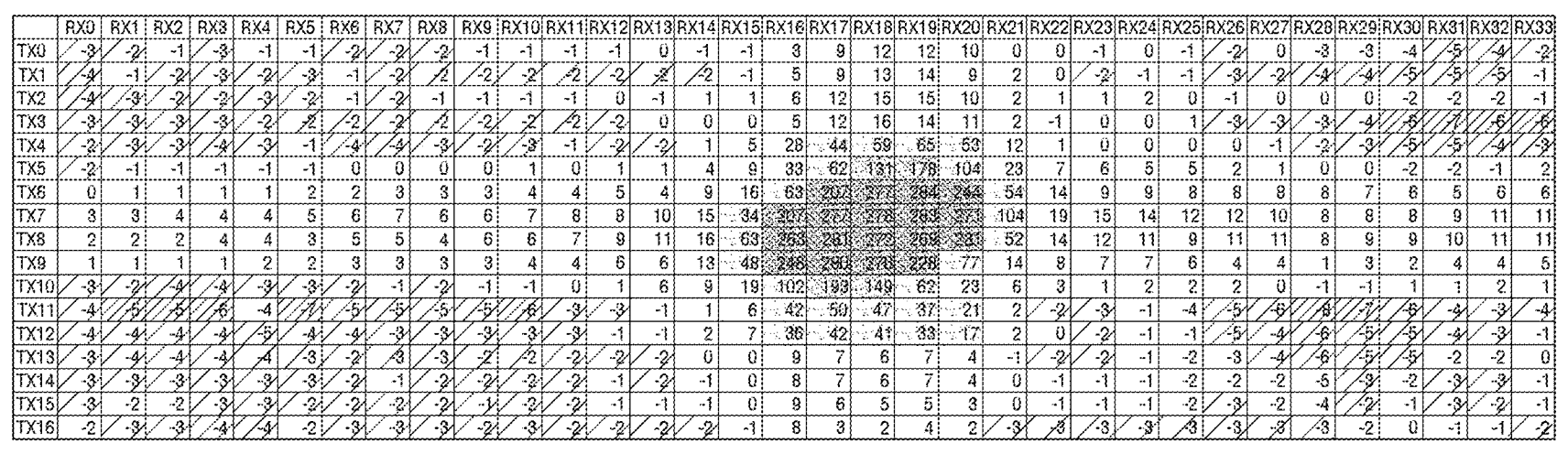
Figure 2:
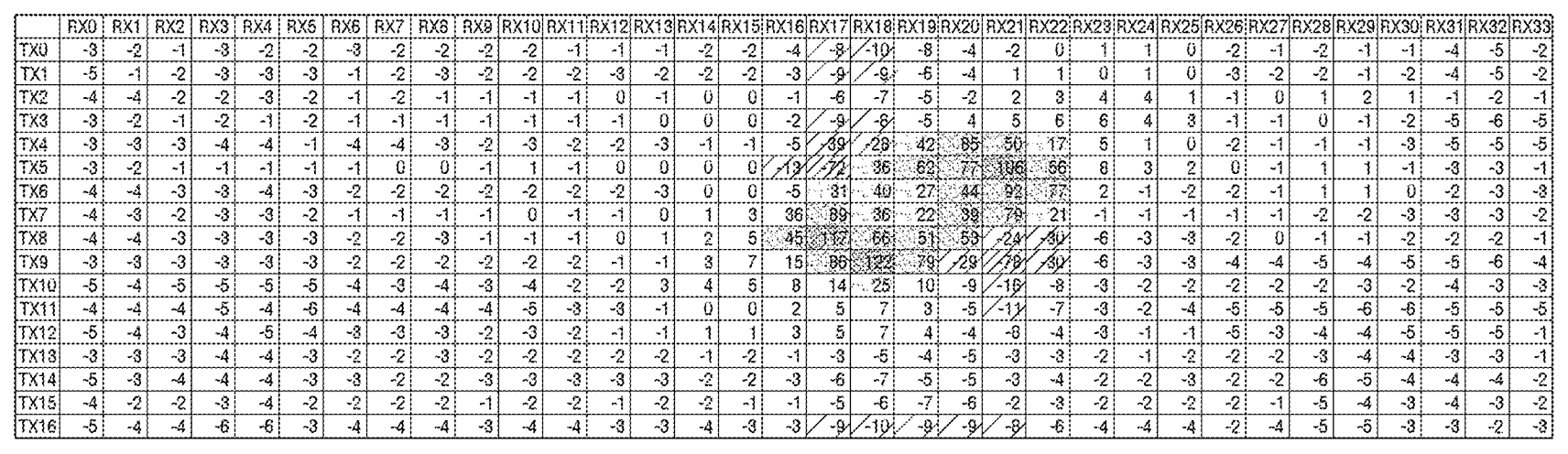

FIGS. 1 and 2 are output data for explaining a principle of generating an LGM interference signal in a touch input device.

FIG. 1 shows data converted to digital values (or signal level values) of a sensing signal output through receiving electrodes RX0 to RX33 when an object is in contact with a specific part of the touch surface in a normal situation in which the touch input device is gripped. FIG. 2 shows data converted to digital values (or signal level values) of a sensing signal output through the receiving electrodes RX0 to RX33 when an object comes into contact with the specific part of the touch surface in a state in which the touch input device is floating.

As can be seen from the data of FIG. 1, in a normal situation, a region in which digital values having relatively large values among output digital values are distributed is located in the center part. However, as shown in FIG. 2, in a floating state, digital values in the central part have a completely different aspect compared to FIG. 1. That is, in FIG. 2, the digital values of the central part have significantly lower values. In this case, even though a user actually makes a single touch (or a big touch) on the touch surface of the touch input device, the touch input device may not make the single touch or may erroneously recognize two or more touches. This is the cause of the negative (−) capacitance change due to the LGM interference signal generated by the coupling between the object and the driving electrode.

A normal situation as shown in FIG. 1 is a situation in which the user touches the touch surface of the touch input device with a finger while gripping the touch input device, and the finger acts as a normal ground. And, in the floating state as shown in FIG. 2, the user touches the touch surface of the touch input device with a finger while the touch input device is placed on the floor or a cradle (e.g., a cradle inside a car), and it shows an example of situation where the finger does not serve as a normal ground.

Figure 4:
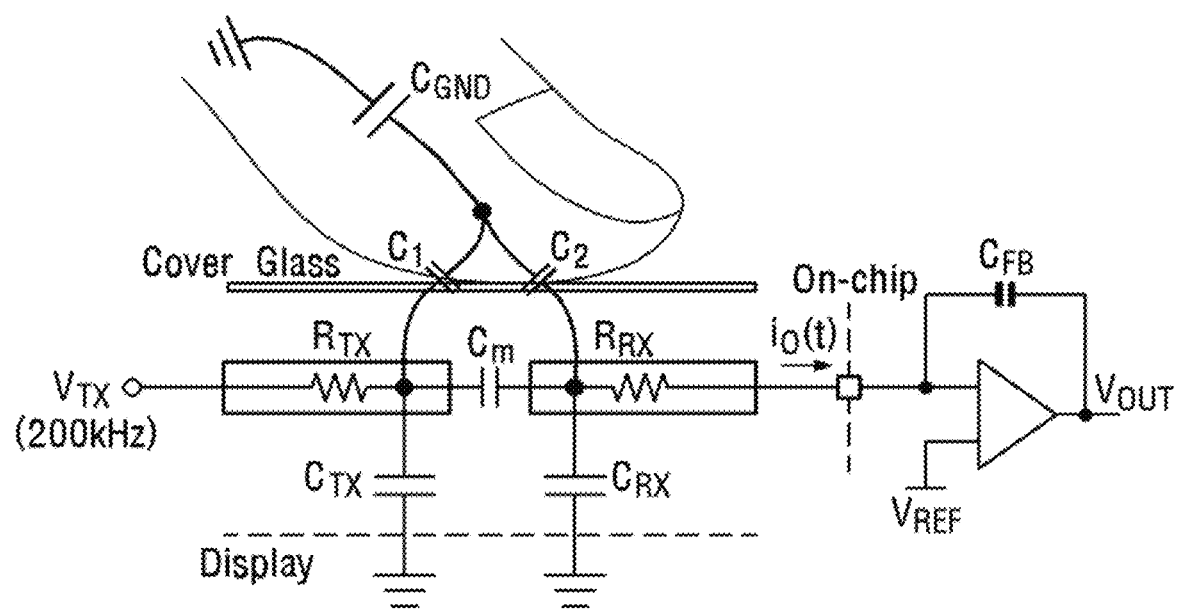
Figure 5:
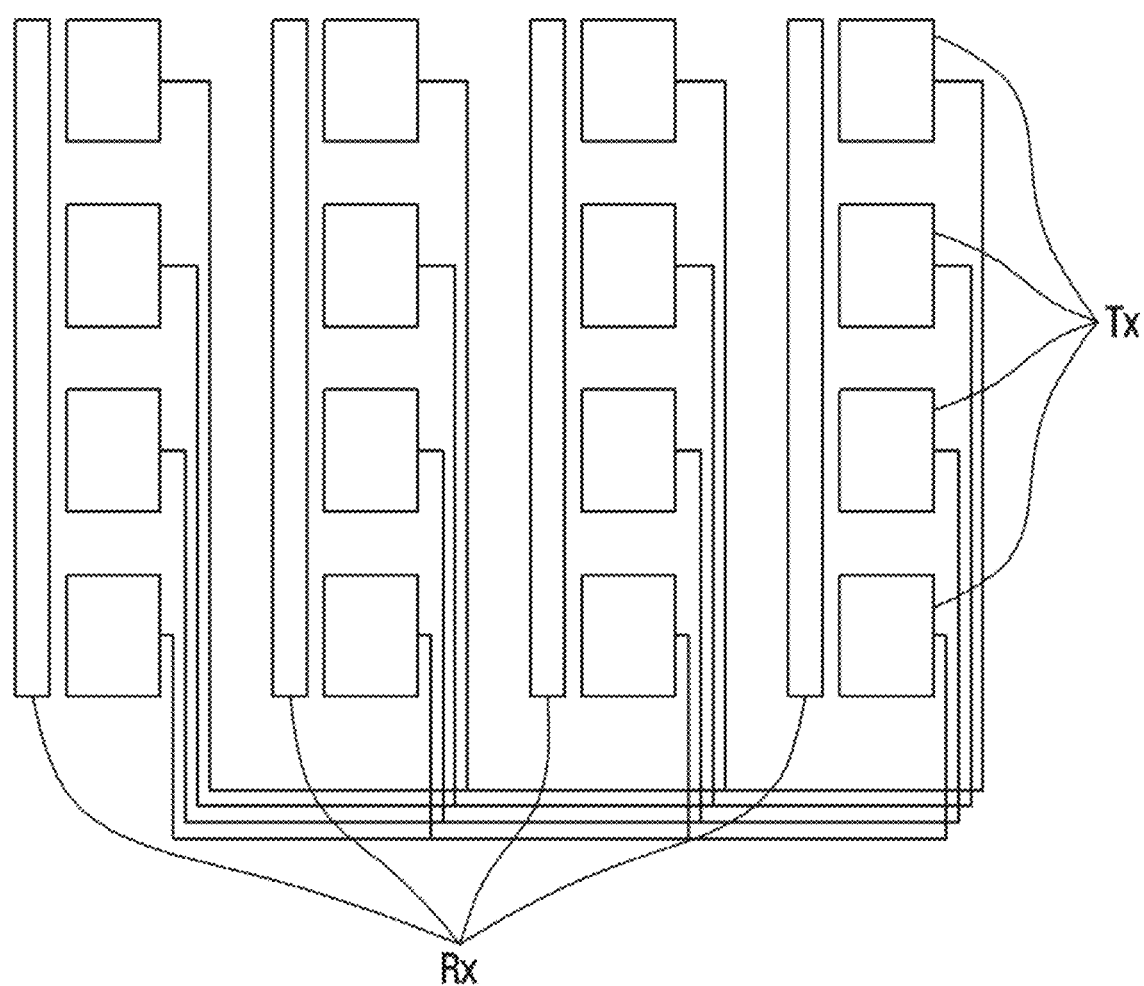
FIG. 5 shows an example in which a touch sensor is composed of a single layer.

FIGS. 3 to 5 are diagrams for explaining why a digital value (or a signal level value) output in a floating state is different from a digital value (or a signal level value) output in a normal situation.

FIGS. 3 and 4 are diagrams for explaining a principle of generating an LGM interference signal in a floating state of a touch input device having a touch sensor implemented as a double layer.

Referring to FIGS. 3 and 4, in an arbitrary cell region (including a plurality of driving electrodes and a plurality of receiving electrodes included in the dotted line region), when low ground mass (LGM, Low Ground Mass, hereinafter, abbreviated as LGM) occurs, the amount of the sensed signal (hereinafter, referred to as "LGM interference signal") is relatively increased. Accordingly, as shown in FIG. 2, the digital value corresponding to the finally output sensing signal becomes small. In particular, in the case of a big touch (in the present invention, a case having a larger area than the touch area of the other fingers, such as the touch area of a thumb, is defined as a big touch), the LGM interference signal is relatively increased.

As shown in FIGS. 3 and 4, when an object touches the touch surface of the touch input device in a floating state, the LGM interference signal generates a mutual capacitance ΔCm between the driving electrodes and the receiving electrodes, and a coupling capacitance C1, C2 or CLGM between the driving electrodes Tx and/or the receiving electrodes Rx.

FIG. 5 is a diagram illustrating an example in which the touch sensor is configured as a single layer. Referring to FIG. 5, a plurality of driving electrodes TX0 to TXm and a plurality of receiving electrodes RX0 to RXm are formed on one layer. For example, a set in which a plurality of driving electrodes Tx are disposed adjacent to one rectangular receiving electrode Rx may be arranged in a plurality of row and column directions. Here, the number of driving electrodes Tx adjacent to one rectangular receiving electrode Rx may be 4 as shown in the drawing, but is not limited thereto. For example, the number of driving electrodes Tx may be three, two, or five or more. In addition, the driving electrodes Tx and the receiving electrodes Rx may be configured in reverse.

A touch input device having a touch sensor having a single-layer structure shown in FIG. 5 also has different aspects as shown in FIGS. 1 and 2 according to a grip state and a floating state. This is due to the object being placed on the low ground mass (LGM) in the floating state.

More specifically, a driving signal applied through a specific driving electrode is input to the plurality of receiving electrodes RX in contact with the object through the object in the LGM state. That is, the object in the LGM state forms a current path. Accordingly, an LGM interference signal-diff having a sign opposite to that of a normal touch signal is output from each of the receiving electrodes in contact with the object. Here, the reason that the LGM interference signal has a sign opposite to that of the normal touch signal is that, in a case of normal touch signal, a mutual capacitance Cm decreases when an object comes into contact with a predetermined mutual capacitance Cm formed between the driving electrode and the receiving electrode, but a LGM interference signal has an opposite sign because coupling capacitance is generated by the contact of an object in a floating state. Accordingly, the LGM interference signal generated in the floating state acts as a factor for lowering a digital value (or a signal level value) corresponding to the sensing signal output through each receiving electrode.

Hereinafter, an example of a touch sensor having a more specific single-layer structure and raw data output when a touch input device having each touch sensor is in a floating state will be described.

Figure 6:
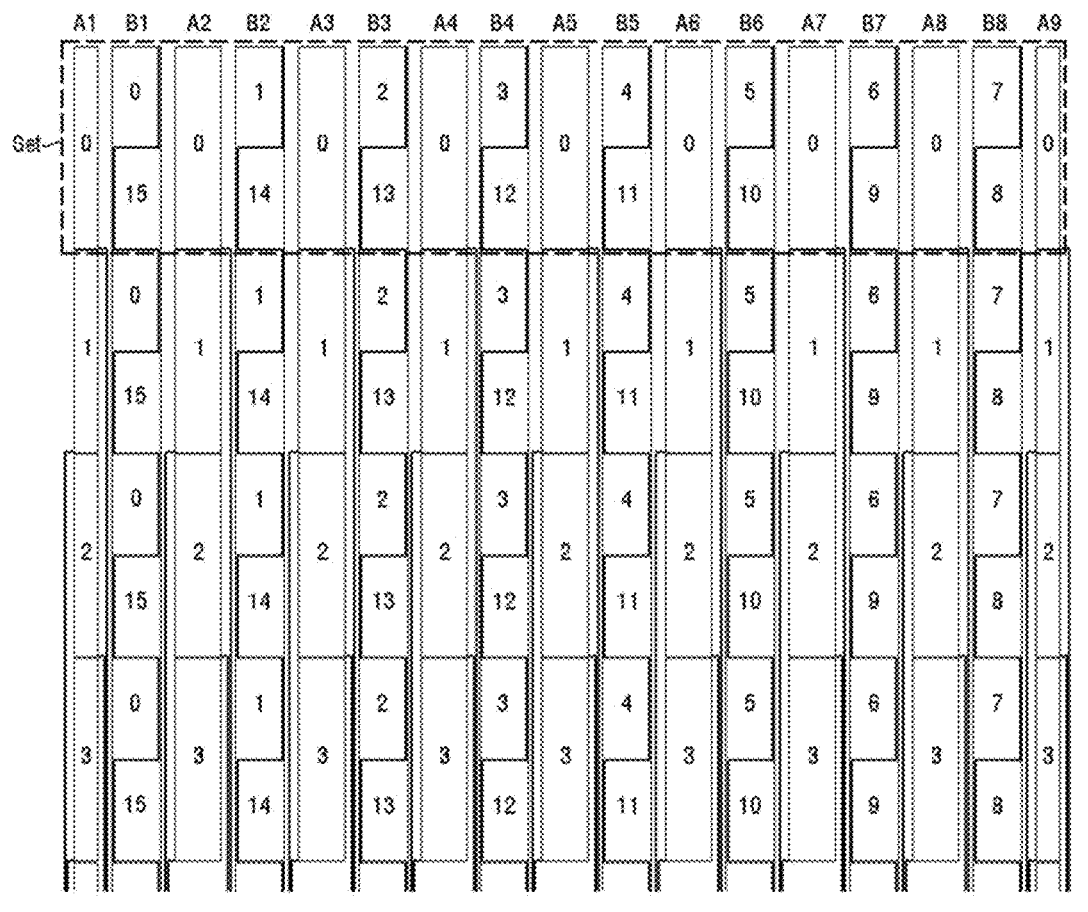

FIG. 6 is an enlarged view of only one part as another example in which the touch sensor is formed as a single layer. Referring to FIG. 6, the touch sensor includes a plurality of driving electrodes TX and a plurality of receiving electrodes RX. The plurality of driving electrodes TX and the plurality of receiving electrodes RX are arranged on the same layer in a matrix form.

The plurality of driving electrodes TX and the plurality of receiving electrodes RX are formed of a transparent conductive material (e.g., Indium Tin Oxide (ITO) made of tin oxide (SnO2), indium oxide (In2O3), etc. or Antimony Tin Oxide (ATO)) and the like. However, this is only an example, and the driving electrodes TX and the receiving electrodes RX may be formed of another transparent conductive material or an opaque conductive material. For example, the driving electrodes TX and the receiving electrodes RX may include at least one of silver ink, copper, nano silver, and carbon nanotubes (CNT).

In addition, the driving electrodes TX and the receiving electrodes RX may be implemented with a metal mesh. When the driving electrodes TX and the receiving electrodes RX are implemented with a metal mesh, the wiring connected to the driving electrodes TX and the receiving electrodes RX may also be implemented with a metal mesh, and the driving electrodes TX and the receiving electrodes RX and wiring may be integrally implemented as a metal mesh. When the driving electrodes TX and the receiving electrodes RX and the wiring are integrally implemented as a metal mesh, a dead zone that does not detect a touch position such as between the electrode and the wiring and/or between the electrode and another electrode becomes smaller, and the sensitivity of touch position detection can be further improved.

The touch sensor is arranged based on the plurality of receiving electrodes RX. Accordingly, hereinafter, the arrangement structure of the plurality of receiving electrodes RX arranged in columns B1 to B8 will be described first, and then the arrangement structure of the plurality of driving electrodes TX will be described.

The plurality of receiving electrodes RX are arranged in plurality in each of the plurality of columns B1, B2, B3, B4, B5, B6, B7, B8. Here, the plurality of driving electrodes TX are arranged in plurality among the plurality of columns B1, B2, B3, B4, B5, B6, B7, B8 in which the receiving electrodes RX are arranged, outside the first column B1, and in the plurality of columns A1, A2, A3, A4, A5, A6, A7, A8, A9 formed outside the eighth column B8.

With respect to each receiving electrode RX of the plurality of receiving electrodes RX, the two driving electrodes TX adjacent to both sides are the same. That is, the number of the two driving electrodes TX adjacent to both sides of each receiving electrode RX is the same. Here, the meaning that the two driving electrodes TX are the same or that the numbers of the two driving electrodes TX are the same means that they are electrically connected to each other through wiring.

The touch sensor includes at least one set in which a plurality of receiving electrodes RX and a plurality of driving electrodes TX are arranged in a predetermined arrangement. A plurality of sets may be repeatedly arranged in a column direction.

One set may include a plurality of different receiving electrodes Rx. For example, one set may include 16 0th receiving electrodes RX0 to 15th receiving electrodes RX15. The 16 receiving electrodes RX0, RX1, RX2, RX3, RX4, RX5, RX6, RX7, RX8, RX9, RX10, RX11, RX12, RX13, RX14, RX15 may be arranged in a predetermined arrangement. The 16th receiving electrodes RX0 to 15th receiving electrodes RX15 are arranged in two consecutive rows in the column direction. Accordingly, eight receiving electrodes may be disposed in each of the two rows. In the first row, receiving electrodes numbered from 0 to 7 are arranged from left to right in the order of RX0, RX1, RX2, RX3, RX4, RX5, RX6, RX7, and in the second row, numbers 8 to 15 RX15, RX14, RX13, RX12, RX11, RX10, RX9, RX8 are arranged from left to right in order.

Meanwhile, the touch sensor includes a plurality of driving electrodes TX. For example, the plurality of driving electrodes TX may include a 0th driving electrode TX0 to a 3rd driving electrode TX3. Here, each driving electrode may be arranged such that the following arrangement condition is satisfied.

The plurality of driving electrodes TX are arranged to satisfy the following conditions. 1) One driving electrode TX0 is disposed on the left and right sides, respectively, based on two different receiving electrodes RX0 and RX15 that are continuous in the column direction. 2) Two driving electrodes TX0 and TX0 facing each other based on two different receiving electrodes RX0 and RX15 consecutive in the column direction have the same number. 3) The driving electrodes TX arranged in the column direction have different numbers, and the driving electrodes TX arranged in the row direction have the same number. 5) The length (horizontal length) of the driving electrodes arranged at both edges of each set may be half the length (horizontal length) of the other driving electrodes, but is not limited thereto, and the length may be the same.

Figure 7:
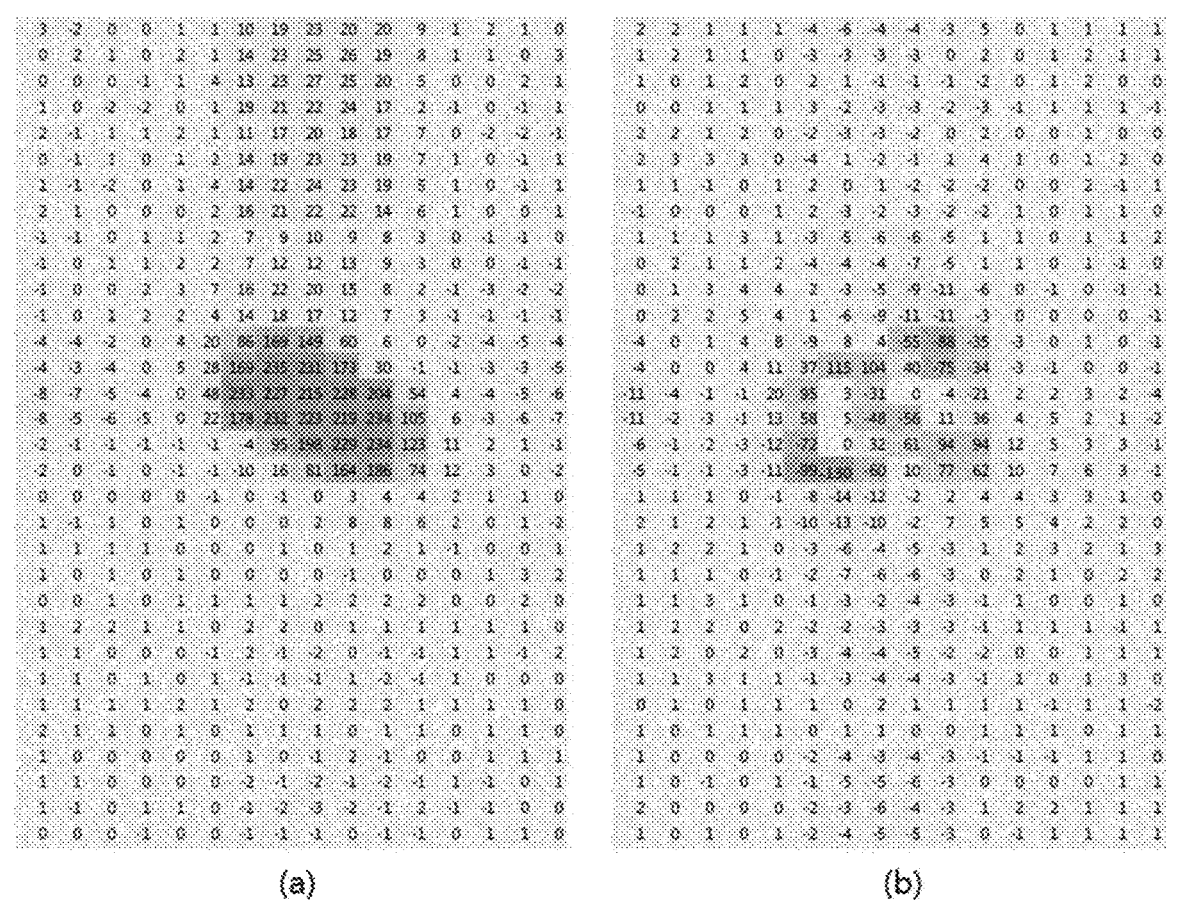

FIG. 7 is raw data output when an object is brought into contact with a specific part of the touch surface of the touch input device having the structure of the touch sensor shown in FIG. 6.

Specifically, FIG. 7(*a*) is raw data output when the touch input device having the structure of the touch sensor shown in FIG. 6 is in a gripped state, and FIG. 7(*b*) is raw data output when the touch input device having the structure of the touch sensor shown in FIG. 6 is in a floating state.

The raw data shown in FIG. 7 may be data derived through the following remap process. When a driving signal is sequentially applied to the plurality of driving electrodes of the touch sensor, a predetermined sensing signal is output from each of the plurality of receiving electrodes. The output sensing signal is converted into a digital value (or signal level value) corresponding to the sensing signal by the touch sensing unit and output. In addition, the touch sensing unit maps the output digital values to correspond to respective positions of the touch surface of the touch input device. Through this mapping process, the raw data of FIG. 7 may be output.

The number described in the raw data of FIG. 7 may be expressed as an integer. If the corresponding integer is greater than or equal to a preset reference integer value (e.g., +65), the touch detection unit of the touch input device may determine (or recognize) that a touch has been made by an object to a portion where the corresponding number is located.

Referring to FIG. 7(*a*), in a grip state (normal situation), data values distributed in the middle portion of the raw data have relatively larger integer values than other portions. On the other hand, referring to FIG. 7(*b*), in the floating state, the digital values described in the middle portion show a different aspect from that of FIG. 7(*a*). Specifically, the middle portion as a whole has a relatively low integer value compared with FIG. 7(*a*), and even some parts of the middle portion have a negative value. This is due to the LGM interference signal generated in the floating state. As a result, the touch input device may mistake the middle portion as two touches instead of one, and misunderstand that there is no touch in the middle portion.

Figure 8:
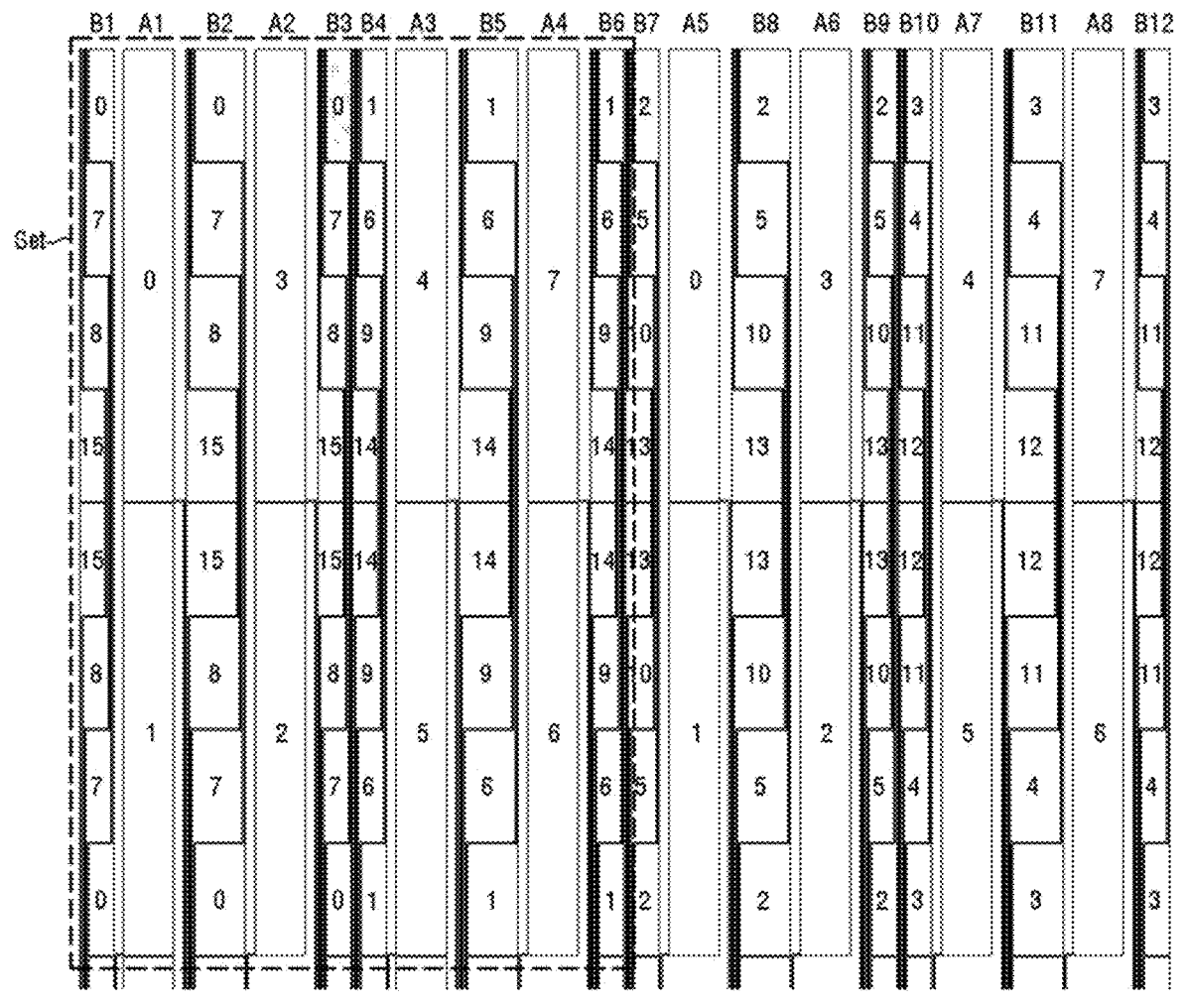

FIG. 8 is another example in which the touch sensor is formed as a single layer, and is an enlarged view of only a portion. Referring to FIG. 8, the touch sensor includes a plurality of driving electrodes TX and a plurality of receiving electrodes RX. The plurality of driving electrodes TX and the plurality of receiving electrodes RX are arranged on the same layer in a matrix form.

The plurality of driving electrodes TX and the plurality of receiving electrodes RX are made of a transparent conductive material (e.g., Indium Tin Oxide (ITO) made of tin oxide (SnO2), indium oxide (In2O3), etc., or Antimony Tin Oxide (ATO)) and the like. However, this is only an example, and the driving electrodes TX and the receiving electrodes RX may be formed of another transparent conductive material or an opaque conductive material. For example, the driving electrodes TX and the receiving electrodes RX may include at least one of silver ink, copper, nano silver, and carbon nanotubes (CNT).

In addition, the driving electrodes TX and the receiving electrodes RX may be implemented with a metal mesh. When the driving electrodes TX and the receiving electrodes RX are implemented with a metal mesh, the wiring connected to the driving electrodes TX and the receiving electrodes RX may also be implemented with a metal mesh, and the driving electrodes TX and the receiving electrodes RX and wiring may be integrally implemented as a metal mesh. When the driving electrode TX and the receiving electrode RX and the wiring are integrally implemented as a metal mesh, a dead zone that does not detect a touch position such as between the electrode and the wiring and/or between the electrode and another electrode becomes smaller, and the sensitivity of touch position detection can be further improved.

The touch sensors are arranged based on the plurality of receiving electrodes RX. Accordingly, hereinafter, the arrangement structure of the plurality of receiving electrodes RX will be described first, and then the arrangement structure of the plurality of driving electrodes TX will be described.

The plurality of receiving electrodes RX are arranged in plurality in each of the plurality of columns A1, A2, A3, A4, A5, A6, A7, A8. Here, the plurality of driving electrodes TX are arranged in plurality among the plurality of columns A1, A2, A3, A4, A5, A6, A7, A8 in which the receiving electrodes RX are arranged, outside the first column A1, and in the plurality of columns B1, B2, B3, B4, B5, B6, B7, B8, B9, B10, B11, B12 formed outside the eighth column A8.

Two driving electrodes TX adjacent to both sides of the plurality of receiving electrodes RX have the same characteristics with respect to each receiving electrode RX. That is, the number of the two driving electrodes TX adjacent to both sides of each receiving electrode RX is the same. Here, the meaning that the two driving electrodes TX are the same or that the numbers of the two driving electrodes TX are the same means that they are electrically connected to each other through wiring.

The touch sensor includes at least one set in which a plurality of receiving electrodes RX and a plurality of driving electrodes TX are arranged in a predetermined arrangement. A plurality of sets may be configured by being repeatedly arranged in a row direction and a column direction.

One set may include a plurality of different receiving electrodes Rx. For example, one set may include eight 0th receiving electrodes RX0 to 7th receiving electrodes RX7. The eight receiving electrodes RX0, RX1, RX2, RX3, RX4, RX5, RX6, RX7 may be arranged in a predetermined arrangement. The eight 0th receiving electrodes RX0 to 8th receiving electrodes RX are arranged in four consecutive columns A1, A2, A3, A4 in the row direction. Accordingly, two receiving electrodes may be disposed in each of the four columns from top to bottom.

A plurality of receiving electrodes having consecutive numbers are arranged in each column. Here, the arrangement order of the odd-numbered columns A1, A3 and the arrangement order of the even-numbered columns A2, A4 may be opposite to each other. For example, in the first column A1, receiving electrodes RX0, RX1 having consecutive numbers are sequentially arranged from top to bottom, and in the second column A2, receiving electrodes RX2, RX3 having consecutive numbers are sequentially arranged from bottom to top. Receiving electrodes RX4, RX5 having consecutive numbers in the third column A3 are sequentially arranged from top to bottom, and receiving electrodes RX6, RX7 having consecutive numbers in the fourth column A4 are sequentially arranged from bottom to top. Here, although not shown in the drawings, a plurality of different receiving electrodes included in one set are not sequentially arranged in a row or column direction, but may be arranged randomly.

Meanwhile, the touch sensor includes a plurality of driving electrodes TX. For example, the plurality of driving electrodes TX may include a 0th driving electrode TX0 to a fifteenth driving electrode TX15. Here, each driving electrode may be arranged such that the following arrangement condition is satisfied.

The plurality of driving electrodes TX are arranged to satisfy the following conditions.

1) Based on one receiving electrode RX, four different driving electrodes are arranged on the left, and four different driving electrodes are arranged on the right side. 2) Two driving electrodes TX facing each other with respect to each receiving electrode RX have the same number. 3) Three driving electrodes of the same number are sequentially arranged in the row direction. 4) The eight driving electrodes adjacent to the receiving electrode RX1 in the even-numbered row are arranged symmetrically with the eight driving electrodes adjacent to the receiving electrode RX0 in the odd-numbered row. 5) The length (horizontal length) of the driving electrodes arranged at both edges of each set and the driving electrodes arranged in the center of each set is half the length (horizontal length) of the other driving electrodes.

Figure 9:
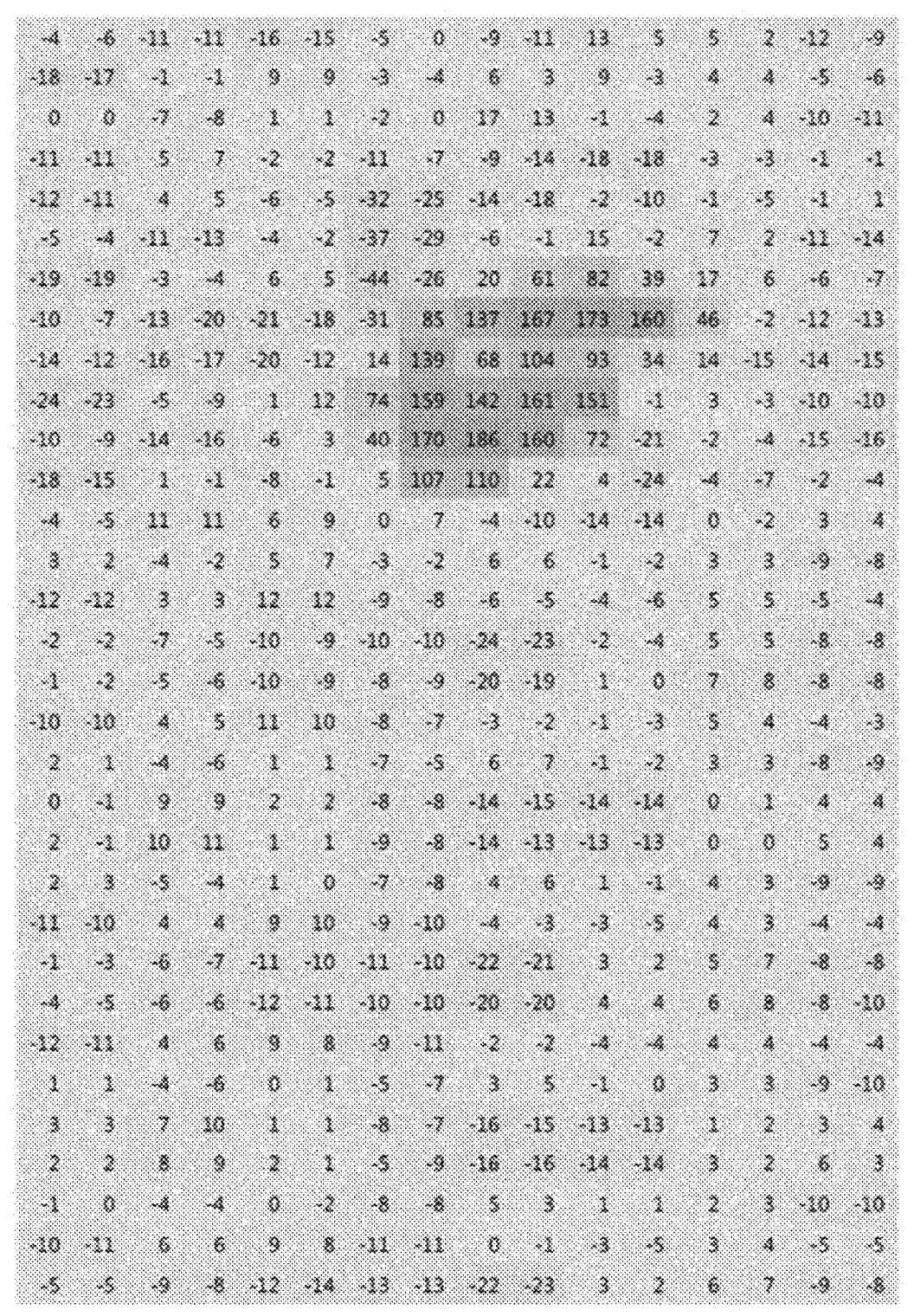

FIG. 9 is raw data when an object is brought into contact with a specific part of the touch surface of the touch input device having the structure of the touch sensor shown in FIG. 8. Specifically, FIG. 9 is raw data when the touch input device having the structure of the touch sensor shown in FIG. 8 is in a floating state.

Referring to FIG. 9, it is confirmed that digital values (or level values) output from a specific part in a floating state have relatively large integer values compared to other parts. When comparing the raw data shown in FIG. 9 with the raw data shown in FIG. 7(*b*), it can be confirmed that in the floating state, the structure of the touch sensor shown in FIG. 8 has an effect of improving LGM more than the structure of the touch sensor shown in FIG. 6.

Figure 10:
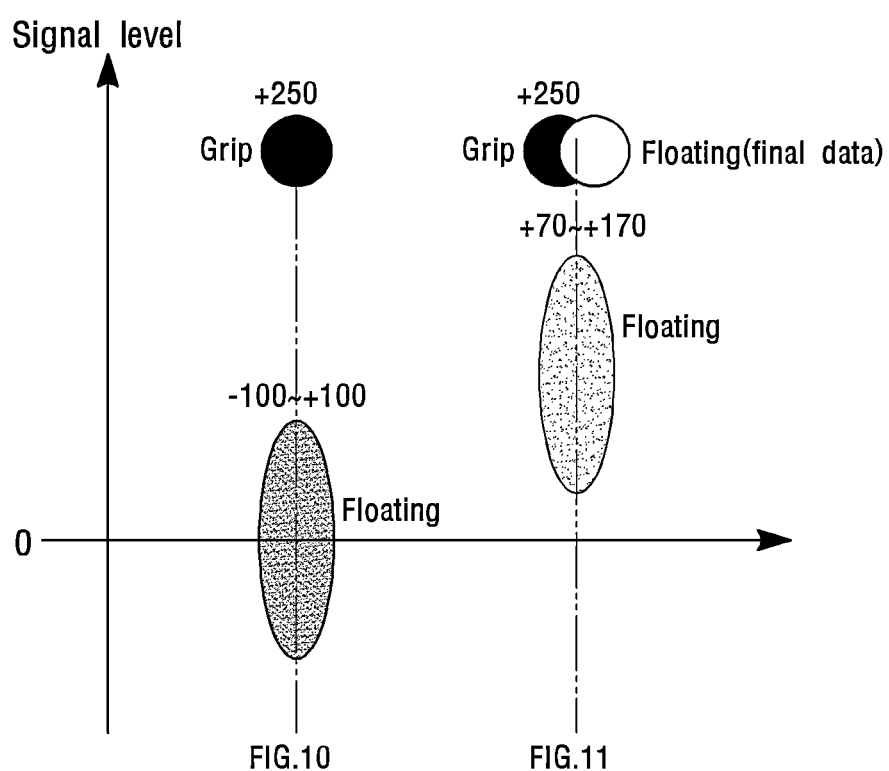
FIG. 10 is a comparison graph of LGM performance of the touch sensor shown in FIGS. 6 and 8.

FIG. 10 is a graph roughly comparing LGM performance of the touch sensor shown in FIGS. 6 and 8. Referring to FIG. 10, in the touch sensor shown in FIG. 6, in a grip state, relatively large level values among the level values in the touch area have a value of about +250, whereas in a floating state, relatively large level values have a value between −2100 and +2100.

On the other hand, in the touch sensor illustrated in FIG. 8, in a grip state, relatively large level values among level values in the touch area have a level value of approximately +250, whereas in a floating state, relatively large level values have a value between +70 to +170.

Determining based on the graph of FIG. 10, in the case of the touch input device having the touch sensor shown in FIG. 6, it is difficult to accurately recognize a touch and a location of the touch in a floating state, but the touch input device having the touch sensor shown in FIG. 8, has, even in the floating state, relatively large level values greater than or equal to +70, so there is no problem in recognizing whether a touch has been made and a touch position. However, to output relatively large level values (+250) like a grip state even in the floating state, or to output level values similarly to the relatively large level values (+250) in the grip state, is very important in accurately recognizing whether the touch input device has been touched and/or a touch location.

Hereinafter, touch sensors where touch input devices having a single layer and a double layer touch sensors output (Floating (final data)) such that the signal level value output in a floating state is the same or similar to the signal level value output in a grip state, and touch input devices including the same will be described in detail with reference to the drawings.

The method to be described below can be applied to a touch sensor having any currently known structure and a touch input device including the same. In addition, although not shown in a separate drawing, in the touch sensor having a double layer structure, one of the plurality of driving electrodes and the plurality of receiving electrodes may be disposed between the touch surface and the display panel, and the other may be disposed inside the display panel.

In addition, it is not limited to the above-described embodiment, and it is also applicable to a touch input device having a touch sensor having a single-layer or double-layer structure, which is not shown in the present specification.

Figure 11:
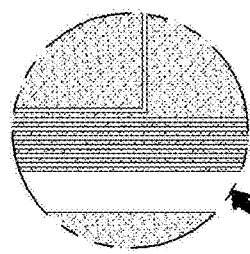
FIG. 11 is a partially enlarged view of another example in which a touch sensor is formed as a single layer.

FIG. 11 is an enlarged view of only a part of the touch sensor formed as a single layer. Referring to FIG. 11, a plurality of driving electrodes TX and a plurality of receiving electrodes RX are included. The plurality of driving electrodes TX and the plurality of receiving electrodes RX are arranged in a matrix form.

The touch sensors are arranged based on the plurality of driving electrodes TX. Accordingly, hereinafter, the arrangement structure of the plurality of driving electrodes TX arranged in columns B1 to B16 will be described first, and then the arrangement structure of the plurality of receiving electrodes RX will be described.

The plurality of driving electrodes TX are arranged in plurality in each of the plurality of columns B1, B2, B3, B4, B5, B6, B7, B8, B9, B10, B11, B12, B13, B14, B15, B16. Here, the plurality of receiving electrodes RX are arranged in plurality among the plurality of columns B1, B2, B3, B4, B5, B6, B7, B8, B9, B10, B11, B12, B13, B14, B15, B16 in which the driving electrodes TX are arranged, outside of the first column B1, and in a plurality of columns A1, A2, A3, A4, A5, A6, A7, A8, A9, A10, A11, A12, A13, A14, A15, A16 formed outside the 16th column B16.

Based on each driving electrode TX of the plurality of driving electrodes TX, the two receiving electrodes RX adjacent to both sides have different characteristics. That is, the numbers of the two receiving electrodes RX adjacent to both sides of each driving electrode TX are different from each other. Here, the meaning that the two receiving electrodes RX are different or the numbers of the two receiving electrodes RX are different means that they are not electrically connected to each other through wiring.

The plurality of driving electrodes TX includes a first set 1 in which 32 0th driving electrode TX0 to 31st driving electrode TX31 are disposed in a first arrangement, and a second set in which 32 0th driving electrode TX0 to 31st driving electrode TX31 are arranged in a second arrangement.

The first set may be continuously provided two in a row direction and two in a column direction. The first set positioned in an even-numbered row and the first set positioned in an odd-numbered row may be symmetrical.

The second set may be continuously provided two in a row direction and two in a column direction. The second set positioned in an even-numbered row is the second set positioned in an odd-numbered row may be symmetrical.

In addition, the plurality of second sets may be disposed on one side of the plurality of first sets.

In the first arrangement of the first set, 32 0th driving electrode TX0 to 31st driving electrode TX31 are arranged in four consecutive columns in a row direction, and in the first column, the driving electrodes numbered from 0 to 7 are arranged from top to bottom in the order of TX0, TX1, TX2, TX3, TX4, TX5, TX6, TX7, and in the second column, the driving electrodes numbered from 8 to 15 are arranged from top to bottom in the order of TX15, TX14, TX13, TX12, TX11, TX10, TX9, TX8, and in the third column, driving electrodes numbered from 16 to 23 are arranged from top to bottom in the order of TX16, TX17, TX18, TX19, TX20, TX21, TX22, TX23, and in the fourth column, driving electrodes numbered from 24 to 31 are arranged from top to bottom in the order of TX31, TX30, TX29, TX28, TX27, TX26, TX25, TX24.

In the second arrangement of the second set, 32 0th driving electrode TX0 to 31st driving electrode TX31 are arranged in four consecutive columns in a row direction, and in the first column, the driving electrodes numbered from 16 to 23 are arranged from top to bottom in the order of TX16, TX17, TX18, TX19, TX20, TX21, TX22, TX23, and in the second column, the driving electrodes numbered from 24 to 31 are arranged from top to bottom in the order of TX31, TX30, TX29, TX28, TX27, TX26, TX25, TX24, and in the third column, driving electrodes numbered from 0 to 7 are arranged from top to bottom in the order of TX0, TX1, TX2, TX3, TX4, TX5, TX6, TX7, and in the fourth column, driving electrodes numbered from 8 to 15 are arranged from top to bottom in the order of TX15, TX14, TX13, TX12, TX11, TX10, TX9, TX8.

Meanwhile, the touch sensor according to an embodiment includes a plurality of receiving electrodes RX, and for example, the plurality of receiving electrodes RX may include a 0th receiving electrode RX0 to a 15th receiving electrode RX15. Here, each receiving electrode may be arranged so that the following arrangement condition is satisfied.

The plurality of receiving electrodes RX are arranged to satisfy the following conditions. 1) One receiving electrode on the left and one receiving electrode on the right are disposed based on eight different driving electrodes TX that are continuous in a column direction. 2) Two receiving electrodes RX facing each other based on eight different driving electrodes TX consecutive in a column direction have different numbers. 3) Two different receiving electrodes RX are arranged in a column direction, and eight different receiving electrodes RX are repeatedly arranged in a row direction. 5) The length (horizontal length) of the receiving electrodes arranged along a column direction at both edges may be the same as the length (horizontal length) of the other receiving electrodes, but is not limited thereto, and may be half of the length (horizontal length) of the other receiving electrodes.

Figure 12:
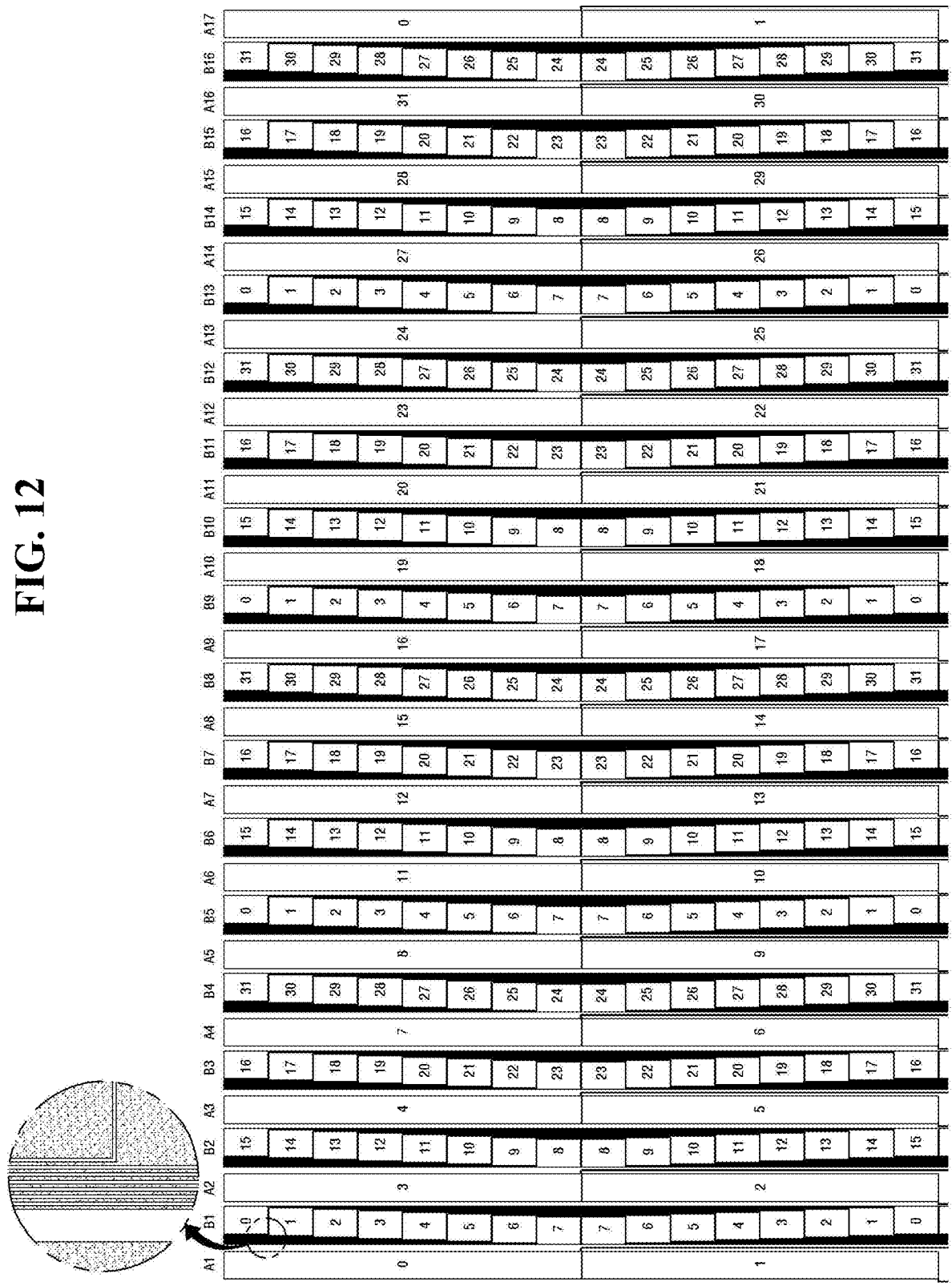
FIG. 12 is a partially enlarged view of another example in which the touch sensor is formed as a single layer (1 layer).

FIG. 12 is another example in which the touch sensor is formed as a single layer, and is an enlarged view of only one part. Referring to FIG. 12, the touch sensor includes a plurality of driving electrodes TX and a plurality of receiving electrodes RX. The plurality of driving electrodes TX and the plurality of receiving electrodes RX are arranged in a matrix form.

The touch sensor according to an embodiment is arranged based on the plurality of driving electrodes TX. Accordingly, hereinafter, the arrangement structure of the plurality of driving electrodes TX arranged in columns B1 to B16 will be described first, and then the arrangement structure of the plurality of receiving electrodes RX will be described.

The plurality of driving electrodes TX are arranged in plurality in each of the plurality of columns B1, B2, B3, B4, B5, B6, B7, B8, B9, B10, B11, B12, B13, B14, B15, B16. Here, the plurality of receiving electrodes RX are arranged in plurality among a plurality of columns B1, B2, B3, B4, B5, B6, B7, B8, B9, B10, B11, B12, B13, B14, B15, B16 in which the driving electrodes TX are arranged, outside the first column B1, and in the plurality of columns A1, A2, A3, A4, A5, A6, A7, A8, A9, A10, A11, A12, A13, A14, A15, A16 formed outside the 16th column B16.

Based on each driving electrode TX of the plurality of driving electrodes TX, the two receiving electrodes RX adjacent to both sides have different characteristics. That is, the numbers of the two receiving electrodes RX adjacent to both sides of each driving electrode TX are different from each other. Here, the meaning that the two receiving electrodes RX are different or the numbers of the two receiving electrodes RX are different means that they are not electrically connected to each other through wiring.

The plurality of driving electrodes TX includes a set in which 32 0th driving electrode TX0 to 31st driving electrode TX31 are arranged in a first arrangement. Here, the set may be repeatedly arranged in a row direction and a column direction in plurality. The set located in an even-numbered row may be symmetrical to the set located in an odd-numbered row.

In the first arrangement of each set, 32 0th driving electrode TX0 to 31st driving electrode TX31 are arranged along four consecutive columns in a row direction, and in the first column, the driving electrodes numbered from 0 to 7 are arranged from top to bottom in the order of TX0, TX1, TX2, TX3, TX4, TX5, TX6, TX7, and in the second column, the driving electrodes numbered from 8 to 15 are arranged from top to bottom in the order of TX15, TX14 TX13, TX12, TX11, TX10, TX9, TX8, and in the third column, the driving electrodes numbered from 16 to 23 are arranged from top to bottom in the order of TX16, TX17, TX18, TX19, TX20, TX21, TX22, TX23, and in the fourth column, driving electrodes numbered from 24 to 31 are arranged from top to bottom in the order of TX31, TX30, TX29, TX28, TX27, TX26, TX25, TX24.

On the other hand, the touch sensor according to an embodiment includes a plurality of receiving electrodes RX, and for example, the plurality of receiving electrodes RX may include a 0th receiving electrode RX0 to a 31st receiving electrode RX31. Here, each receiving electrode may be arranged so that the following arrangement condition is satisfied.

The plurality of receiving electrodes RX are arranged to satisfy the following conditions. 1) One receiving electrode on the left and one receiving electrode on the right are arranged based on eight different driving electrodes TX that are continuous in a column direction. 2) Two receiving electrodes RX facing each other based on eight different driving electrodes TX consecutive in a column direction have different numbers. 3) Two different receiving electrodes are arranged in a column direction, and 16 different receiving electrodes are repeatedly arranged in a row direction. 4) The length (horizontal length) of the receiving electrodes arranged along a column direction at both edges may be the same as the length (horizontal length) of the other receiving electrodes, but is not limited thereto, and it may be half of the length (horizontal length) of the other receiving electrodes.

Figure 13:
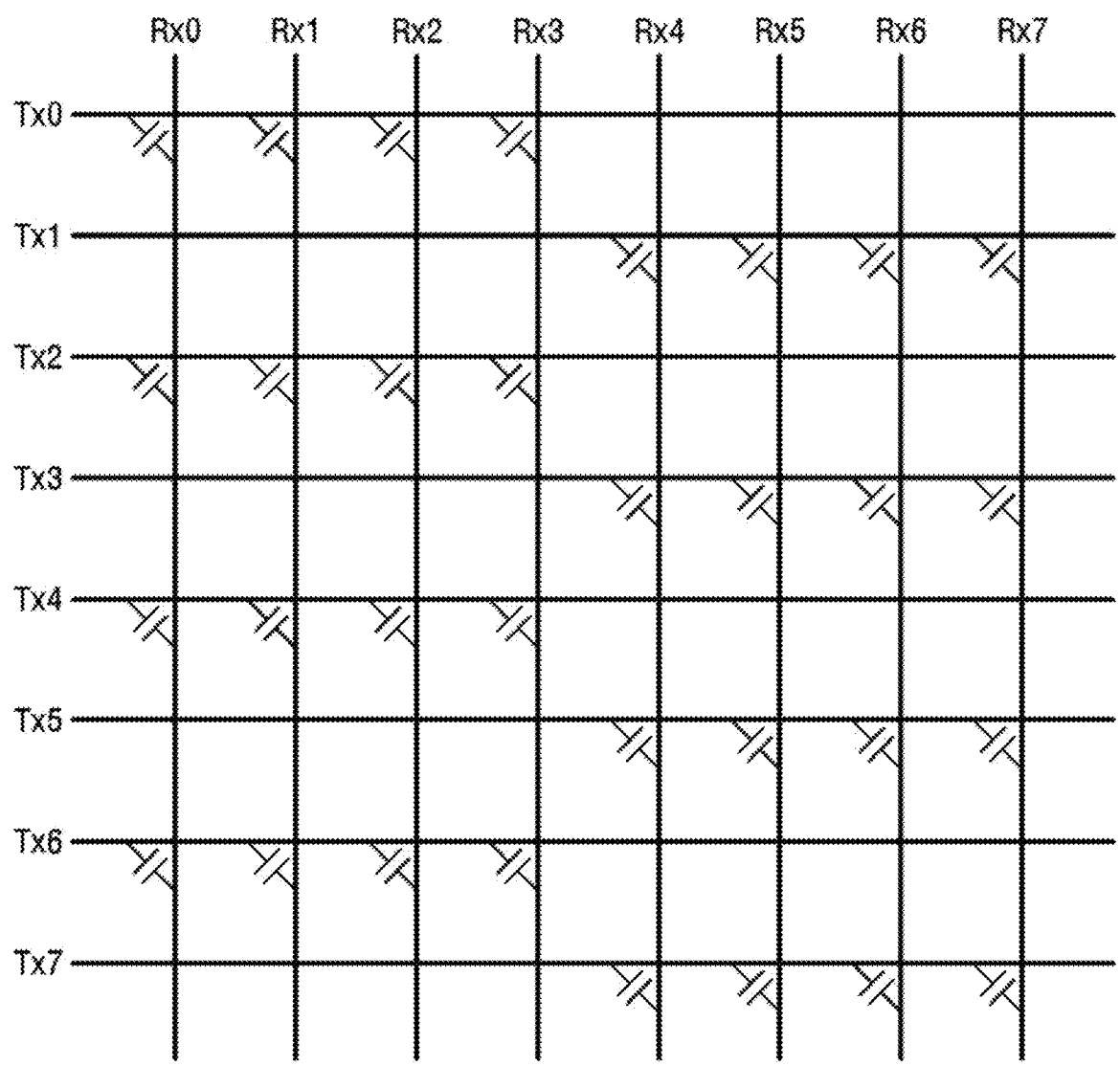
FIG. 13 is a conceptual diagram of a touch sensor included in the touch input device according to the present invention.

FIG. 13 is an exemplary conceptual diagram conceptualizing a touch sensor provided in a touch input device according to the present invention. Referring to FIG. 13, the touch sensor according to the embodiment of the present invention includes a plurality of driving electrodes TX0 to TX7 and a plurality of receiving electrodes RX0 to RX7. Here, the plurality of driving electrodes TX0 to TX7 and the plurality of receiving electrodes RX0 to RX7 may be formed in a single layer or in a double layer.

FIG. 13 is an exemplary conceptual diagram conceptualizing a touch sensor provided in a touch input device according to the present invention. Referring to FIG. 13, the touch sensor according to an embodiment of the present invention includes a plurality of driving electrodes TX0 to TX7 and a plurality of receiving electrodes RX0 to RX7. Here, the plurality of driving electrodes TX0 to TX7 and the plurality of receiving electrodes RX0 to RX7 may be formed in a single layer or in a double layer.

The touch sensor according to an embodiment of the present invention including a plurality of driving electrodes TX0 to TX7 and a plurality of receiving electrodes RX0 to RX7 includes nodes that form a mutual capacitance Cm among a plurality of driving electrodes TX0 to TX7 and a plurality of receiving electrodes RX0 to RX7 includes nodes that and nodes that do not form a mutual capacitance Cm among them.

For example, in FIG. 13, the nodes forming the mutual capacitance Cm are (Tx0, Rx0), (Tx0, Rx1), (Tx0, Rx2), (Tx0, Rx3), (Tx1, Rx4), (Tx1, Rx5), (Tx1, Rx6), (Tx1, Rx7), (Tx2, Rx0), (Tx2, Rx1), (Tx2, Rx2), (Tx2, Rx3), (Tx3, Rx4), (Tx3, Rx5), (Tx3, Rx6), (Tx3, Rx7), (Tx4, Rx0), (Tx4, Rx1), (Tx4, Rx2), (Tx4, Rx3), (Tx5, Rx4), (Tx5, Rx5), (Tx5, Rx6), (Tx5, Rx7), (Tx6, Rx0), (Tx6, Rx1), (Tx6, Rx2), (Tx6, Rx3), (Tx7, Rx4), (Tx7, Rx5), (Tx7, Rx6), (Tx7, Rx7).

Each receiving electrode Rx of nodes forming the mutual capacitance Cm may be called an active receiving electrode Active Rx.

The sensing signal output from each receiving electrode Rx of the nodes forming the mutual capacitance Cm includes noise information as well as information on the capacitance change amount due to the touch of an object. Here, the noise information includes display noise (e.g., Zebra noise) information, information on the amount of change according to an image change displayed on the display panel, and information on the amount of change in negative (−) capacitance due to an LGM interference signal generated in a floating state. Therefore, when the sensing signal received from each of the receiving electrodes Rx of the nodes forming the mutual capacitance Cm is converted into a predetermined level value and output, the output level value is what the information of the mutual capacitance change amount and the noise information are reflected.

Meanwhile, in FIG. 13, the nodes that do not form the mutual capacitance Cm are (Tx0, Rx4), (Tx0, Rx5), (Tx0, Rx6), (Tx0, Rx7), (Tx1, Rx0), (Tx1, Rx1), (Tx1, Rx2), (Tx1, Rx3), (Tx2, Rx4), (Tx2, Rx5), (Tx2, Rx6), (Tx2, Rx7), (Tx3, Rx0), (Tx3, Rx1), (Tx3, Rx2), (Tx3, Rx3), (Tx4, Rx4), (Tx4, Rx5), (Tx4, Rx6), (Tx4, Rx7), (Tx5, Rx0), (Tx5, Rx1), (Tx5, Rx2), (Tx5, Rx3), (Tx6, Rx4), (Tx6, Rx5), (Tx6, Rx6), (Tx6, Rx7), (Tx7, Rx0), (Tx7, Rx1), (Tx7, Rx2), (Tx7, Rx3).

Each receiving electrode Rx of nodes that do not form the mutual capacitance Cm may be referred to as a dummy electrode or a dummy receiving electrode dummy Rx. The dummy receiving electrode may be configured independently of the plurality of receiving electrodes in the touch sensor, and some of the plurality of receiving electrodes may be used as the dummy receiving electrodes under specific circumstances and conditions.

The sensing signal output from each receiving electrode Rx of the nodes that do not form the mutual capacitance Cm does not include information on the amount of change in capacitance due to the touch of an object, but only noise information.

Accordingly, the touch input device according to the embodiment of the present invention having such a touch sensor may remove the noise information and obtain the information on the amount of change in capacitance due to the touch of the object by subtracting a sensing signal (second sensing signal) output from each receiving electrode Rx of nodes that do not form mutual capacitance Cm from a sensing signal (first sensing signal) output from each receiving electrode Rx of nodes forming mutual capacitance Cm. Therefore, a digital value (or signal level value) corresponding to a final sensing signal resulted from subtracting a sensing signal output from each receiving electrode Rx of nodes that do not form mutual capacitance Cm from a sensing signal output from each receiving electrode Rx of nodes forming mutual capacitance Cm, becomes a value based on the information on the amount of change in capacitance due to the touch of the object. As a result, even when the touch input device is in a floating state, a digital value identical to or almost similar to a digital value output in a grip state may be output. Here, more preferably, the touch input device according to an embodiment of the present invention may subtract a preset factor multiplied by a sensing signal (second sensing signal) output from each receiving electrode Rx of nodes that do not form mutual capacitance Cm from a sensing signal (first sensing signal) output from each receiving electrode Rx of nodes forming mutual capacitance Cm. The reason for multiplying the factor by the second sensing signal is to compensate for a change in the amplitude of a sensing signal that may occur due to a difference in configurations between an active channel and a dummy channel. For example, the factor may have a preset value such as 0.8, but is not limited thereto, and the value of the factor may vary according to designs.

Hereinafter, specific examples will be described with reference to FIGS. 14 to 20.

Figure 14:
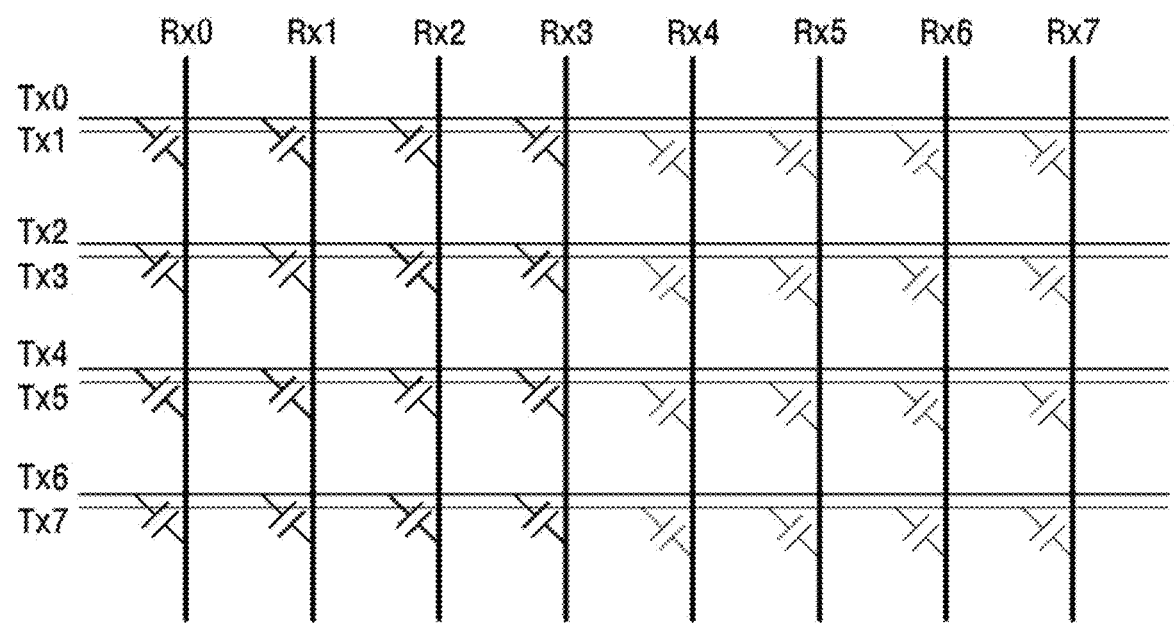
FIG. 14 is a conceptual diagram conceptualizing the touch sensor shown in FIG. 8.

FIG. 14 is a conceptual diagram conceptualizing the touch sensor shown in FIG. 8. Referring to FIG. 14, the touch sensor according to an embodiment of the present invention includes a plurality of driving electrodes TX0 to TX7 and a plurality of receiving electrodes RX0 to RX7. At least a part of the plurality of receiving electrodes RX0 to RX7 is used as dummy receiving electrodes Dummy Rx. Here, which of the plurality of receiving electrodes RX0 to RX7 is used as dummy receiving electrodes is determined according to the driving electrode to which a driving signal is applied.

For example, when a driving signal is applied to the 0th driving electrode TX0, the 4th receiving electrode Rx4, the 5th receiving electrode Rx5, the 6th receiving electrode Rx6, and the 7th receiving electrode Rx7 among the plurality of receiving electrodes Rx0 to Rx7 are used as dummy receiving electrodes. In other words, when a driving signal is applied to the 0th driving electrode Tx0, the 4th, 5th, 6th, and 7th receiving electrodes Rx4, Rx5, Rx6, Rx7 become receiving electrodes that do not form mutual capacitance Cm with the 0th driving electrode Tx0, and the 0th, 1st, 2nd, and 3rd receiving electrodes Rx0, Rx1, Rx2, Rx3 become receiving electrodes that form mutual capacitance Cm with the 0th driving electrode Tx0.

If a driving signal is applied to the first driving electrode Tx1, the 4th, 5th, 6th, and 7th receiving electrodes Rx4, Rx5, Rx6, Rx7 become receiving electrodes forming mutual capacitance Cm with the first driving electrode Tx1, and the 0th, 1st, 2nd, and 3rd receiving electrodes Rx0, Rx1, Rx2, Rx3 become receiving electrodes that do not form mutual capacitance Cm with the first driving electrode Tx1.

The touch input device according to an embodiment of the present invention having such a touch sensor may remove noise information, especially information on the amount of change in negative (−) capacitance caused by LGM interference signals by subtracting a sensing signal output from each receiving electrode Rx of nodes that do not form mutual capacitance Cm from a sensing signal output from each receiving electrode Rx of nodes forming mutual capacitance Cm. Here, the touch input device according to an embodiment of the present invention having a touch sensor may subtract a preset factor multiplied by a sensing signal output from each receiving electrode Rx of nodes that do not form mutual capacitance Cm from a sensing signal output from each receiving electrode Rx of nodes forming mutual capacitance Cm.

Figure 15:
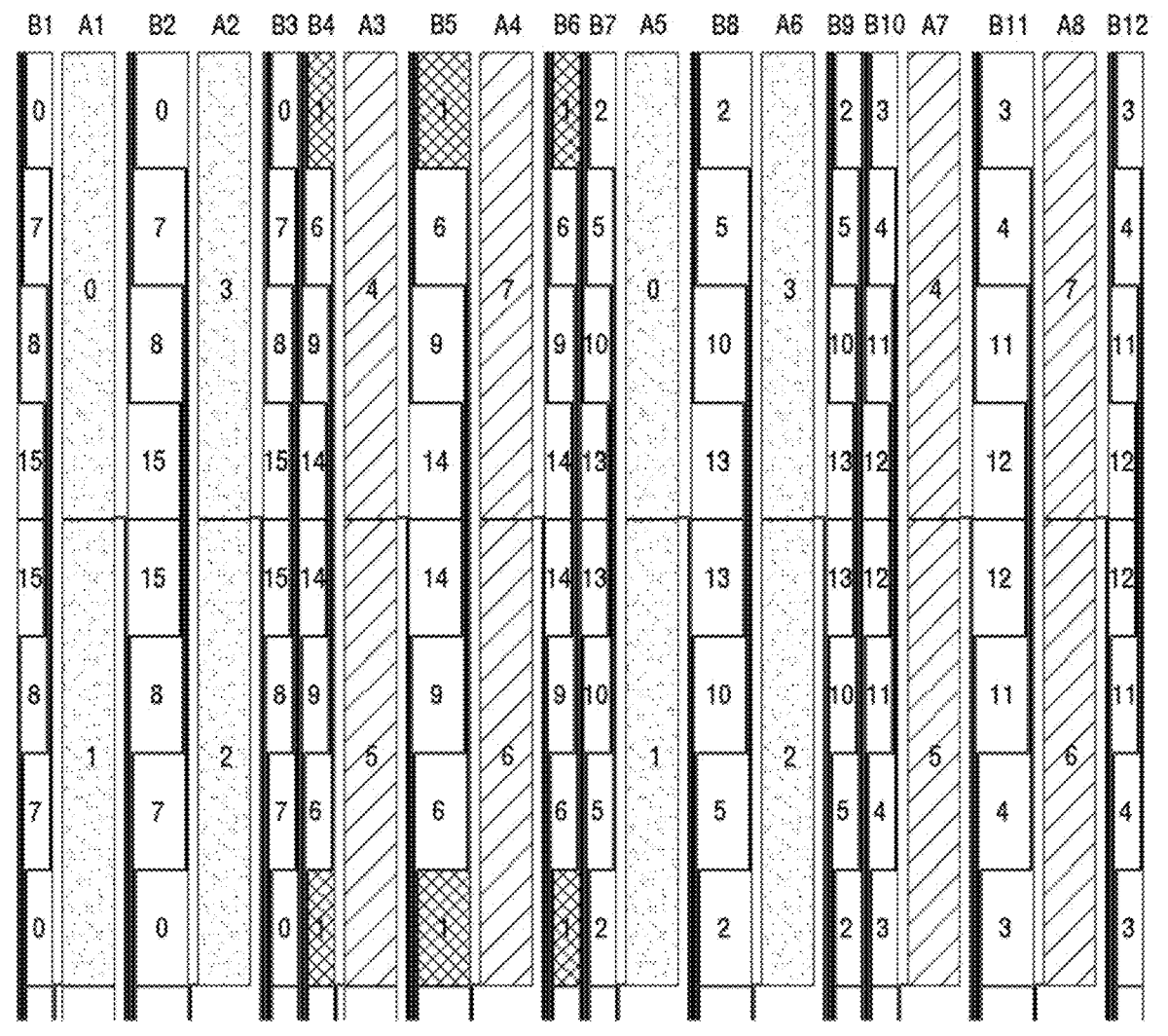

FIG. 15 is an exemplary view for explaining electrodes used as dummy receiving electrodes among a plurality of receiving electrodes of the touch sensor shown in FIG. 8. Referring to FIG. 15, when a driving signal is applied to the 1st driving electrode Tx1, the 4th, 5th, 6th, and 7th receiving electrodes Rx4, Rx5, Rx6, Rx7 become the receiving electrodes Active Rx that form a mutual capacitance Cm with the 1st driving electrode Tx1, and the 0th, 1st, 2nd, and 3rd receiving electrodes Rx0, Rx1, Rx2, Rx3 become dummy receiving electrodes Dummy Rx that do not form a mutual capacitance Cm with the 1st driving electrode Tx1.

The sensing signal output from the Active Rx, Rx4, Rx5, Rx6, Rx7 includes noise information as well as information on an amount of capacitance change due to a touch of an object. Here, the noise information includes display noise (e.g., Zebra noise) information, information on the amount of change according to an image change displayed on the display panel, and information on the amount of change in negative (−) capacitance due to an LGM interference signal generated in a floating state. Therefore, when the sensing signal output from the active Rx, Rx4, Rx5, Rx6, Rx7 is converted into a predetermined level value by a touch sensing unit of the touch input device and output, the information of the mutual capacitance change amount and the noise information is reflected to the output level value. On the other hand, the sensing signal output from the dummy Rx, Rx0, Rx1, Rx2, Rx3 has little information on the amount of change in capacitance due to a touch of an object, and includes only the noise information.

Figure 16:
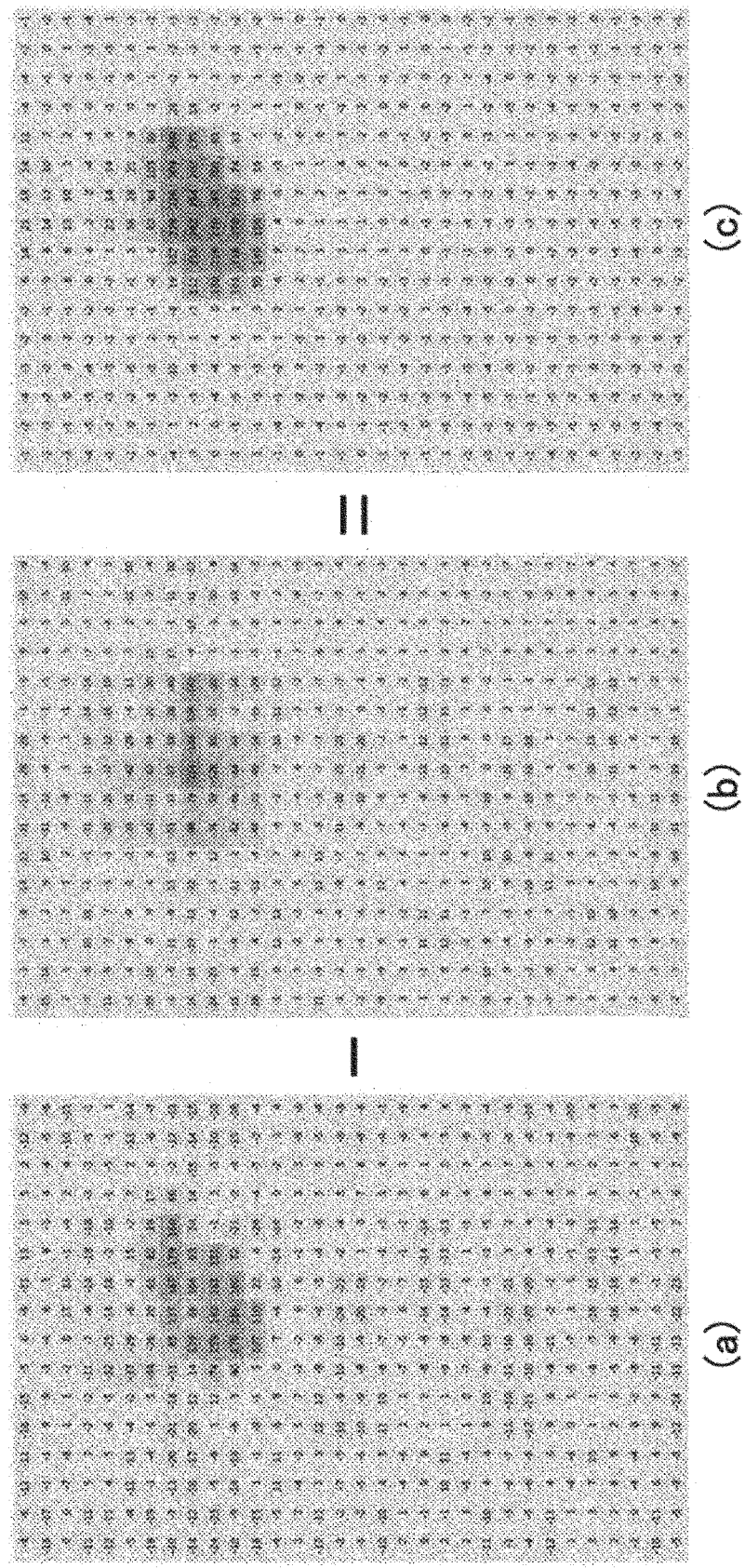
FIG. 16 is raw data of a signal output from a touch input device having the touch sensor shown in FIG. 8.

FIG. 16 is an exemplary view of raw data output from the touch input device having the touch sensor shown in FIG. 8. The raw data shown in FIG. 16(a) are the same as the raw data shown in FIG. 9. That is, the raw data shown in FIG. 9 are raw data based on a sensing signal output from each of the receiving electrodes Active Rx of the nodes forming a mutual capacitance Cm in the touch sensor shown in FIG. 8, and FIG. 16(b) is raw data based on a sensing signal output from each of the receiving electrodes Dummy Rx of nodes that do not form a mutual capacitance Cm in the touch sensor shown in FIG. 8.

FIG. 16(c) shows the raw data obtained by subtracting a sensing signal output from each receiving electrode Dummy Rx of the nodes that do not form a mutual capacitance Cm from a signal output from each of the receiving electrodes Active Rx of the nodes forming a mutual capacitance Cm.

Comparing the raw data of FIGS. 16(c) and 16(a), it can be seen that digital values (or level values) in the touch area where a touch by a real object is made appear relatively higher than the digital values (or level values) of the corresponding part in FIG. 16(a). That is, it can be confirmed that the central part of the touch area has level values of about +250 or more, and thus it can be confirmed that the touch input device can obtain the same or similar level values as in a grip state even in a floating state.

Although separate raw data are not shown, in a sensing signal output from each receiving electrode Active Rx of the nodes forming a mutual capacitance Cm, the raw data obtained by subtracting a preset factor multiplied by a sensing signal output from each of the receiving electrodes Dummy Rx that do not form a mutual capacitance Cm from a sensing signal output from each of the receiving electrodes Active Rx of the nodes forming a mutual capacitance Cm, is also expected to be similar to that of FIG. 16(c).

Figure 17:
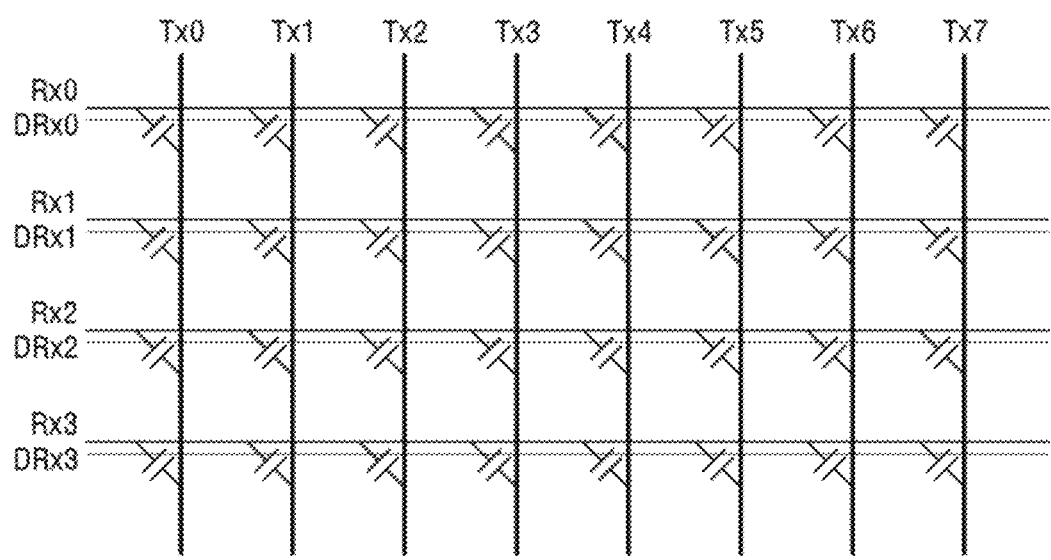
FIG. 17 is a conceptual diagram conceptualizing a touch sensor having a bridge structure.

FIG. 17 is a conceptual diagram conceptualizing a touch sensor having a bridge structure. Referring to FIG. 17, the touch sensor includes a plurality of driving electrodes TX0 to TX7 and a plurality of receiving electrodes RX0 to RX3. In addition, the touch sensor includes a plurality of dummy receiving electrodes DRx0 to DRx3.

A mutual capacitance Cm is formed between the plurality of driving electrodes TX0 to TX7 and the plurality of receiving electrodes RX0 to RX3, but no mutual capacitance Cm is formed between the plurality of driving electrodes TX0 to TX7 and the plurality of dummy receiving electrodes DRx0 to DRx3. Here, in reality, insignificant mutual capacitance may be formed between the plurality of driving electrodes TX0 to TX7 and the plurality of dummy receiving electrodes DRx0 to DRx3, but the insignificant mutual capacitance may be ignored when detecting whether a touch is made.

The touch input device according to an embodiment of the present invention having such a touch sensor may remove noise information, especially information on the amount of change in negative (−) capacitance caused by LGM interference signals by subtracting a sensing signal output from each receiving electrode Rx of nodes that do not form mutual capacitance Cm from a sensing signal output from each receiving electrode Rx of nodes forming mutual capacitance Cm. Here, the touch input device according to an embodiment of the present invention having a touch sensor may subtract a preset factor multiplied by a sensing signal output from each receiving electrode Rx of nodes that do not form mutual capacitance Cm from a sensing signal output from each receiving electrode Rx of nodes forming mutual capacitance Cm.

Figure 18:
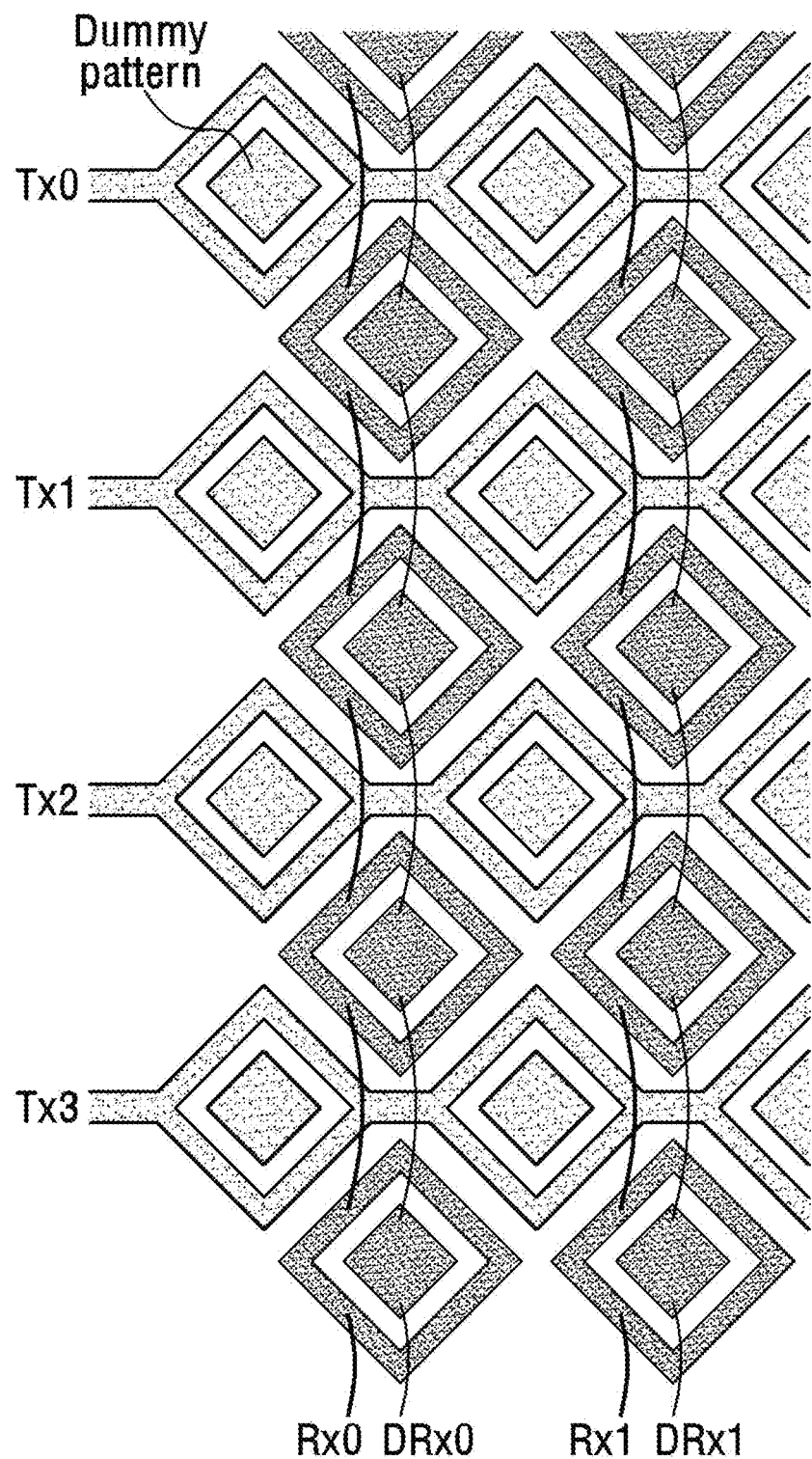
FIG. 18 is a diagram of a touch sensor to which a conceptual diagram of the touch sensor shown in FIG. 17 is applied.

FIG. 18 is a schematic diagram of a touch sensor according to an example to which the conceptual diagram of the touch sensor shown in FIG. 17 can be applied. Referring to FIG. 18, a plurality of driving electrodes Tx0, Tx1, Tx2, Tx3 are arranged in parallel in a horizontal direction, and a plurality of receiving electrodes Rx0, R1 are arranged in parallel in a vertical direction.

Each of the plurality of driving electrodes Tx0, Tx1, Tx2, Tx3 and the plurality of receiving electrodes Rx0, R1 has a diamond shape, and two adjacent driving electrodes and two adjacent receiving electrodes are electrically connected to each other through a conductive connecting unit.

The plurality of driving electrodes Tx0, Tx1, Tx2, Tx3 and the plurality of receiving electrodes Rx0, R1 may be implemented with a metal mesh. Here, a conductive connecting unit connecting the plurality of driving electrodes Tx0, Tx1, Tx2, Tx3 may also be implemented as a metal mesh. A conductive connecting unit connecting the plurality of driving electrodes Tx0, Tx1, Tx2, Tx3 may also be implemented as a metal mesh or as a conductive trace.

Each of the plurality of driving electrodes Tx0, Tx1, Tx2, Tx3 and the plurality of receiving electrodes Rx0, R1 has a dummy pattern electrically insulated therein. The dummy pattern may be formed to reduce the base capacitance of each of the receiving electrodes and the driving electrodes. After forming the pattern of each driving electrode and the pattern of the receiving electrode with the metal mesh, a dummy pattern may be formed by cutting the metal mesh of a portion inside each pattern.

The plurality of dummy receiving electrodes DRx0, DRx1 may be electrically connected to dummy patterns inside the plurality of receiving electrodes Rx0, Rx1. Since the plurality of receiving electrodes Rx0, Rx1 are very adjacent to the plurality of driving electrodes Tx0, Tx1, Tx2, Tx3, a mutual capacitance Cm is formed, but the plurality of dummy receiving electrodes DRx0, DRx1 is positioned relatively far from the plurality of driving electrodes Tx0, Tx1, Tx2, Tx3, and thereby the mutual capacitance Cm is formed to be negligibly small.

Figure 19:
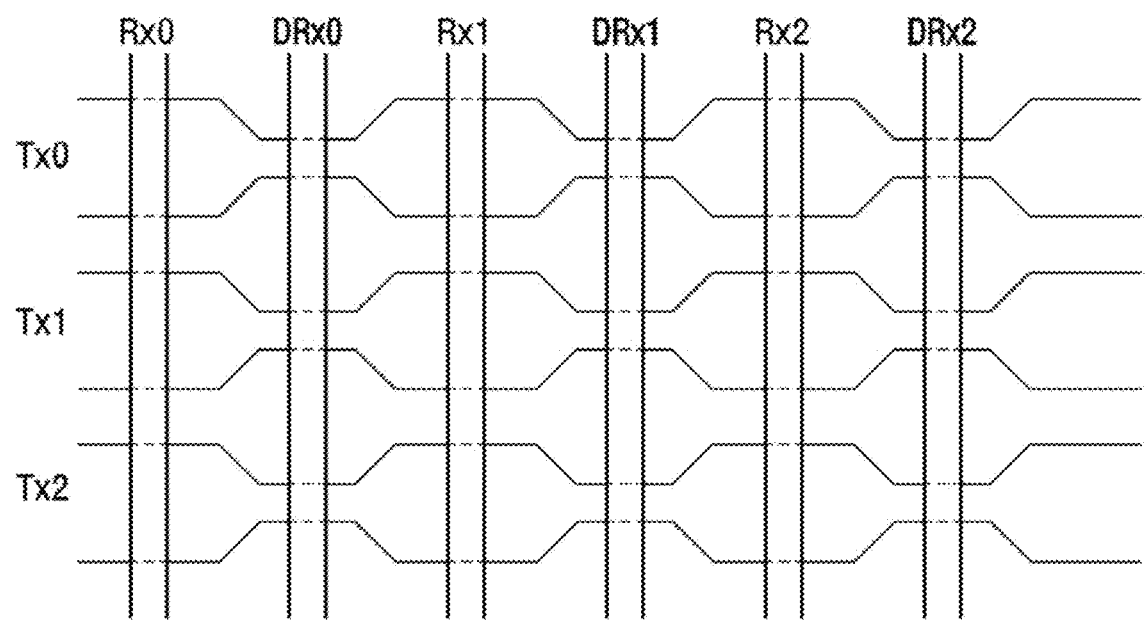
FIG. 19 is a diagram of a touch sensor to which a conceptual diagram of the touch sensor shown in FIG. 17 can be applied.

FIG. 19 is a diagram of a touch sensor according to another example to which the conceptual diagram of the touch sensor shown in FIG. 17 can be applied. Referring to FIG. 19, the plurality of receiving electrodes Rx0, Rx1, Rx2 are arranged in parallel in a horizontal direction, and the plurality of driving electrodes Tx0, Tx1, TX2 are arranged in parallel in a vertical direction. Here, the horizontal and vertical directions may be changed.

Each of the plurality of receiving electrodes Rx0, Rx1, Rx2 and the plurality of driving electrodes Tx0, Tx1, Tx2 has a bar shape. The plurality of receiving electrodes Rx0, Rx1, Rx2 are formed on the first layer, and the plurality of driving electrodes Tx0, Tx1, Tx2 are formed on the second layer. The first layer and the second layer are not disposed on the same plane. For example, a first layer may be disposed on a second layer. An insulating layer may be disposed between the first layer and the second layer.

The plurality of receiving electrodes Rx0, Rx1, Rx2 and the plurality of driving electrodes Tx0, Tx1, Tx2 may be implemented with a metal mesh or a conductive metal.

The touch sensor shown in FIG. 19 includes a plurality of dummy receiving electrodes DRx0, DRx1, DRx2. The plurality of dummy receiving electrodes DRx0, DRx1, DRx2 are formed together on the layer formed of the plurality of receiving electrodes Rx0, Rx1, Rx2, and one dummy receiving electrode DRx0, DRx1, DRx2 may be disposed among the plurality of receiving electrodes Rx0, Rx1, Rx2.

Each of the driving electrodes Tx0, Tx1, Tx2 includes a first region overlapping each of the receiving electrodes Rx0, Rx1, Rx2 and a second region overlapping each of the dummy receiving electrodes DRx0, DRx1, DRx2. Here, the area of the first region is formed to be larger than the area of the second region. In particular, it is preferable that the area of the second region is formed as small as possible. This is to minimize the mutual capacitance between the dummy receiving electrode and the driving electrode. Alternatively, the width of the first region overlapping the receiving electrode in each driving electrode may be designed to be larger than the width of the second region overlapping the dummy receiving electrode under the condition that the shapes of the dummy receiving electrode and the receiving electrode are the same.

Since the plurality of driving electrodes Tx0, Tx1, Tx2 have a relatively large area overlapping the plurality of receiving electrodes Rx0, Rx1, Rx2, a relatively large mutual capacitance Cm is formed, but since the plurality of dummy receiving electrodes DRx0, DRx1, DRx2 overlap the plurality of driving electrodes Tx0, Tx1, Tx2 relatively small, the mutual capacitance Cm between the two is formed to be negligible.

Figure 23:
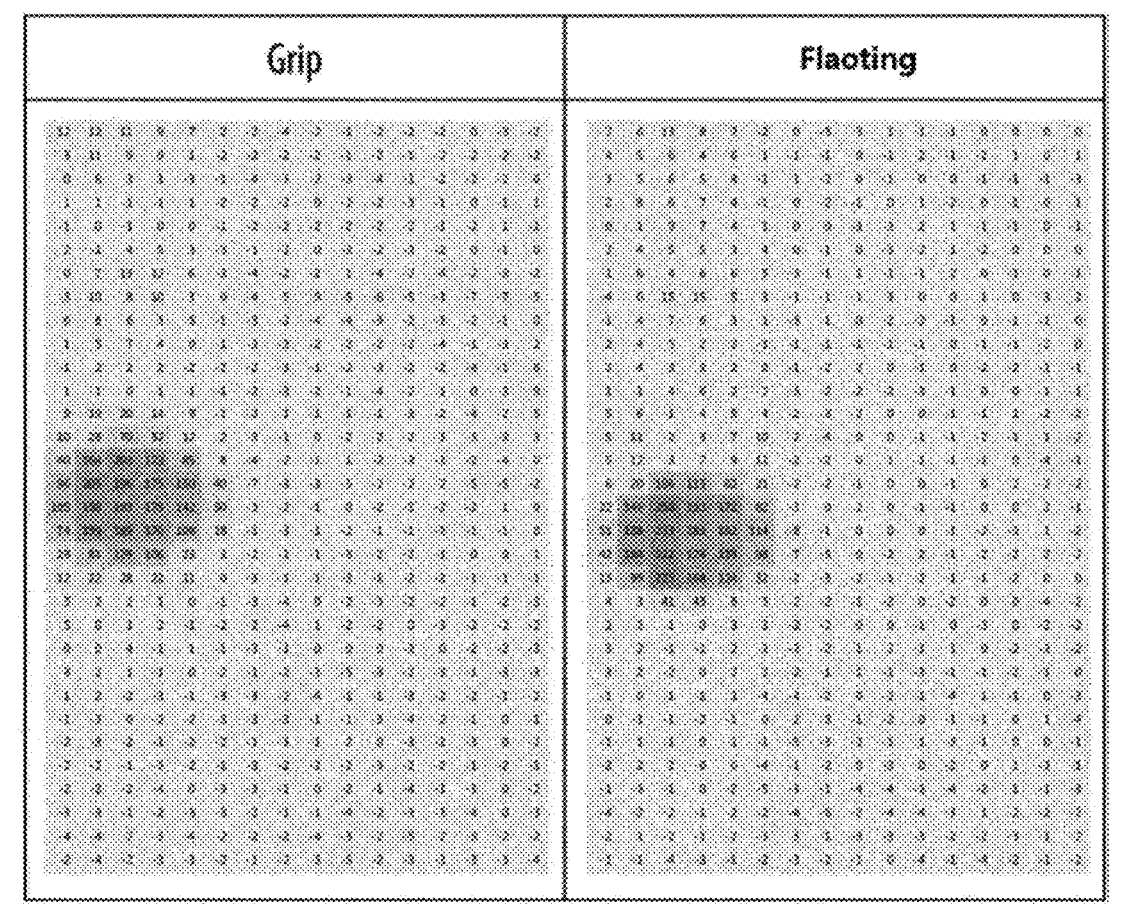

According to an experiment, when the touch input device having the touch sensor shown in FIG. 6 was tested with conductive rods each having a diameter of 15 pi in a grip state and a floating state, raw data in each state could be obtained. FIG. 23 is a graph showing the test result, in which raw data for a grip state is shown on the left, and raw data for a floating state is shown on the right. Comparing the left and right raw data of FIG. 23, it can be seen that the level values of the touch area are significantly lowered by the LGM interference signal generated in the floating state.

In addition, the touch input device having the touch sensor shown in FIG. 8 was tested with conductive rods each having a diameter of 15 pi in a grip state and a floating state, and as described with reference to FIG. 16, raw data in each state could be obtained by subtracting a sensing signal output from the receiving electrode that does not form mutual capacitance with the driving electrode from a sensing signal output from the receiving electrode that forms mutual capacitance with the driving electrode.

Figure 21:
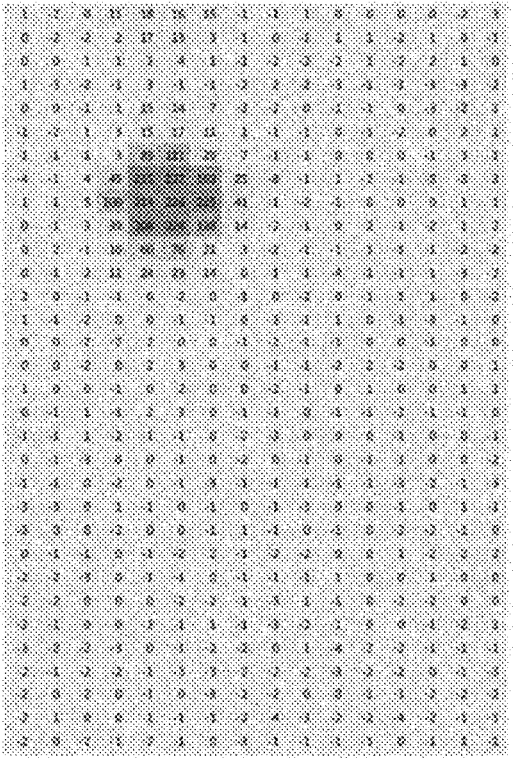
FIG. 21 is raw data output in each of a grip state and a floating state of the touch sensor shown in FIG. 8 when tested with a 15-pi conductive rod.

FIG. 21 is raw data showing the result, in which raw data for a grip state is shown on the left and raw data for a floating state is shown on the right. Comparing the raw data of FIG. 21, it can be seen that the deviation of level values in the touch areas in the grip state and the floating state is significantly lower than in FIG. 20.

Figure 22:
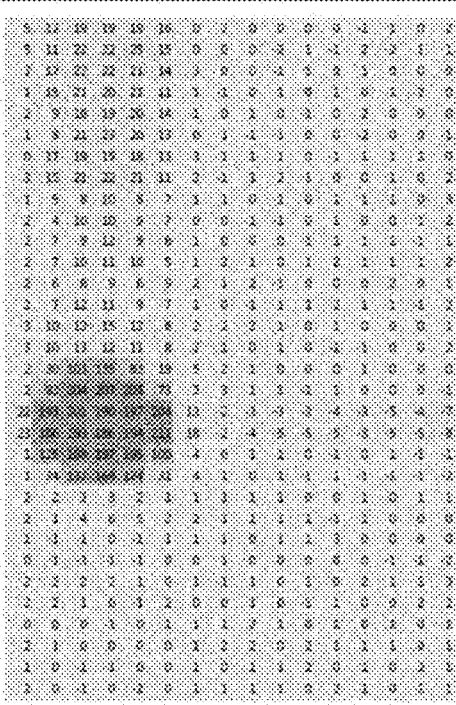
FIG. 22 is raw data output in each of a grip state and a floating state of the touch sensor shown in FIG. 6 when tested with a 20-pi conductive rod.

Furthermore, when the touch input device having the touch sensor shown in FIG. 6 was tested with conductive rods having a diameter of 20 pi in a grip state and a floating state, respectively, raw data in each state could be obtained. FIG. 22 is raw data showing the result, in which raw data for a grip state is shown on the left, and raw data for a floating state is shown on the right. Comparing the left and right raw data of FIG. 22, it can be seen that the level values of the touch area are significantly lowered by the LGM interference signal generated in the floating state.

In addition, the touch input device having the touch sensor shown in FIG. 8 was tested with conductive rods each having a diameter of 15 pi in a grip state and a floating state, and as described with reference to FIG. 16, raw data in each state could be obtained by subtracting a sensing signal output from the receiving electrode that does not form mutual capacitance with the driving electrode from a sensing signal output from the receiving electrode forming mutual capacitance with the driving electrode. FIG. 23 shows the raw data for the result, in which raw data for a grip state is shown on the left and raw data for a floating state is shown on the right. Comparing the left and right raw data of FIG. 23, it can be seen that there is a small deviation of level values in the touch areas in the grip state and the floating state, and there are parts in which the level value in the floating state is even larger.

Figure 24:
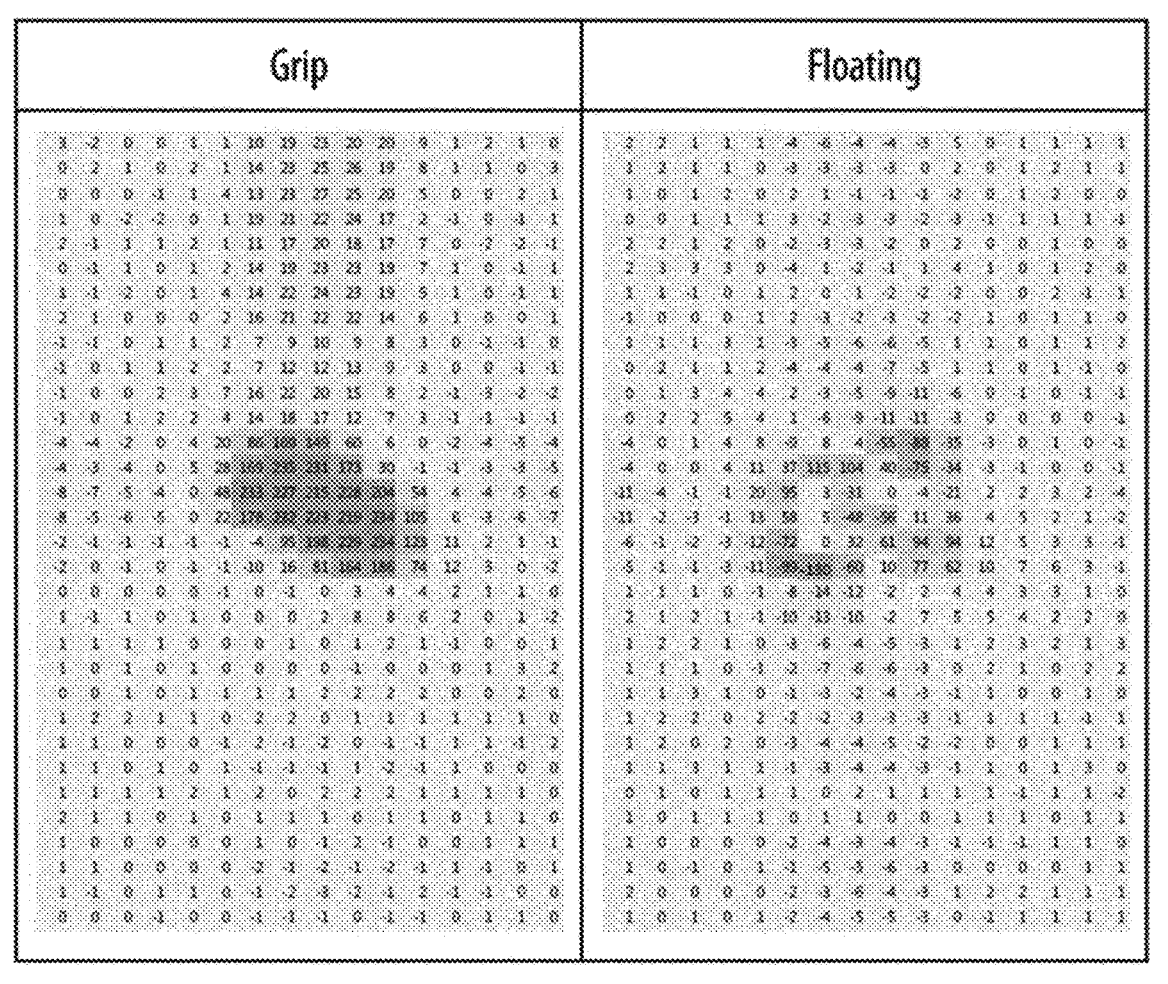

Furthermore, when the touch input device having the touch sensor shown in FIG. 6 was tested with a real human thumb in a grip state and a floating state, respectively, raw data in each state could be obtained. FIG. 24 shows the raw data for the result, in which raw data for a grip state is shown on the left and raw data for a floating state is shown on the right. Comparing the left and right raw data of FIG. 24, it can be seen that the level values of the touch area are significantly lowered by the LGM interference signal generated in the floating state.

Figure 25:
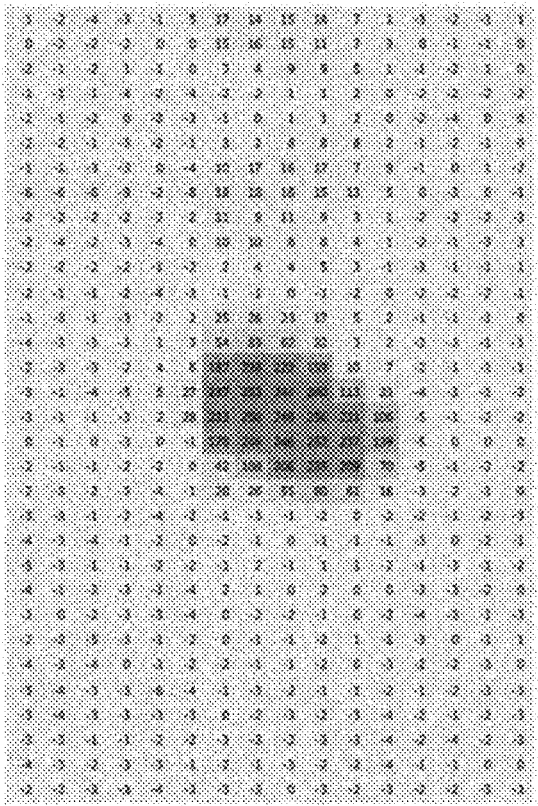
FIG. 25 is raw data output in each of a grip state and a floating state of the touch sensor shown in FIG. 8 when tested with a human thumb.

In addition, the present applicant tested the touch input device having the touch sensor shown in FIG. 8 with conductive rods each having a diameter of 15 pi in a grip state and a floating state, and as described with reference to FIG. 16, raw data in each state could be obtained by subtracting a sensing signal output from the receiving electrode not forming the mutual capacitance with the driving electrode from a sensing signal output from the receiving electrode forming the mutual capacitance with the driving electrode. FIG. 25 is raw data showing the result, in which raw data for a grip state is shown on the left, and raw data for a floating state is shown on the right. Comparing the left and right raw data of FIG. 25, it can be seen that there is almost no deviation in level values in the touch areas in the grip state and the floating state.

The touch input device having a touch sensor according to the embodiment of the present invention described above has a unique advantage of being able to discriminate two or more multi-touches even in a floating state.

Figure 26:
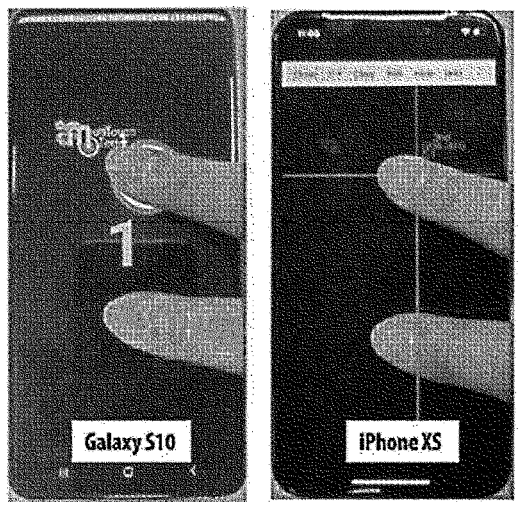
FIG. 26 illustrates a problem in that conventional touch input devices cannot recognize multi-touch by multi-objects when they are in a floating state.
Figure 26:
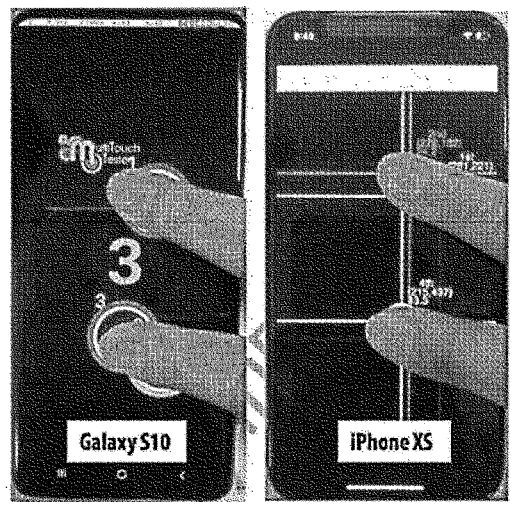

FIG. 26 is a diagram illustrating a blind spot in which a multi-touch by multiple objects cannot be recognized when conventional touch input devices are in a floating state. The situation illustrated in FIG. 26 may assume a case in which a user touches the touch surface of the touch input device with two fingers while the conventional touch input device is mounted on a cradle in a vehicle.

Conventional touch input devices do not recognize one of the two multi-touches as shown in the left figure of FIG. 26, or as shown in the right figure, a user makes two touches, but the touch input device recognizes three or four multi-touches.

Figure 27:
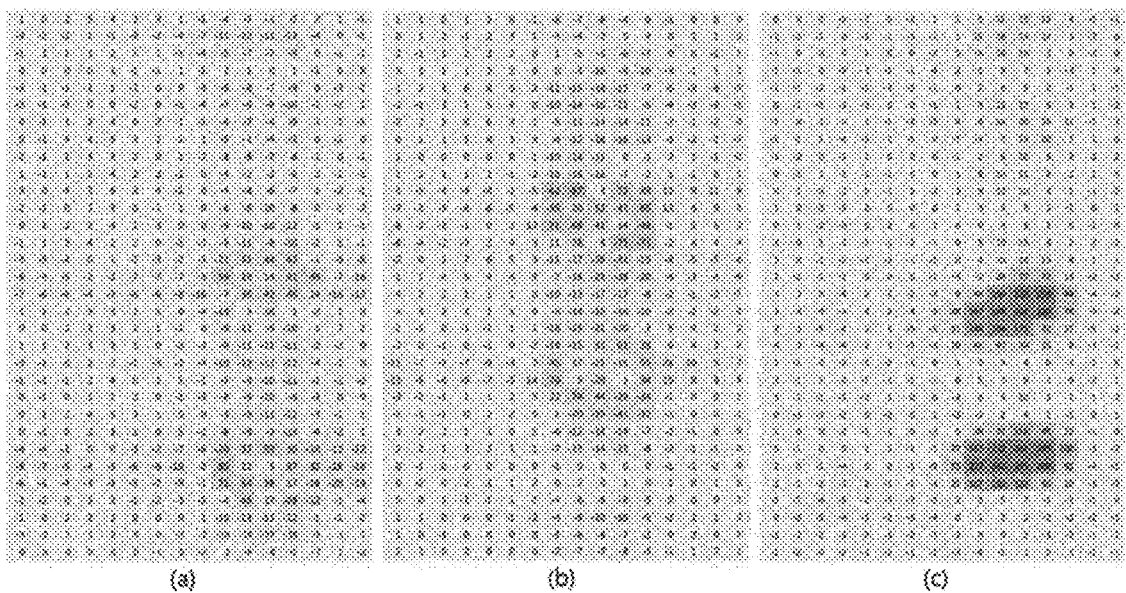
FIG. 27 is raw data for explaining a multi-touch recognition operation of the touch input device according to the present invention.

FIG. 27(a) is raw data when a multi-touch is performed after the touch input device having a double-layered touch sensor is placed in a floating state. Referring to FIG. 27(a), the level values of the multi-touched regions by the LGM interference signal generated in the floating state are relatively low. If the reference level value for determining whether a touch is made is set to 65, the portion touched relatively above is not recognized as a touch, and only the portion touched relatively below will be recognized as a touch, and thereby one of the two touches happens to be not recognized.

FIG. 27(b) is raw data when a multi-touch is performed after the touch input device having the touch sensor shown in FIG. 6 is placed in a floating state. Referring to FIG. 27(b), there is a portion in which the level value of the multi-touched areas is relatively low by the LGM interference signal generated in the floating state. If the reference level value for determining whether a touch exists is set to 65, it will be recognized that three or more touches exist.

FIG. 27(c) shows the raw data when a multi-touch is performed after the touch input device is placed in a floating state and a method of subtracting a sensing signal output from a receiving electrode that does not form mutual capacitance with the driving electrode from a sensing signal output from the receiving electrode forming mutual capacitance with the driving electrode is applied to the touch input device having the touch sensor shown in FIG. 8, as described with reference to FIG. 16. Referring to FIG. 27(c), since relatively large positive (+) level values are output from two multi-touched portions, the touch input device may accurately recognize a user's multi-touch as multi-touch.

In addition, the touch input device having a touch sensor according to the embodiment of the present invention described above has a unique advantage of being able to discriminate a third touch touched together with a cross touch.

Figure 28:
FIG. 28 illustrates a problem in that a third touch is not recognized when a cross touch and the third touch are performed together on a touch surface of a conventional touch input device.
Figure 28:
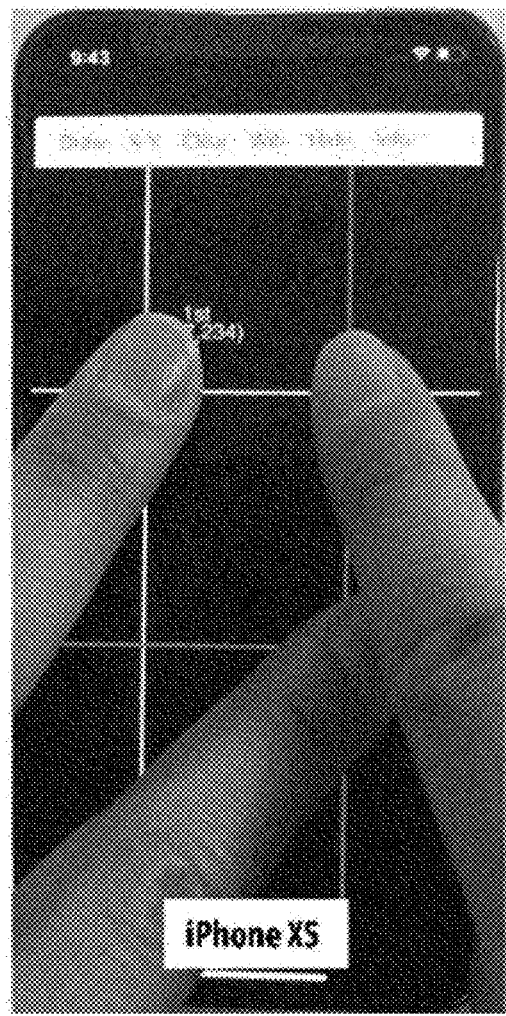

FIG. 28 illustrates a blind spot where the third touch is not recognized when the cross touch and the third touch are combined on a touch surface of the conventional touch input devices.

Figure 31:
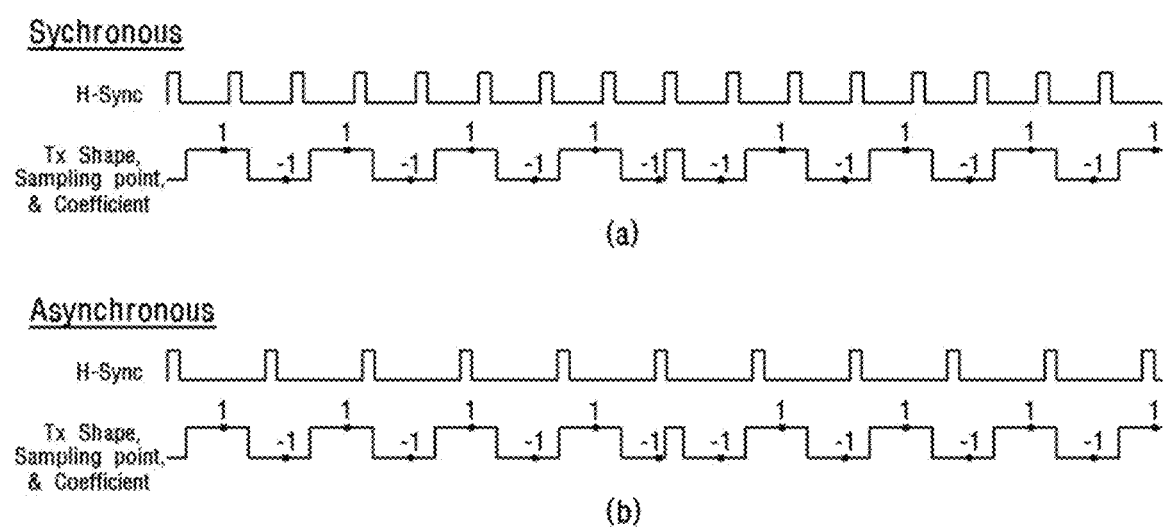
FIG. 31 shows each state of synchronization and asynchronization of a display driving signal and a touch driving signal.

Conventional touch input devices do not recognize the third touch among the two cross touches by two fingers of the left hand and the third touch by one finger of the right hand as shown in the left and right figures of FIG. 31.

Figure 29:
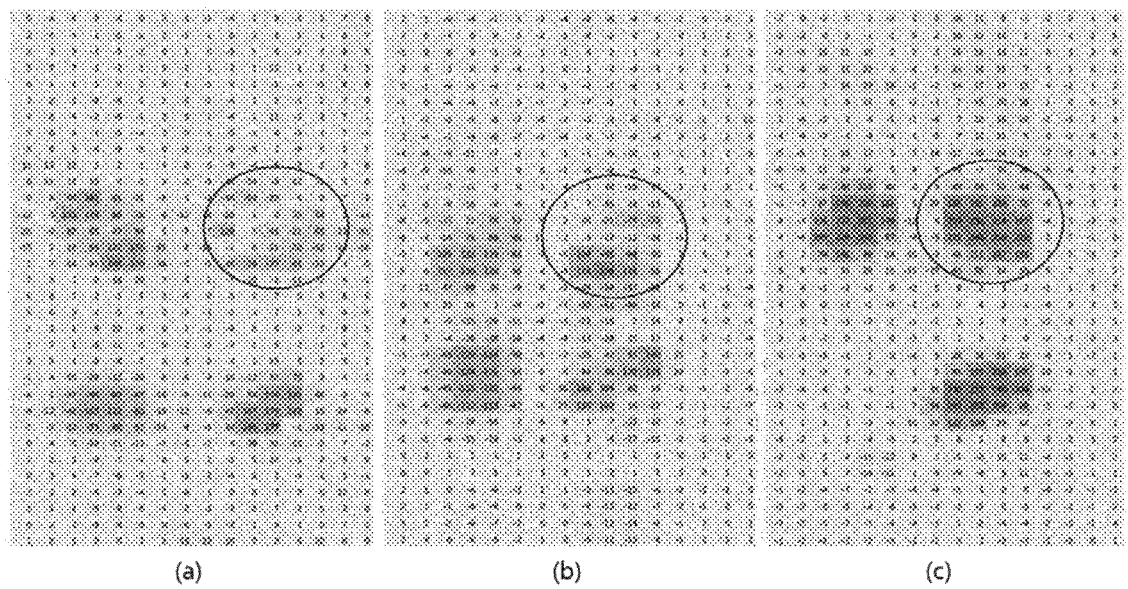
FIG. 29 is raw data for explaining a problem in that the touch input device according to the present invention recognizes a cross touch and a third touch.

FIG. 29(a) is raw data when a cross-touch and a third touch are performed on a touch input device having a double-layered touch sensor. Referring to FIG. 29(a), the level value in the circled area corresponding to the third touch was relatively low compared to the cross-touched portions. Accordingly, the touch input device does not recognize the third touch.

FIG. 29(b) is raw data when a cross touch and a third touch are performed on the touch input device having the touch sensor shown in FIG. 10. Referring to FIG. 32(b), the level value in the circled area corresponding to the third touch was relatively low compared to the cross-touched portions. Accordingly, the touch input device does not recognize the third touch.

FIG. 29(c) shows the raw data when a cross touch and a third touch are performed on the touch input device and a method of subtracting a sensing signal output from a receiving electrode that does not form mutual capacitance with the driving electrode from a sensing signal output from the receiving electrode forming mutual capacitance with the driving electrode is applied to the touch input device having the touch sensor shown in FIG. 8. Referring to FIG. 32(c), it can be seen that relatively large positive (+) level values are output from the two cross-touched portions, and relatively large positive (+) level values are output also from the circled area corresponding to the third touch. That is, the touch input device may recognize all of the third touch along with the cross touch.

Figure 30:
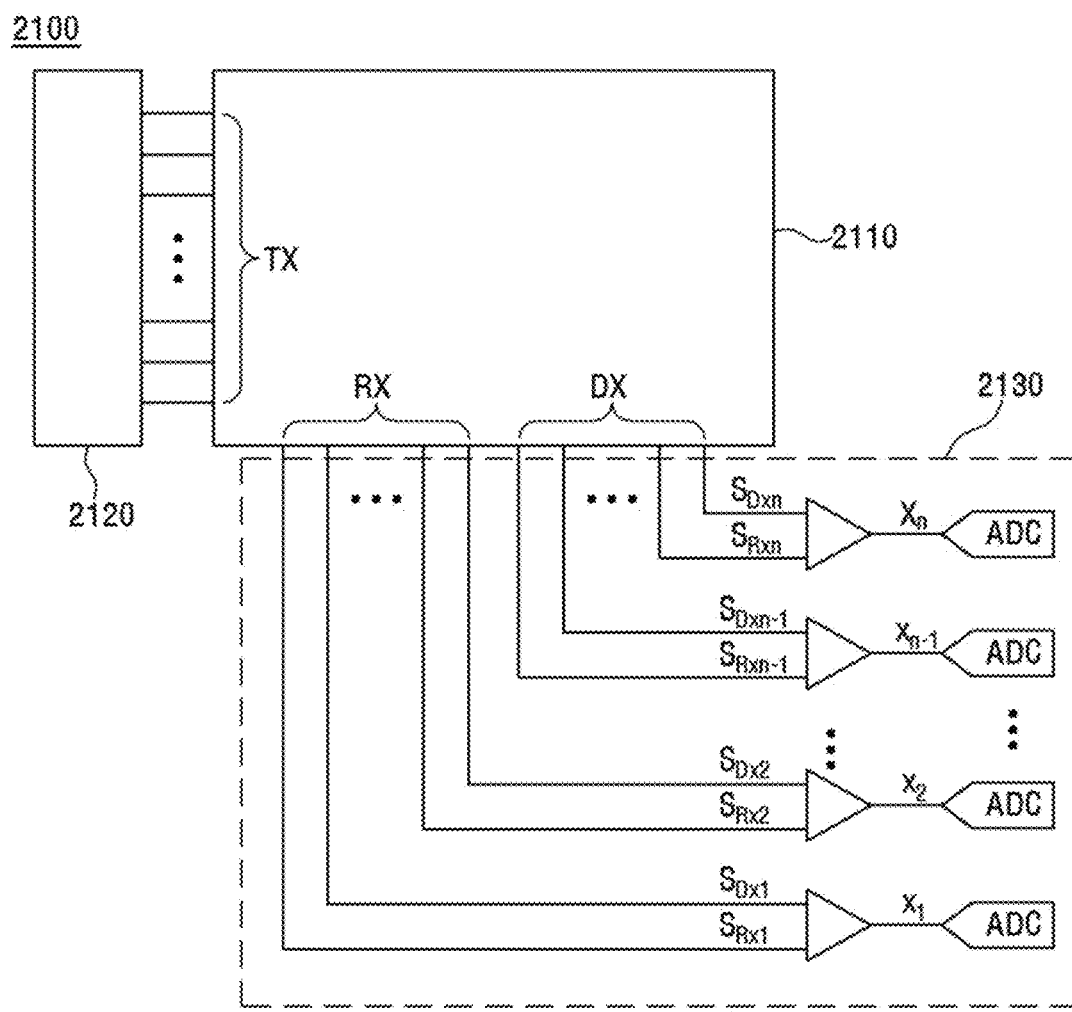
FIG. 30 is a schematic diagram showing the configuration of the touch input device according to the present invention.

FIG. 30 is a schematic diagram showing the configuration of a touch input device according to the present invention. As shown in FIG. 30, the display panel (not shown) and the touch input device 2100 according to the present invention include a touch sensor 2110, a touch driving unit 2120, and a touch sensing unit 2130.

The touch sensor 2110 includes a plurality of driving electrodes TX, a plurality of receiving electrodes RX, and a dummy electrode DX. The dummy electrode DX is an electrode that does not form a mutual capacitance with the driving electrode TX. Accordingly, the dummy electrode DX may be referred to as a dummy receiving electrode. The function, arrangement, and structure of each electrode have been described in detail above, and a description thereof will be omitted herein.

The pattern of the touch sensor 2110 may be formed of various patterns described above. For example, the touch sensor 2110 may include a first layer in which a plurality of driving electrodes TX are disposed and a second layer in which a plurality of receiving electrodes RX are disposed, and the plurality of dummy electrodes DX may be disposed in the second layer to be electrically insulated from the plurality of receiving electrodes RX. In this case, the driving electrode TX may include a first region overlapping the receiving electrode RX and a second region overlapping the dummy electrode DX and larger than the first region.

As another example, in the pattern of the touch sensor 2110, the plurality of driving electrodes TX and the plurality of receiving electrodes RX each may have a diamond pattern, and the dummy electrode DX may be formed of a dummy pattern disposed inside the diamond pattern of the receiving electrode RX or the driving electrode TX.

The pattern of the touch sensor 2110 has been described in detail above, and a detailed description thereof will be omitted herein.

As described above, the touch driving unit 2120 applies a touch driving signal to the touch sensor 2110, more specifically, to the plurality of driving electrodes TX provided in the touch sensor 2110 to perform a touch driving.

In this case, the touch driving signal may not be synchronized with a display driving signal applied to the display panel (not shown). Here, the display driving signal may be a horizontal synchronization signal (H-sync, Horizontal-sync), but is not limited thereto.

FIG. 31 illustrates the states in which a display driving signal and a touch driving signal are synchronized and not synchronized in the touch input device.

In general, as a distance between the electrodes constituting the touch sensor and the electrodes included in the display panel becomes closer, a parasitic capacitance increases. Since the increase in parasitic capacitance increases the capacitance coupling between the electrodes (driving electrode, receiving electrode) constituting the touch sensor and the electrode provided in the display panel, the effect of noise generated in the display panel in driving the touch sensor becomes large. Accordingly, in the conventional touch input device, a driving signal input to the touch value sensor and a driving signal input to the display panel are synchronized as shown in FIG. 34(a) in order to reduce the influence of noise from the display panel. That is, since the display noise is temporally synchronized with the horizontal synchronization signals (H-sync, Horizontal-sync), the touch driving signal can be synchronized during a period in which the horizontal synchronization signal is "0" or "1". In order for the touch driving signal to be synchronized with the display driving signal, the frequency of the touch driving signal may be a frequency n times or 1/n times that of the display driving signal.

However, since the touch input device 2100 according to the present invention can dramatically reduce the influence of noise through the dummy electrode, it can operate using a touch driving signal that is not synchronized with the display driving signal as shown in FIG. 34(b). The frequency of the touch driving signal may be a frequency of n times±α or 1/n times±β (n: a natural number greater than or equal to 2, α≠0, β≠4) of the display driving signal, but is not limited thereto, and a frequency of any value and phase can be applied as long as it is a frequency not synchronized with each other.

The touch input device 2100 according to the present invention employs an asynchronous driving method while achieving a noise reduction effect, and since the asynchronous driving method is employed, it provides an environment in which frequency hopping, which is impossible with a synchronous driving method, can be used.

Referring again to FIG. 31, the touch sensing unit 2130 of the touch input device 2100 according to the present invention detects a touch position of an object input to the touch surface based on a signal output from the touch sensor 2110. In this case, the touch sensing unit 2130 includes a differential sensing circuit unit.

The differential sensing circuit unit is composed of a plurality of differential sensing circuits, and each differential sensing circuit is composed of a first input node, a second input node, a differential amplifier and an A/D converter.

The first node receives a first signal SRX1, SRX2, . . . , SRXn generated between the driving electrode TX and the receiving electrode RX. The first signal SRX1, SRX2, . . . , SRXn−1, SRXn includes a capacitance variation value and a noise value formed between the driving electrode TX and the receiving electrode RX.

The second node receives a second signal SDX1, SDX2, . . . , SDXn−1, SDXn, and the second signal SDX1, SDX2, . . . , SDXn−1, SDXn may vary depending on the pattern and structure of each electrode provided in the touch sensor 2110. In an exemplary embodiment, the second signal SDX1, SDX2, . . . , SDXn−1, SDXn may be generated between the driving electrode TX and the dummy electrode DX.

The second signal SDX1, SDX2, . . . , SDXn−1, SDXn includes a noise value (only), and the noise value includes at least one of a capacitance noise value due to an LGM (Low Ground Mass) interference signal generated by the coupling between the driving electrode and the receiving electrode, or between the dummy electrode and an object, a noise value of the display panel, and a noise value by change of an image displayed on the display panel.

Specifically, the first signal SRX1 generated between the first driving electrode TX1 and the first receiving electrode RX1 and the second signal SDX1 generated between the first driving electrode TX1 and the first dummy receiving electrode DX1 are input to the differential amplifier by the first node and the second node, respectively, and the difference value or the output value amplified by the difference value is input to the first A/D converter to output the first digital signal. The first signal SRX2 generated between the second driving electrode TX2 and the second receiving electrode RX2 and the second signal SDX2 generated between the second driving electrode TX2 and the second dummy receiving electrode DX2 are input to the differential amplifier by the first node and the second node, respectively, and the difference value or the output value amplified by the difference value is input to the first A/D converter to output a second digital signal.

This process is performed for all or some of the electrodes, and the first signal SRXn generated between the nth driving electrode TXn and the nth receiving electrode RXn and the second signal SDXn generated between the nth driving electrode TXn and the nth dummy receiving electrode DXn are input to the differential amplifier by the first node and the second node, respectively, and the difference value or the output value amplified by the difference value is input to the nth A/D converter to output an nth digital signal. The first to nth digital signals are used as basic signals for detecting whether a touch is made and a position thereof.

The differential amplifier subtracts the first signal SRX1, SRX2, . . . , SDXn−1, SRXn and the second signal SDX1, SDX2, . . . , SDXn−1, SDXn, and amplifies and outputs the difference value thereof. The output values X1, X2, . . . , Xn−1, Xn of the differential amplifier are transferred to the A/D converter and converted into a digital signal.

Since the touch input device 2100 according to the present invention uses one differential amplifier per two receiving channels, a power reduction effect can be greatly improved compared to the conventional method of connecting each channel to one differential amplifier.

Meanwhile, since the touch input device 2100 according to the present invention performs a touch driving using a touch driving signal that is not synchronized with a display driving signal, free frequency hopping is possible.

Figure 32:
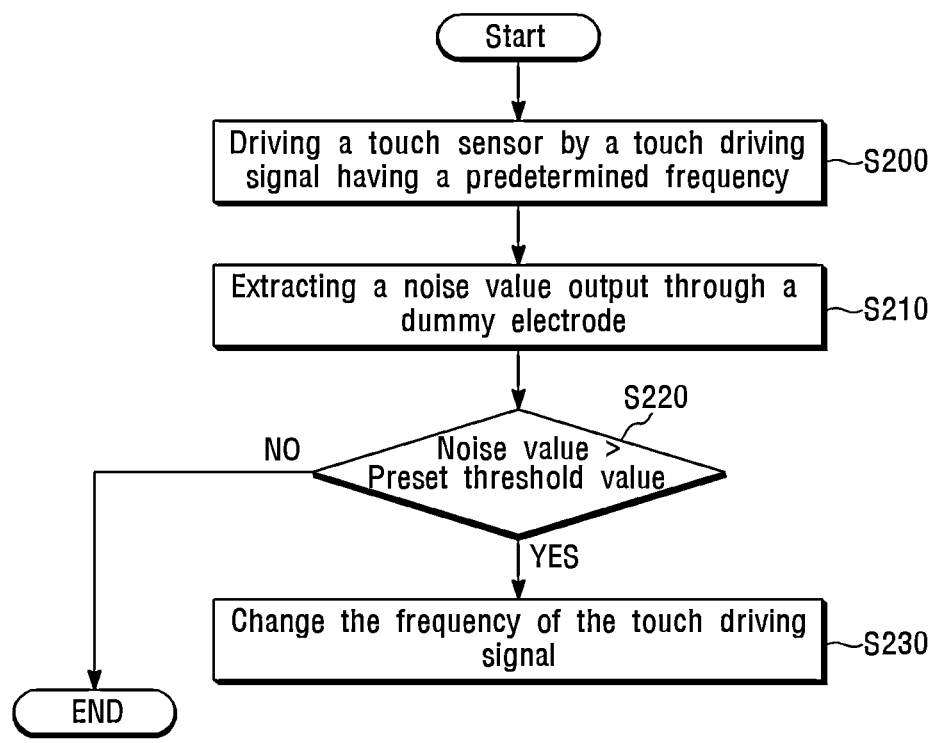
FIG. 32 is a flowchart illustrating a frequency hopping operation in the touch input device according to the present invention.

FIG. 32 is a flowchart illustrating an embodiment of a frequency hopping operation in the touch input device 2100 according to the present invention. This is merely an example, and it is possible to drive the touch input device 2100 according to the present invention at a hopping frequency regardless of a specific condition (existence, size, range, etc. of a noise value).

The touch driving unit 2120 applies a touch driving signal having a first frequency to the touch sensor 2110 to perform a touch driving S200.

At this time, a noise value output through the dummy receiving electrode DX is extracted S210, and it is determined whether the noise value exceeds a preset threshold S220.

In this case, a dummy scan may be used to extract the noise value. The dummy scan scans the noise level at the current effective frequency while driving the touch sensor based on the current effective frequency. Here, the current effective frequency may be the current driving frequency plus or minus the current phase inversion frequency. The dummy scan can be performed by reading a noise level during the phase inversion of the current driving frequency with a period corresponding to the current phase inversion frequency. In another embodiment, the dummy scan may be performed by reading a noise level based on a frequency corresponding to a current effective frequency value.

If the noise value does not exceed the preset threshold S220—NO, the frequency hopping operation is terminated, or it is determined whether the noise value exceeds the preset threshold again after a preset time has elapsed. When the noise value exceeds the preset threshold S220—YES, the frequency of the touch driving signal is changed S230. That is, a touch driving signal hopping to a second frequency having a frequency value different from the first frequency may be applied to the touch sensor 2110.

Since the touch input device 2100 according to the present invention uses an asynchronous driving method, when external environmental noise or CMI noise is applied, frequency hopping is freely possible, thereby fundamentally solving the problem of a synchronous driving method. Of course, since the differential circuit using the dummy receiving electrode is included, a problem caused by signal cancellation can also be fundamentally solved.

Figure 33:
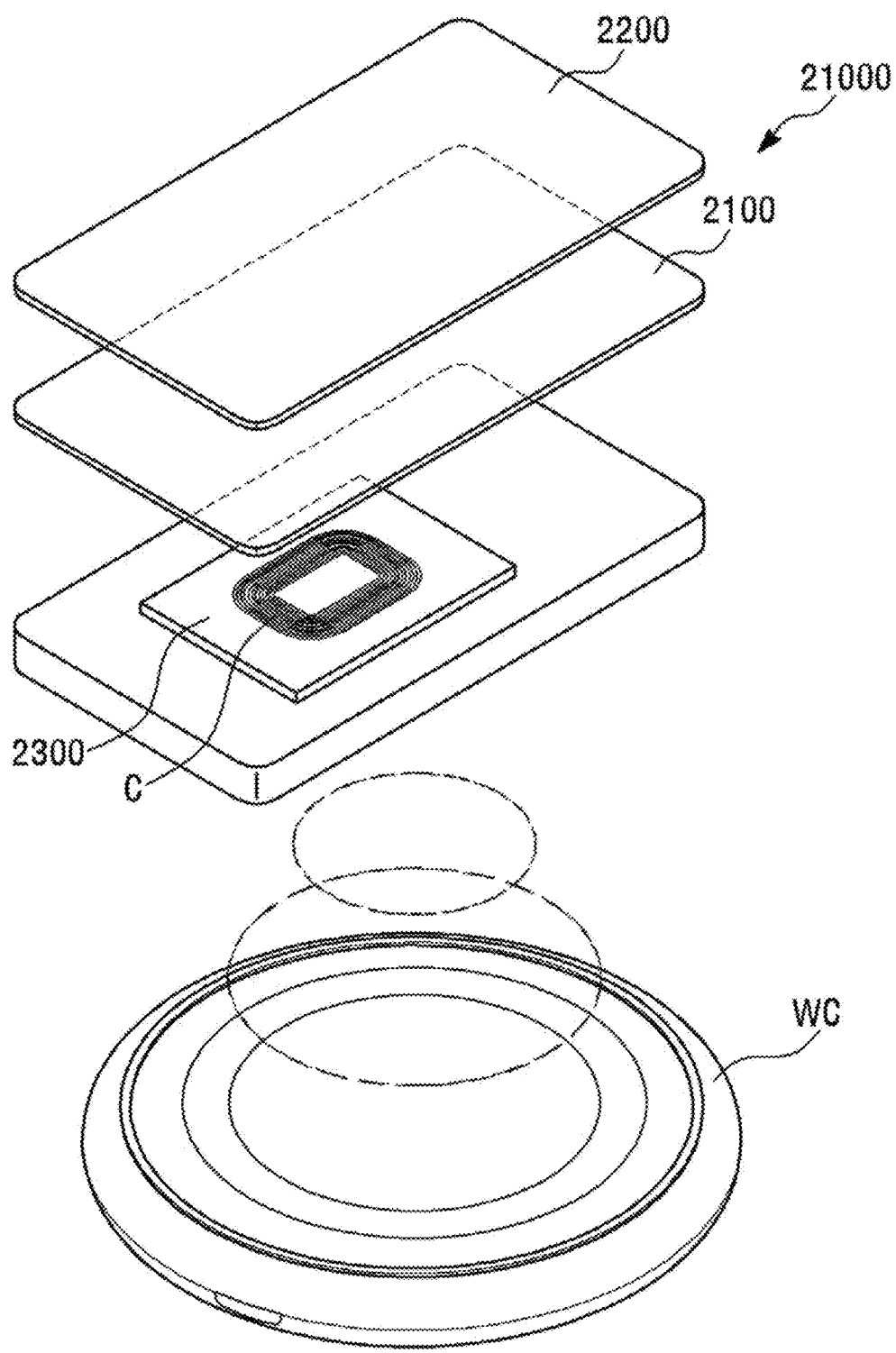
FIG. 33 is a schematic diagram of a smart device according to the present invention.

FIG. 33 is a schematic diagram of a smart device according to the present invention. The smart device 21000 according to the present invention includes a touch input module 2100, a display panel 2200, and a wireless charging module 2300.

Since the touch input module 2100 has been described in detail with reference to FIGS. 30 to 32, a description thereof will be omitted. The display panel 2200 may be a rigid OLED panel or a flexible OLED panel. In the case of a rigid OLED panel, the encapsulation layer and the TFT layer may be formed of glass, and in the case of a flexible OLED panel, the encapsulation layer may be formed of a thin film, and the TFT layer may be formed of a PI film. Meanwhile, the display panel may be an OLED panel or an LCD panel.

The wireless charging module 2300 generates an electric signal by forming a magnetic field with an external wireless charger WC. At this time, the frequency of a magnetic field forming signal used to form a magnetic field of the wireless charging module 2300 and the external wireless charger WC may be different from the frequency of a touch driving signal of the touch input device 2100 according to the present invention.

Figure 34:
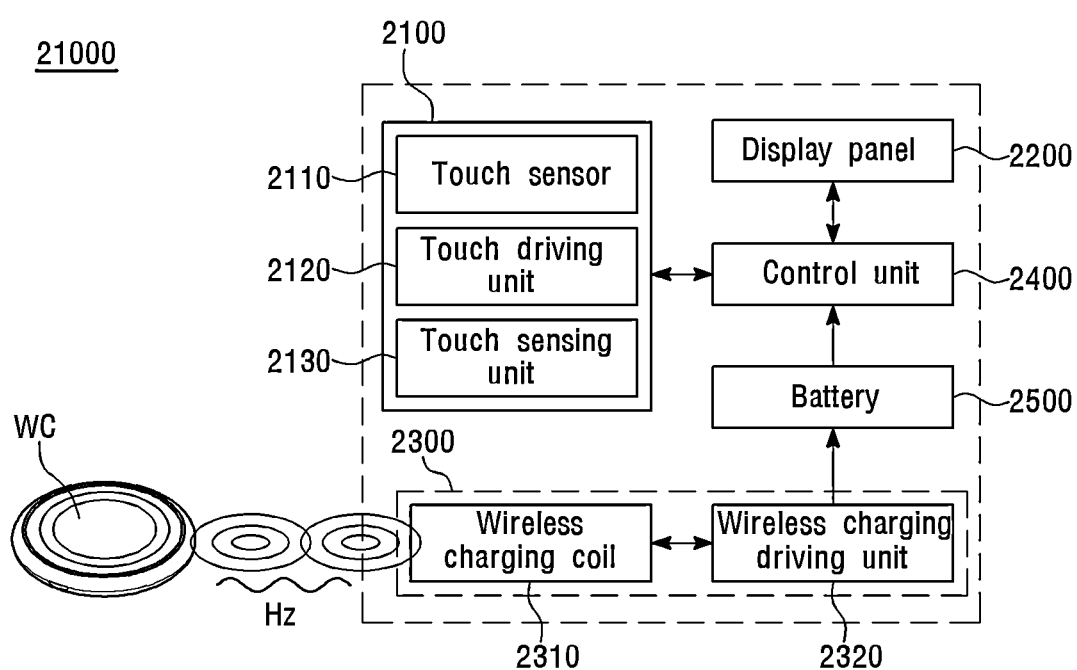
FIG. 34 is a block diagram of a smart device according to the present invention.

FIG. 34 is a block diagram of a smart device according to the present invention. The smart device 21000 according to the present invention may be implemented as a smartphone, a tablet personal computer (PC), a mobile phone, a video phone, an e-book reader, and a desktop personal computer (PC), a laptop personal computer, a netbook computer, a workstation, a personal digital assistant (PDA), a portable multimedia player (PMP), an MP3 player, a mobile medical device, a camera, or wearable devices (e.g., smart glasses, head-mounted-device (HMD), electronic apparel, electronic bracelets, electronic necklaces, electronic accessories, electronic tattoos, smart watches), a smart mirror, a kiosk, and the like. In addition, the smart device 21000 may be implemented as a TV set, a digital video disk (DVD) player, an audio, a refrigerator, an air conditioner, a vacuum cleaner, an oven, a microwave oven, a washing machine, an air purifier, a set-top box, a home automation control panel, a security control panel, a TV box, a game console, an electronic dictionary, an electronic key, a camcorder, or smart home appliance such as an electronic picture frame, but is not limited thereto.

As shown in FIG. 34, the smart device 21000 includes a touch input module 2100, a display panel 2200, a wireless charging module 2300, a control unit 2400, and a battery 2500.

The touch input module 2100, the display panel 2200, and the control unit 2400 have been described in detail above, and descriptions thereof will be omitted herein.

The battery 2500 may be a lithium-ion battery, a nickel-cadmium battery, a nickel-polymer battery, a potassium-ion battery, a sodium-ion battery, a lithium-sulfur battery, a lithium-air battery, a lithium-polymer battery, etc. The battery 2500 may be charged by an electric signal received from the wireless charging driving unit 2320.

The wireless charging module 2300 includes a wireless charging coil 2310 and a wireless charging driving unit 2320. The wireless charging coil 2310 forms a magnetic field with a transmission coil of the external wireless charger WC, and generates an electrical signal through a magnetic induction method (inductive charging) or a magnetic resonance method (resonant inductive coupling). The wireless charging module 2300 charges the battery 2500 by receiving an electrical signal from the wireless charging coil 2310. The wireless charging coil 2310 may be formed in various structures such as a spiral, a cylindrical shape, but is not limited thereto.

In this case, the frequency used when forming the magnetic field of the wireless charging coil 2310 and the transmission coil of the external wireless charger WC may be different from the frequency of the touch driving signal of the touch input device 2100 according to the present invention. In an embodiment, the frequency used in forming the magnetic field, the frequency of the touch driving signal, and the driving frequency of the display may all be different, and all may not be synchronized.

The magnetic induction method is a technology using the electromagnetic induction principle of when generating a magnetic field in the transmission coil of the external wireless charger WC, this magnetic field being induced in the wireless charging coil 2310 to supply current to a device. The transmission coil of the external wireless charger WC and the wireless charging coil 2310 should be located in close proximity, and the magnetic induction method has a great advantage due to its power transmission efficiency of 90% or more.

The magnetic resonance method is a technology using the principle of generating a magnetic field that vibrates at a resonance frequency in the transmission coil of the external wireless charger WC so that energy is intensively transmitted only to the wireless charging coil 2310 designed with the same resonance frequency. The resonance frequency achieves magnetic resonance using a frequency of several MHz to several tens of MHz bands. The magnetic resonance method has the advantage of being able to transfer energy with high efficiency at a longer distance than the magnetic induction method, and has a relatively high efficiency because the energy not absorbed by the wireless charging coil 2310 is radiated into the air and is absorbed again by the transmission coil of the external wireless charger WC without being lost.

The wireless charging driving unit 2320 of the smart device 21000 according to the present invention may use any one of a magnetic induction method and a magnetic resonance method, but is not limited thereto, and various methods such as a microwave method may be used.

Since the smart device 21000 according to the present invention uses an asynchronous driving method, it enables frequency hopping freely when external environmental noise or CMI noise is applied, thereby fundamentally solving the problem of a synchronous driving. Since a differential circuit using a receiving electrode is included therein, the problem caused by signal cancellation can also be fundamentally solved. Furthermore, since it is possible to drive the touch sensor using a frequency different from that of the external wireless charger, when it is determined that interference occurs during wireless charging, the touch sensor can be driven by frequency hopping to have a frequency value different from the frequency of the touch drive signal.

In the case of a synchronous driving with the driving frequency of the wireless charging module, if the touch driving frequency and the driving frequency of the wireless charging module match or are placed in a very similar range, the wireless charging frequency interferes with the touch signal and causes that the touch operation (recognition) may not work properly. That is, there occurs a problem that the touch operation cannot be properly performed during wireless charging.

However, since the smart device 21000 according to the present invention operates asynchronously, when interference occurs as described above, a frequency different from the driving frequency of the wireless charging module can be set as a touch driving frequency through frequency hopping.

Therefore, the touch driving unit 2120 may check whether interference occurs during wireless charging by the wireless charging module 2300, and perform frequency hopping if it is determined that the interference occurs. For example, when the noise value output through the dummy receiving electrode exceeds a preset threshold, the touch driving unit 2120 may perform frequency hopping so as to have a frequency value different from the frequency of the touch driving signal, and accordingly drive the touch sensor 2110.

The Second Embodiment

FIGS. 35 to 38 illustrate a situation in which floating occurs in the process of performing a touch input to the touch input device 1.

Figure 35:
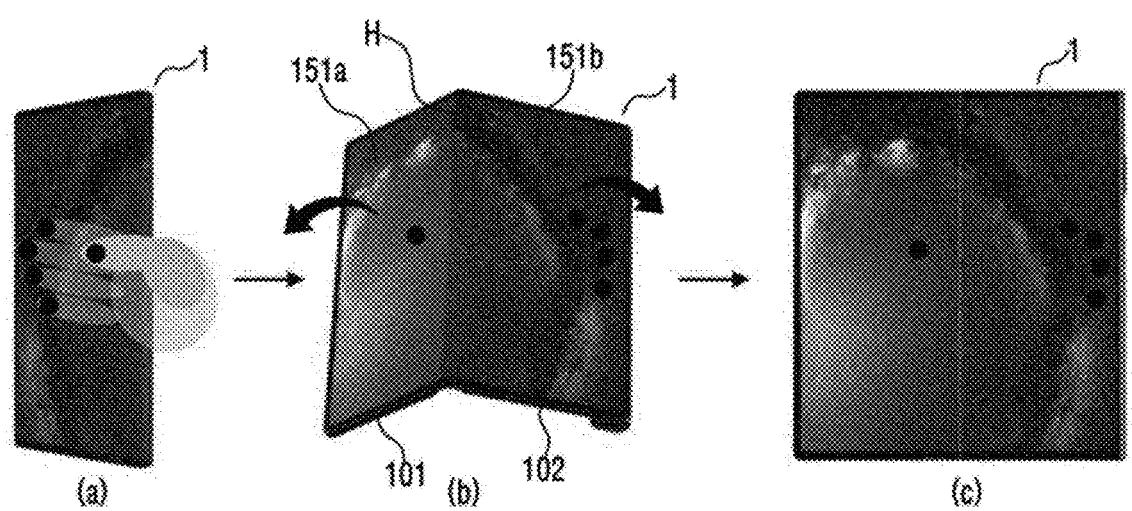
FIGS. 35 to 38 illustrate a situation in which floating occurs in the process of performing a touch input to the touch input device 1.

Specifically, as shown in FIGS. 35 and 36, floating occurs while a user performs a touch input to the touch input device 1, and a situation in which a finger cannot act as a normal ground may occur.

For example, as shown in FIG. 1, when a user grips the touch input device 1 that is folded out around the hinge part H, a single touch is input to the touch surface of the first display area 151*a* by a thumb, and a multi-touch may be simultaneously input to the touch surface of the second display area 151*b* by the remaining four fingers.

That is, a touch intended to be input by the user is a single touch on the first display area 151*a*, but a multi-touch on the second display area 151*b* is input at the same time because the remaining four fingers are required due to a gripping operation.

In this case, since the multi-touch by the four fingers is also input to the front surface of the display module 151 instead of being input to the case of the touch input device 1, signal distortion due to floating among the five touch input points will occur.

Figure 36A:
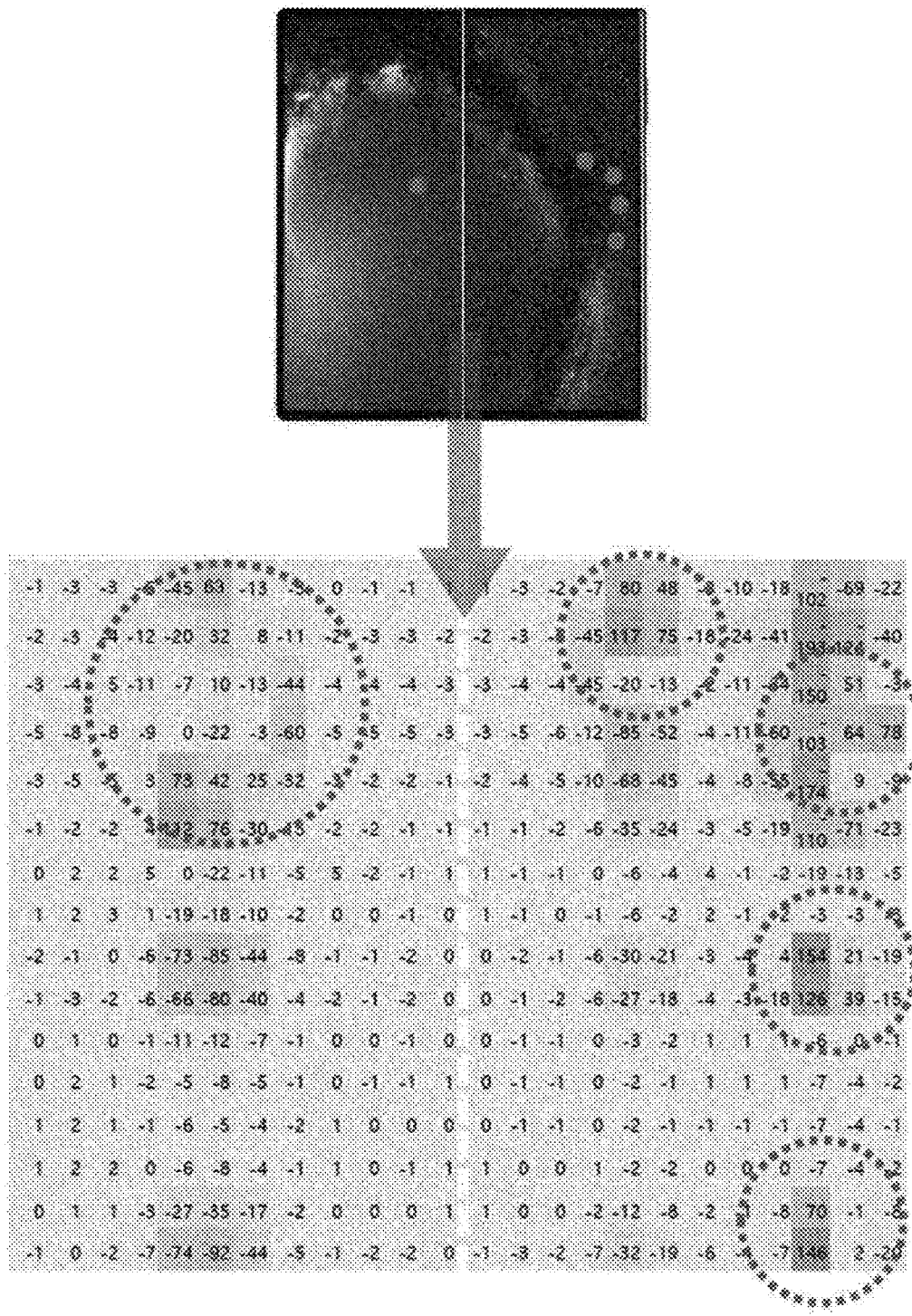
Figure 36B:
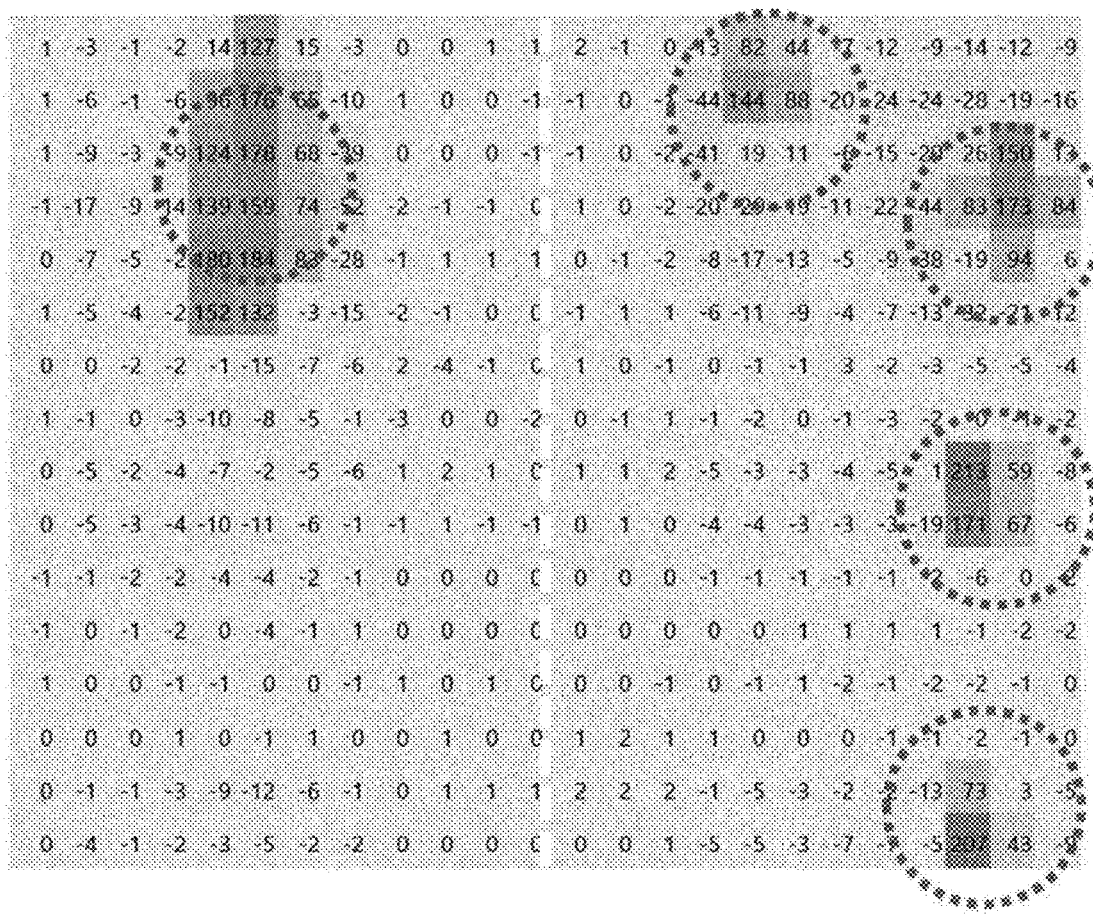

For example, as shown in FIG. 36*a*, looking at the digital values of the single touch portion (circular dotted line) with respect to the touch surface of the first display area 151*a*, it can be seen that the digital values of the central portion are significantly lower than in FIG. 36*b*. This is a signal splitting, and even though the user has actually performed one touch input on the touch surface, the touch input device 1 may erroneously recognize it as two or more touches or as not even one touch. Alternatively, looking at the digital values of the multi-touch portion (circular dotted line) with respect to the touch surface of the second display area 151*b*, it can be seen that the digital values are somewhat lower compared to FIG. 36*b*. This is caused by a low ground mass (LGM) interference signal, which will be described in detail later.

For reference, this phenomenon occurs between the first display area 151*a* and the second display area 151*b* centered on the hinge part H, and when at least one touch input is respectively performed on the touch surface of the first display area 151*a* and the touch surface of the second display area 151*b*, the same/similar phenomenon may occur.

In addition, in various cases in which the out-folded angle is 0 degrees to 180 degrees as shown in FIGS. 35(*a*) to 35(*c*), the signal distortion phenomenon may occur in the same/similar manner.

On the other hand, as shown in FIG. 36, a multi-touch may be input to the touch surface of the first display area 151*a* or the touch surface of the second display area 151*b* by a user with respect to the touch input device 1 folded out around the hinge part H.

In this case, the touch that the user intends to input may be a multi-touch on the touch surface of the first display area 151*a* or the touch surface of the second display area 151*b*.

At this time, since all multi-touches are also input to the front surface of the display module 151, a signal distortion phenomenon due to floating occurs among touch input points.

Figure 38A:
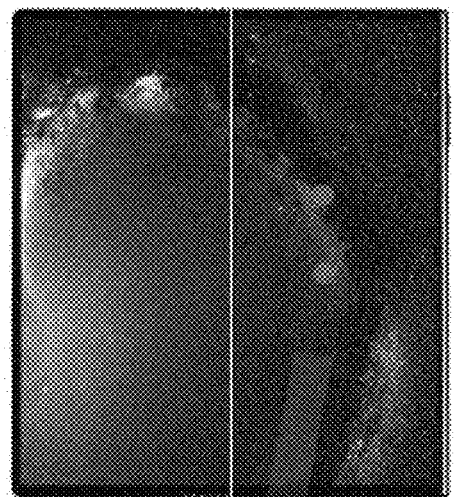
Figure 38A:
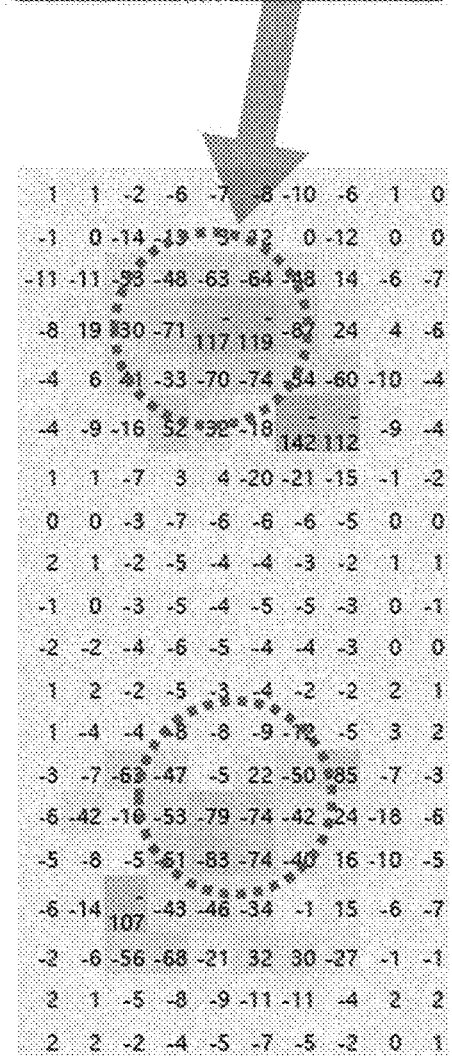

For example, looking at the digital values of the multi-touch portion (circular dotted line) to the touch surface of the second display area 151*b* as shown in FIG. 38*a*, it can be seen that the digital values are somewhat lower than in FIG. 38*b*. Here, signal splitting occurs, or even though the user has actually performed one touch input on the touch surface, the touch input device 1 may erroneously recognize it as two or more touches or that even one touch is not made. This is caused by a low ground mass (LGM) interference signal.

For reference, this phenomenon occurs only within the first display area 11*a* or only within the second display area 151*b* if a plurality of touch inputs are applied only to the touch surface of the first display area 151*a* or only to the second display area 151*b*.

Figure 37:
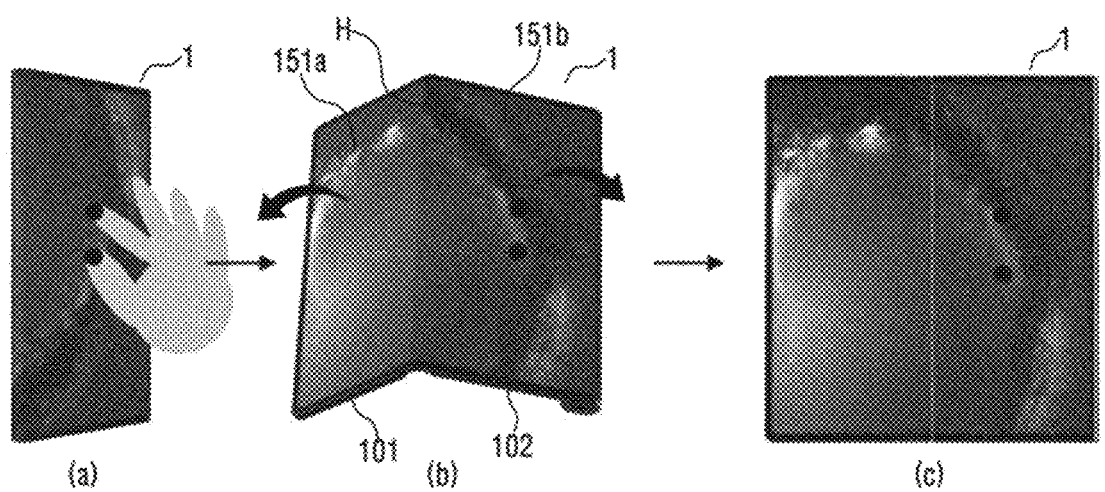

In addition, in various cases in which the out-folded angle is 0 degrees to 180 degrees as shown in FIGS. 37(*a*) to 37(*c*), a signal distortion phenomenon may occur in the same/similar manner.

The present invention has been derived to solve these problems, and a detailed configuration thereof will be described below.

Figure 39A:
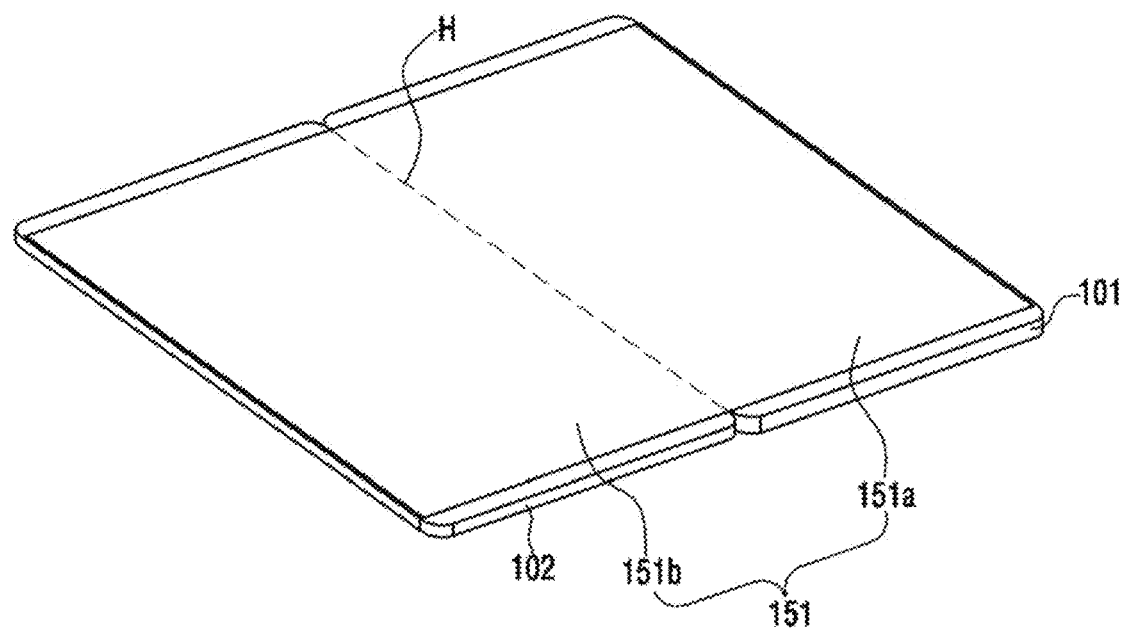
FIG. 39 is a configuration diagram of a touch input device 1 according to an embodiment.

FIG. 39*a* is a block diagram of the touch input device 1 according to an embodiment.

As shown in FIG. 39*a*, the touch input device 1 according to the embodiment may include a first body part 101, a second body part 102, and a display module 151 composed of a first display area 151*a* and a second display area 151*b*.

The first body part 101 and the second body part 102 are coupled by a hinge part H, and the angle between the first body part 101 and the second body part 102 is variable.

The display module 151 may include a first display area 151a positioned on one surface of the first body part 101 and a second display area 151b positioned on one surface of the second body part 102.

The display module 151 may not be provided on the other surfaces of the body parts 101, 102.

The first display area 151a may be supported by the first body part 101, and the second display area 151b may be supported by the second body part 102.

The first body part 101 and/or the second body part 102 may mount electronic components.

The touch input device 1 includes a case (e.g., a frame, a housing, a cover, etc.) forming an exterior. A plurality of cases are combined to form an inner space, and various electronic components are disposed in the inner space.

The display module 151 displays (outputs) information processed by the touch input device 1. For example, the display module 151 may display execution screen information of an application program driven by the touch input device 1 or UI (User Interface) and GUI (Graphic User Interface) information according to the execution screen information.

Figure 44:
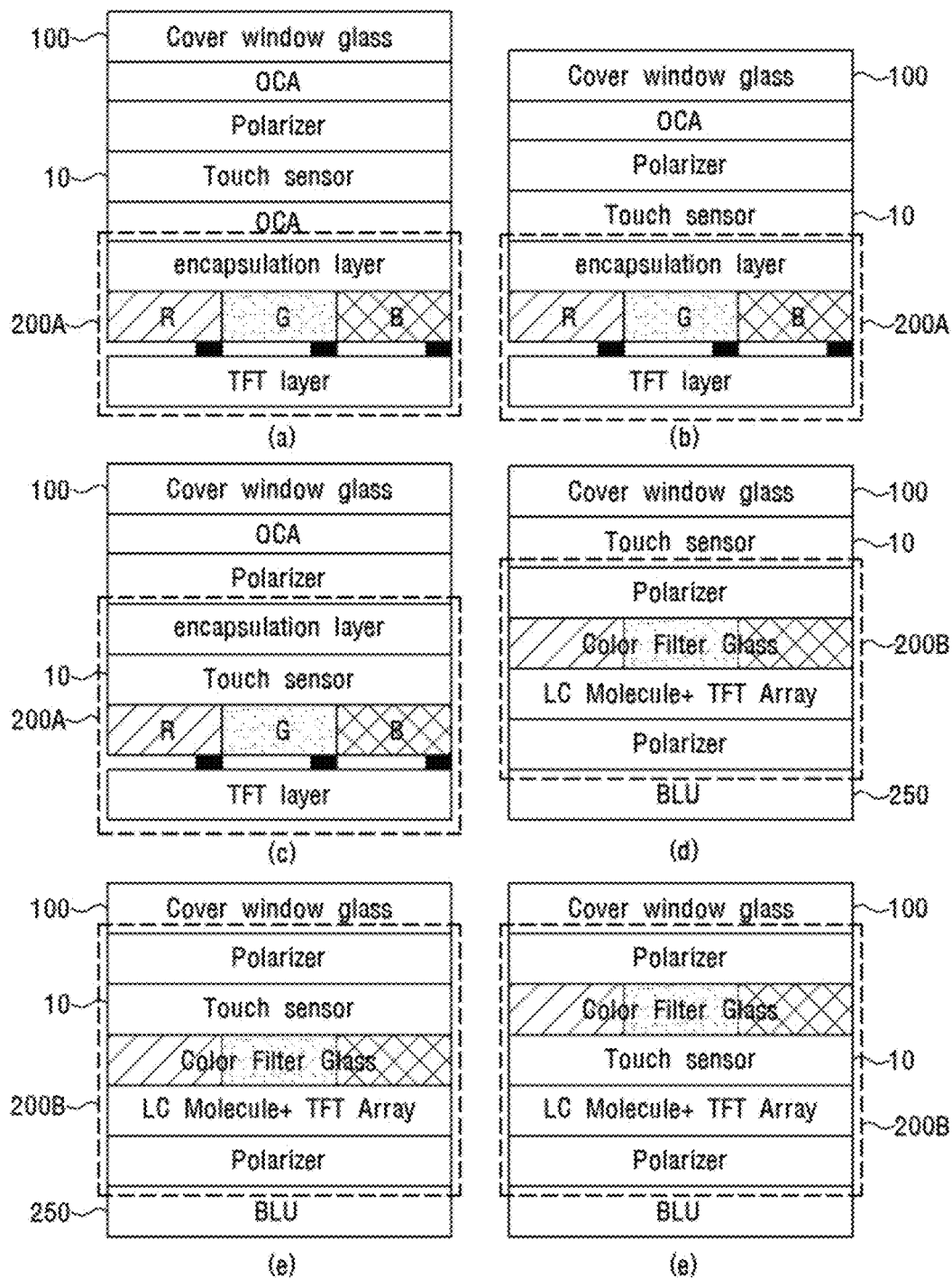
FIG. 44 illustrates the configuration of the display module 151 according to an embodiment.

The display module 151 may include a cover layer 100, a touch sensor 10, and a display panel 200 as shown in FIG. 44. That is, the display module 151 may function as a kind of touch screen.

The touch sensor 10 may be formed on the display panel 200 separately from the display panel 200, or may be formed integrally with the display panel 10 within the display panel 200. A detailed configuration thereof will be described with reference to FIG. 44.

The display panel 200 may be implemented as at least one of a liquid crystal display (LCD), a thin film transistor-liquid crystal display (TFT LCD), an organic light-emitting diode (OLED), a three-dimensional (3D) display, and an e-ink display.

In particular, the present invention may use the display module 151 in which the curvature of the display module 151 can be changed together when the two body parts 151a and 151b rotate around the hinge part H. The display module 151 may be configured to be deformable by an external force. Deformation according to an embodiment may include warping, bending, folding, twisting, rolling, unfolding, etc. of the display module 151.

Depending on the shape of the hinge part H and the coupling method between the body parts 101, 102 and the display module 151, a terminal that is curved in only one direction may be used, or a terminal that is curved in both directions may be used.

Such a deformable display module 151 may be referred to as a flexible display unit. According to an embodiment, the flexible display unit may include various types that can be modified by an external force, such as a foldable display that can be folded or unfolded at a specific angle or curvature, a bendable display that can be bent or unfolded with a specific curvature, or a rollable display that can be rolled into a cylindrical shape.

In particular, according to an embodiment of the present invention, the touch input device 1 may be implemented as a foldable device. In this case, the foldable device can be folded and unfolded based on a folding axis that is the hinge part H.

Folding may exemplify an in-folding state and an out-folding state.

Figure 39B:
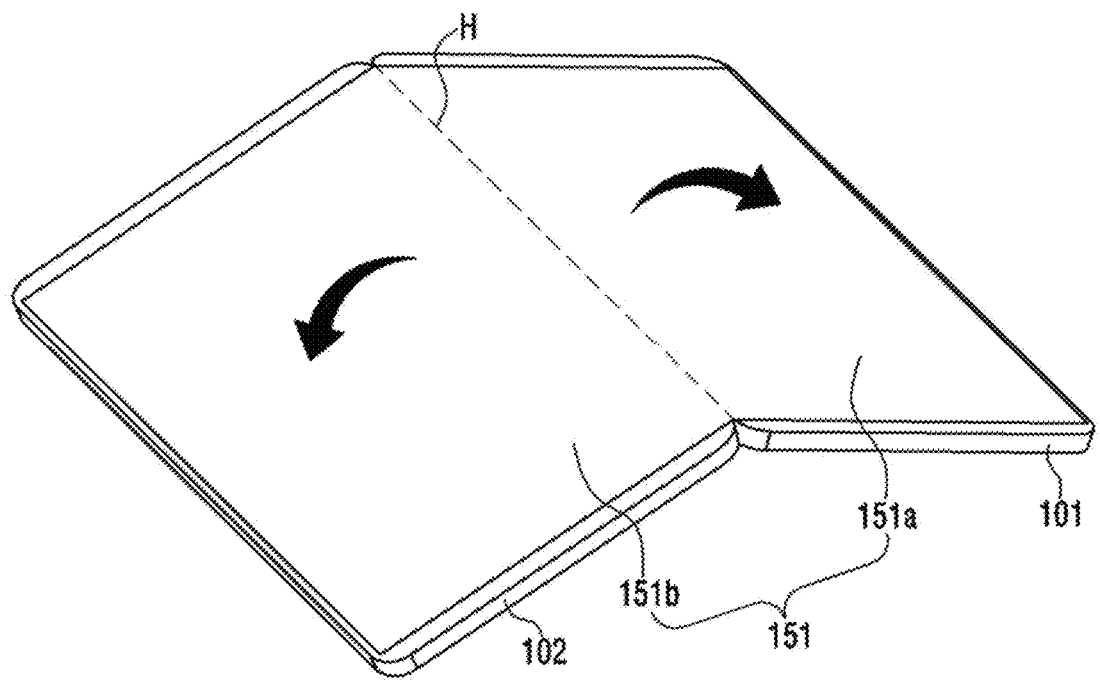

According to an embodiment, the out-folding state as shown in FIG. 39b may be defined as a state in which the front portion of the display module 151 (the upper surface of the cover layer 100) is exposed to the outside. That is, in the out-folding state, it may mean that the front portion of the display module 151 (the upper surface of the cover layer 100) is folded to be located outside the folded foldable device. In the out-folding state, a user may check the externally exposed display screen or content.

The touch input device 1 may further include a deformation sensing unit (not shown).

The deformation sensing unit (not shown) may detect a deformation operation of the touch input device 1 and transmit information on the sensed deformation operation to an AP (processor, not shown). A deformation sensing unit (not shown) may sense a deformation state of the touch input device 1 or the display module 151 that occurs after the touch input device 1 is opened for use.

The deformation sensing unit may detect the deformation operation of the touch input device 1 by collecting and analyzing information on the deformation operation using at least one sensor. Here, the deformation operation may include a folding operation, a bending operation, an unfolding operation, an unbending operation, a rolling operation, and the like, as described above.

In relation to the deformation operation, the deformation sensing unit may obtain information on the deformation position (coordinate value, deformation line), deformation direction, deformation angle, deformation curvature, deformation strength, deformation rate, number of deformations, the time of deformation operation occurrence, deformation operation maintenance time, etc.

The deformation sensing unit may be implemented as a load cell, a bending sensor, an infrared sensor, a pressure sensor, an electromagnetic sensor, or the like, or may be implemented such that the touch sensor 10 detects deformation according to an embodiment.

Figure 40:
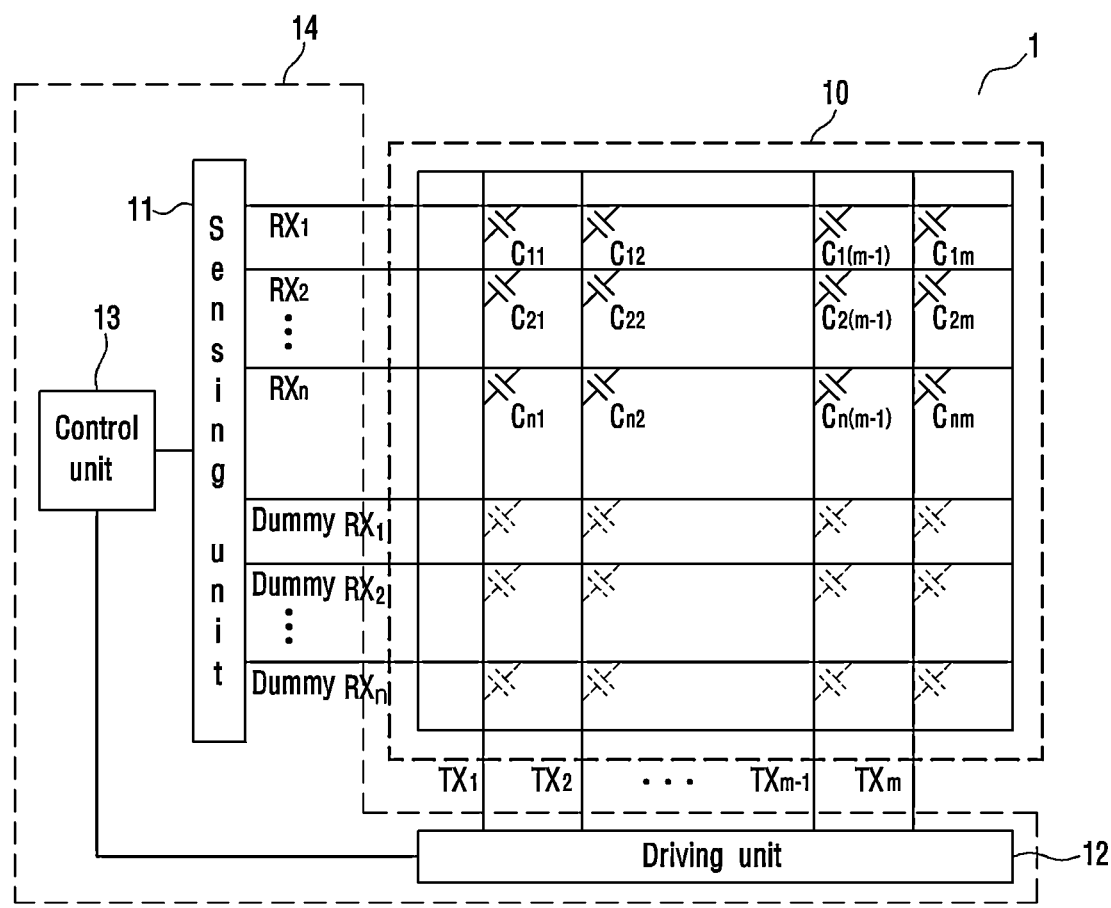
FIG. 40 shows the configuration of the touch sensor 10 according to an embodiment.

FIG. 40 is a block diagram of the touch sensor 10 according to an embodiment.

Referring to FIG. 40, the touch sensor 10 according to the embodiment may include patterns having a predetermined shape, and the predetermined patterns may include a plurality of driving electrodes TX1 to TXm, a plurality of receiving electrodes RX1 to RXn, and a plurality of receiving dummy electrodes Dummy RX1 to Dummy RXn.

For the operation of the touch sensor 10, the touch input device may include the driving unit 12 applying a driving signal to the plurality of driving electrodes TX0 to TXn, and the sensing unit 11 receiving a sensing signal including information on an amount of change in capacitance that is changed according to a touch on the touch surface from the plurality of receiving electrodes RX1 to RXm to detect a touch and a touch position.

In FIG. 40, the driving unit 12 and the sensing unit 11 may constitute a touch detection unit 14 capable of detecting whether the touch sensor 10 is touched and a touch position. Also, the touch detection unit 14 may further include a control unit 13.

According to an embodiment, the touch sensor 10 may receive a plurality of touch inputs of an object on at least one of the first display area 151a and the second display area 151b. In addition, the touch detection unit 14 according to a plurality of touch inputs of the object may subtract at least one second sensing signal output from at least one receiving dummy electrode that do not form mutual capacitance with at least one driving electrode from at least one first sensing signal output from a least one receiving electrode forming mutual capacitance with the at least one driving electrode. In addition, at least one of the plurality of touch inputs input to the touch sensor 10 may be detected based on the corresponding subtraction information.

In particular, according to the present invention, when the touch input device 1 is out-folded and a plurality of touch inputs of an object to at least one of the first display area 151*a* and the second display area 151*b* are made and floated, an LGM interference signal may be removed by subtracting the second sensing signal output from the receiving dummy electrode from the first sensing signal output from the receiving electrode.

That is, touch input information from which the LGM interference signal is removed can be acquired not only when the touch input device 1 is an in-folded state but also when floating occurs by gripping the touch input device 1 in an out-folded state.

In addition, this principle may be applied to the same/similar applications, for example, as illustrated in FIG. 1, even when a single touch is input to the touch surface of the first display area 151*a*, and a multi-touch is simultaneously input to the touch surface of the second display area 151*b* by the remaining four fingers.

That is, the above-described principle may be also applied to the case that the touch that a user intends to input is a single touch on the first display area 151*a*, but since the remaining four fingers need to be held by a gripping operation, a multi-touch on the second display area 151*b* is simultaneously input.

According to another embodiment, the same/similar applications may be applied when at least one or more touch inputs are respectively performed to the touch surface of the first display area 151*a* and the touch surface of the second display area 151*b*.

On the other hand, this principle may be applied to the same/similar applications, for example, as illustrated in FIG. 37, even when there is a plurality of touch inputs only on the touch surface of the first display area 151*a* or only on the touch surface of the second display area 151*b*.

In addition, this principle may be equally/similarly applied to various cases in which an out-folding angle is 0 degrees to 180 degrees as shown in FIGS. 35 and 37(*a*) to 37(*c*).

The first sensing signal according to an embodiment may include information on the amount of change in mutual capacitance generated between an arbitrary driving electrode and a predetermined receiving electrode generated by a touch of an object, and information 1 on capacitance that reduces the amount of change in mutual capacitance caused by coupling among an object and an arbitrary driving electrode and/or a predetermined receiving electrode.

Meanwhile, the sensing unit 11 according to an embodiment may output a second sensing signal from a predetermined receiving dummy electrode. The predetermined receiving dummy electrode may not form mutual capacitance with any driving electrode. Here, in reality, a slight mutual capacitance may be formed, but the insignificant mutual capacitance may be ignored when detecting whether a touch is made.

The second sensing signal according to an embodiment may include information 2 on capacitance that reduces the amount of change in mutual capacitance generated by coupling among an object and an arbitrary driving electrode and/or a predetermined receiving dummy electrode generated by a touch of the object.

The above 1 and 2 may be referred to as LGM interference signals, and the principle of generating the LGM interference signals will be described later.

The sensing unit 11 may acquire a change amount of pure mutual capacitance occurring between an arbitrary driving electrode and a predetermined receiving electrode by using the first sensing signal and the second sensing signal.

In the case of the present invention, through such a method, it is possible to suppress or even remove local noise, such as an LGM interference signal, from a signal detected from the receiving electrode, thereby further improving touch sensitivity.

In FIG. 40, a plurality of driving electrodes TX1 to TXm, a plurality of receiving electrodes RX1 to RXn, and a plurality of receiving dummy electrodes Dummy RX1 to Dummy RXn of the touch sensor 10 constitute an orthogonal array. However, the present invention is not limited thereto, and the plurality of driving electrodes TX1 to TXm, the plurality of receiving electrodes RX1 to RXn, and the plurality of receiving dummy electrodes Dummy RX1 to Dummy RXn may have any number of dimensions and application arrangements thereof, including diagonal, concentric and three-dimensional random arrangements, and the like. Here, n, l, and m are positive integers, and may have the same or different values, and sizes may vary according to embodiments.

Figure 42:
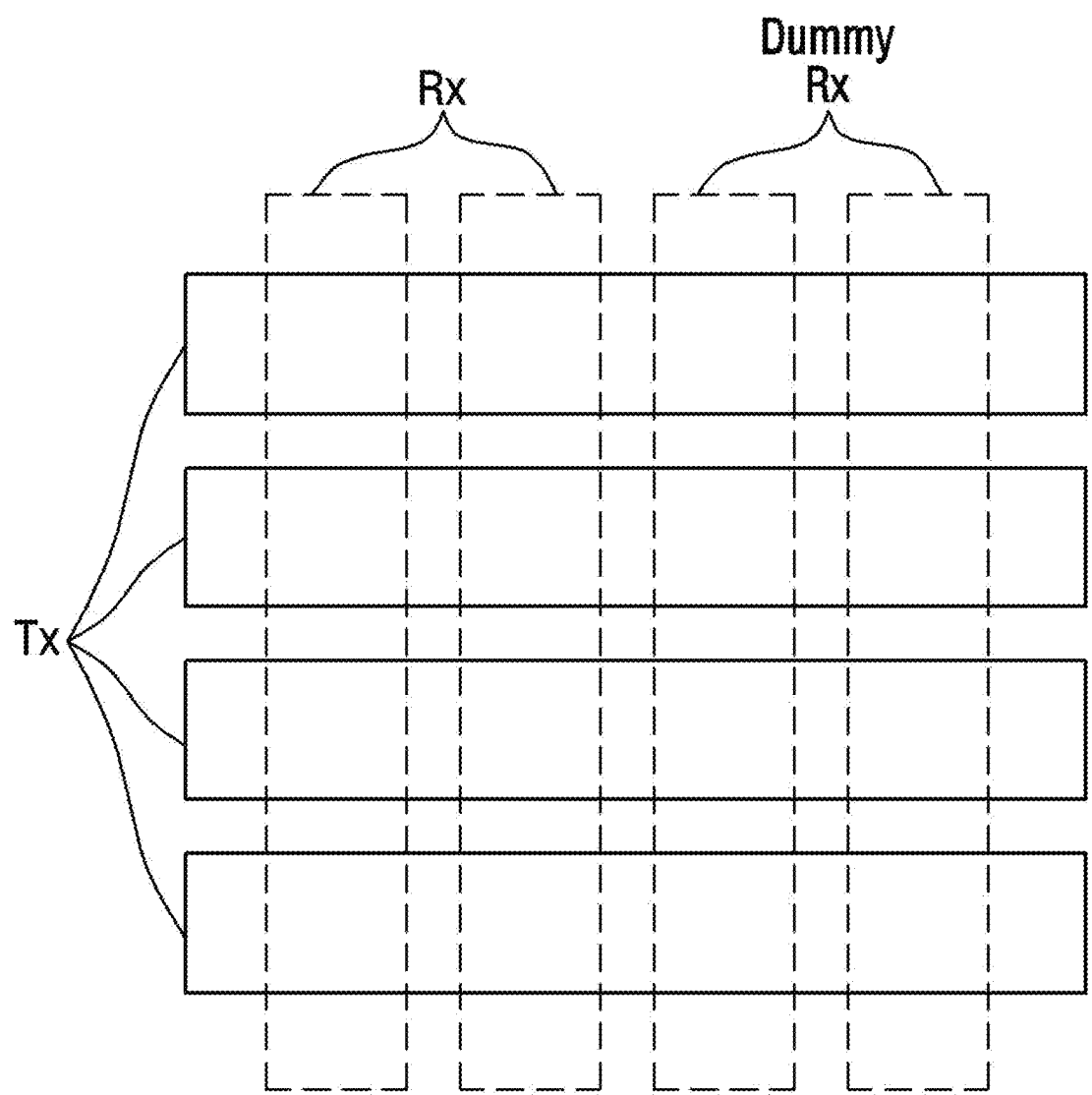
FIGS. 42 and 43 show the configuration of the touch sensor 10 disposed in a double layer according to an embodiment.
Figure 43:
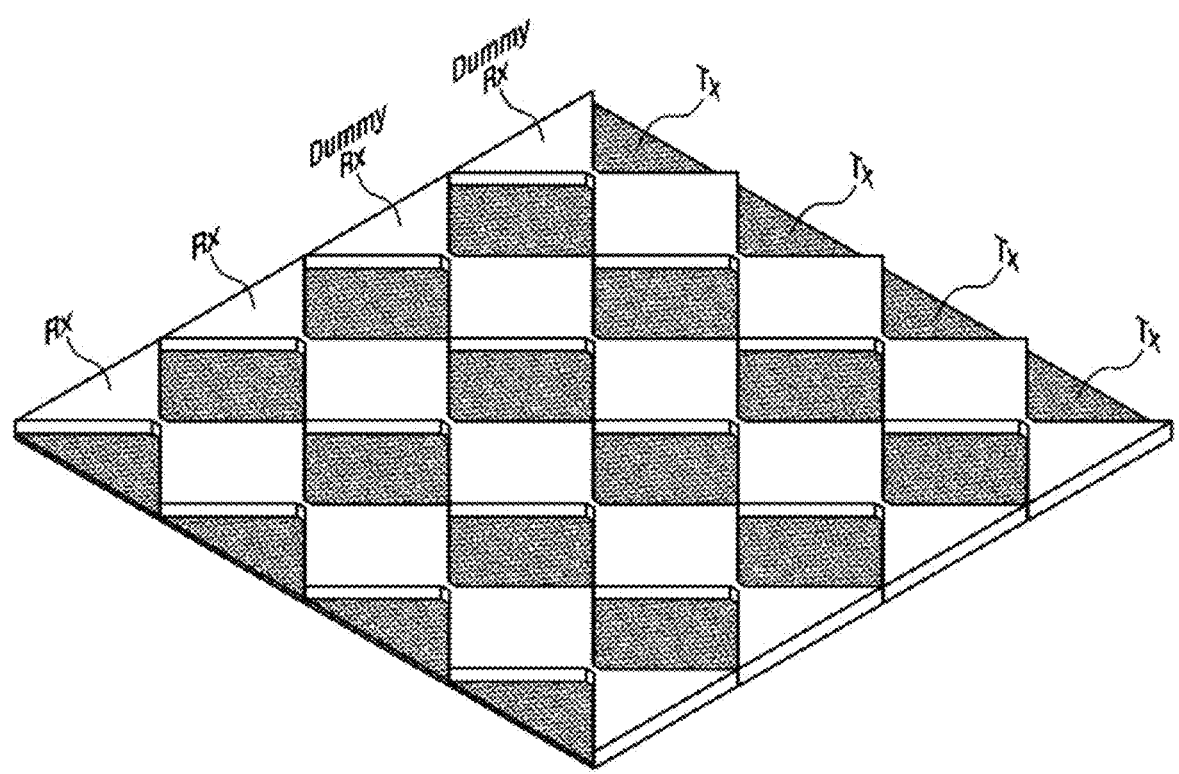

The plurality of driving electrodes TX1 to TXm, the plurality of receiving electrodes RX1 to RXn, and the plurality of receiving dummy electrodes Dummy RX1 to Dummy RXn may be arranged to cross each other, respectively, as shown in FIGS. 42 to 43. Specifically, the plurality of driving electrodes TX1 to TXm may extend in a first axis direction, and the plurality of receiving electrodes RX1 to RXn and the plurality of receiving dummy electrodes Dummy RX1 to Dummy RXn may be arranged to extend in a second axis direction intersecting the first axis direction.

As shown in FIGS. 42 to 43, the plurality of driving electrodes TX1 to TXm, the plurality of receiving electrodes RX1 to RXn, and the plurality of receiving dummy electrodes Dummy RX1 to Dummy RXn may be formed on different double layers. For example, it may be a bar pattern as shown in FIG. 42, or a diamond pattern as shown in FIG. 43. Here, the layer on which the plurality of driving electrodes TX1 to TXm is formed may be disposed on the layer on which the plurality of receiving electrodes RX1 to RXn are formed, or may be disposed oppositely. An insulating layer for preventing a short circuit between the plurality of driving electrodes and the plurality of receiving electrodes may be formed between the double layers.

For reference, in FIGS. 40, 42, and 43, the plurality of receiving electrodes RX1 to RXn are all disposed together and then the plurality of receiving dummy electrodes Dummy RX1 to Dummy RXn are exemplified, but according to another embodiment, at least one of the plurality of receiving electrodes RX1 to RXn and at least one of the plurality of receiving dummy electrodes Dummy RX1 to Dummy RXn may be alternately disposed with each other. That is, it may be arranged like RX1-Dummy RX1-RX2-Dummy RX2.

A touch sensor 10 including a plurality of driving electrodes TX1 to TXm, a plurality of receiving electrodes RX1 to RXn, and a plurality of receiving dummy electrodes Dummy RX1 to Dummy RXn, as shown in FIG. 44(*a*), may be disposed between the cover layer 100 and the display panel 200A together with the OCA disposed above and below (add-on). As shown in FIG. 44(*b*), the touch sensor 10 may be disposed directly on the upper surface of the display panel 200A (e.g., the upper surface of the encapsulation layer of the display panel 200A) (on-cell). On the other hand, the touch sensor 10 including a plurality of driving electrodes TX1 to TXm, a plurality of receiving electrodes RX1 to RXn, and a plurality of receiving dummy electrodes Dummy RX1 to Dummy RXn, as shown in FIG. 4(c), may be disposed inside the display panel 200A (e.g., between the encapsulation layer and the organic light emitting layer of the display panel 200A) (in-cell).

FIGS. 44(a) to 44(c), the display panel 200A may be a rigid OLED panel or a flexible OLED panel. In the case of a rigid OLED panel, the encapsulation layer and the TFT layer may be formed of glass, and in the case of a flexible OLED panel, the encapsulation layer may be formed of a thin film, and the TFT layer may be formed of a PI film.

Meanwhile, although the display panel 200A is illustrated as an OLED panel in FIGS. 44(a) to 44(c), the present invention is not limited thereto, and as shown in FIGS. 44(d) to 44(f), the display panel 200B may be an LCD panel. Due to the characteristics of the LCD panel, the backlight unit (BLU) 250 is disposed under the display panel 200B.

Specifically, as shown in FIG. 44(d), the touch sensor 10 may be a touch sensor 10 attached to the cover window glass 100 (add-on). Here, although not shown in the drawings, the touch sensor 10 may be attached to the upper surface of the cover window glass 100 in the form of a film. As shown in FIG. 44(e), the touch sensor 10 may be formed on the color filter glass of the display panel 200B (on-cell). Here, the touch sensor 10 may be formed on the upper surface of the color filter glass as shown in the drawing, or although not shown in the drawings, the touch sensor 10 may be formed on the lower surface of the color filter glass. As shown in FIG. 44(f), the touch sensor 10 may be formed in a TFT layer (TFT array) (in-cell). Here, the touch sensor 10 may be formed on the upper surface of the TFT layer (TFT array) as shown in the drawing, or although not shown in the drawings, the touch sensor 10 may be formed on the lower surface of the TFT layer (TFT array). In addition, although not shown in a separate drawing, one of the driving electrode and the receiving electrode may be formed on the color filter glass of the display panel 200B, and the other one may be formed on the TFT layer.

Again, referring to FIG. 40, at least one of the plurality of driving electrodes TX1 to TXm, the plurality of receiving electrodes RX1 to RXn, and the plurality of receiving dummy electrodes Dummy RX1 to Dummy RXn may be made of a transparent conductive material (e.g., Indium Tin Oxide (ITO) made of tin oxide (SnO2), indium oxide (In2O3), etc. or Antimony Tin Oxide (ATO)), etc. However, this is only an example, and at least one of the plurality of driving electrodes TX1 to TXm, the plurality of receiving electrodes RX1 to RXn, and the plurality of receiving dummy electrodes Dummy RX1 to Dummy RXn may be formed of a different transparent conductive material or an opaque conductive material. For example, it may be configured to include at least one of silver ink, copper, nano silver and carbon nanotubes (CNT). Also, at least one of the plurality of driving electrodes TX1 to TXm, the plurality of receiving electrodes RX1 to RXn, and the plurality of receiving dummy electrodes Dummy RX1 to Dummy RXn may be implemented as a metal mesh.

The driving unit 12 may apply a driving signal to the driving electrodes TX1 to TXm. The sensing unit 11 may detect whether a touch has been made and a touch position by receiving a sensing signal including information on the amount of change in mutual capacitance generated between the receiving electrodes RX1 to RXn and the driving electrodes TX1 to TXm to which a driving signal is applied through the receiving electrodes RX1 to RXn. The first sensing signal includes a noise signal as well as a signal coupled by a mutual capacitance generated between the driving electrodes TX1 to TXm and the receiving electrodes RX1 to RXn by a driving signal applied to the driving electrodes TX1 to TXm, The noise signal may include information on a LGM interference signal generated in a floating state.

The sensing unit 11 may receive a second sensing signal formed between the driving electrodes TX1 to TXm and the receiving dummy electrodes Dummy RX1 to Dummy RXn. In fact, a slight mutual capacitance may be formed between the driving electrodes TX1 to TXm and the receiving dummy electrodes Dummy RX1 to Dummy RXn, but the insignificant mutual capacitance may be ignored when detecting the presence of a touch.

The sensing unit 11 may include a plurality of receivers 111, 111a to 111n according to an embodiment.

Figure 41:
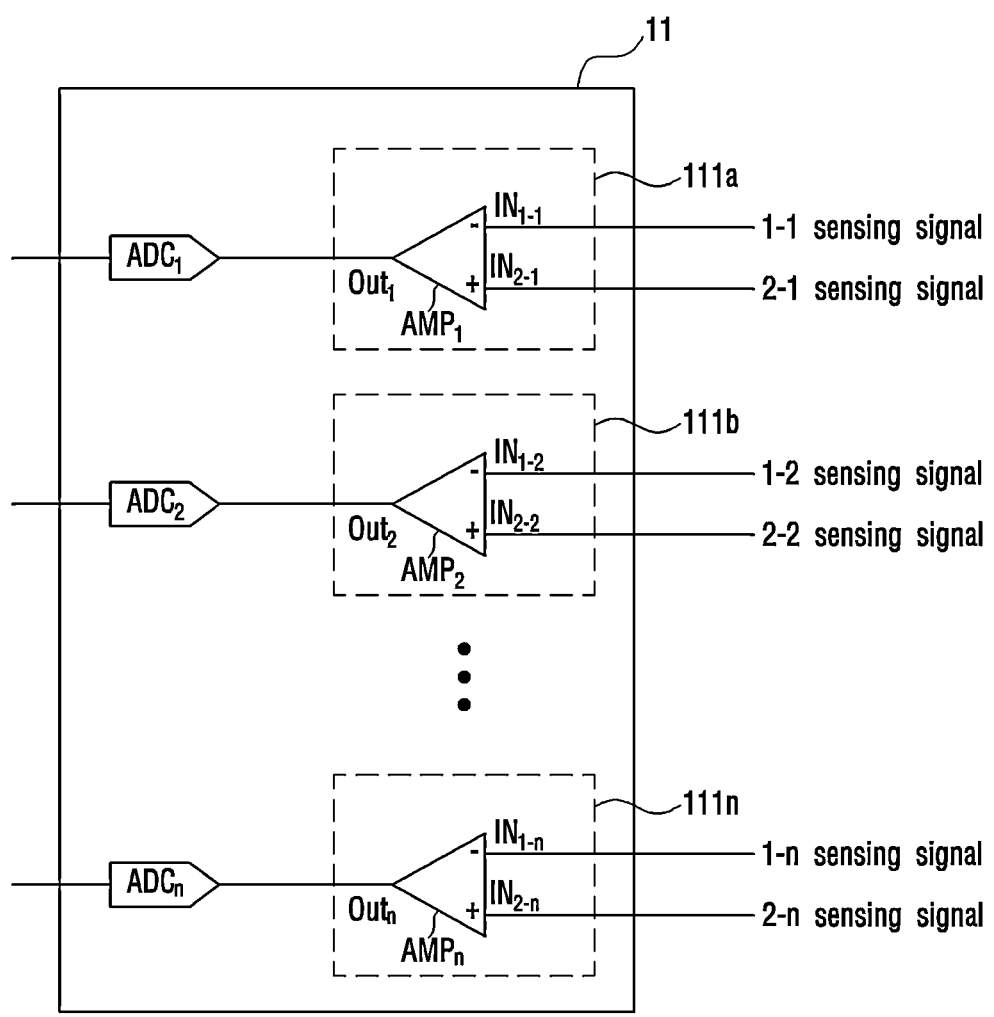
FIG. 41 shows the configuration of the sensing unit 11 according to an embodiment.

For example, referring to FIG. 41, the receivers 111, 111a to 111n may include amplifiers AMP1 to AMPn.

The negative (−) input terminals IN1-1 to IN1-n of an amplifier are respectively connected to the corresponding receiving electrodes RX1 to RXn, and may receive the first sensing signal (the 1-1 sensing signal, the 1-2 sensing signal, . . . , the 1-n sensing signal).

The positive (+) input terminals IN2-1 to IN2-n of the amplifier are respectively connected to the corresponding receiving dummy electrodes Dummy RX1 to Dummy RXn, and may receive the second sensing signal (the 2-1 sensing signal, the 2-2 sensing signal, . . . , the 2-n sensing signal).

According to another embodiment, the negative (−) input terminals IN1-1 to IN1-n of an amplifier may receive each second sensing signal, and the positive (+) input terminals IN2-1 to IN2-n of the amplifier may be implemented to receive each first sensing signal.

Each of the receivers 111, 111a to 111n may be connected to each of the receiving electrodes RX1 to RXn and each of the receiving dummy electrodes Dummy RX1 to Dummy RXn through a switch. The switch is turned on in a time period for detecting signals of the corresponding receiving electrodes RX1 to RXn and the receiving dummy electrodes Dummy RX1 to Dummy RXn, and each voltage difference value between the first sensing signal (the 1-1 sensing signal, the 1-2 sensing signal, . . . , the 1-n sensing signal) input from the receiving electrodes RX1 to RXn and the second sensing signal (the 2-1 sensing signal, the 2-2 sensing signal, . . . , the 2-n sensing signal) input from the receiving dummy electrodes Dummy RX1 to Dummy RXn is output.

In the case of the present invention, power consumption can be reduced since each first sensing signal (the 1-1 sensing signal, the 1-2 sensing signal, . . . , the 1-n sensing signal) and each second sensing signal (the 2-1 sensing signal, the 2-2 sensing signal, . . . , the 2-n sensing signal) are input to each of the receivers 111, 111a to 111n through two channels corresponding thereto, compared to being input to the receivers through one channel.

The sensing unit 11 may further include analog-to-digital converters ADC1 to ADCn that convert the difference values output through the respective receivers 111, 111a to 111n into digital data values. Subsequently, the digital data may be input to a processor (not shown) and processed to obtain touch information on the touch sensor 10.

In the present invention, by using the configuration of the sensing unit 11 as shown in FIG. 41, a touch driving signal asynchronous to the display driving signal can be applied to the touch sensor 10, and there is an effect of preventing signals from being canceled out even when the signals are input together through the (−) input terminal and the positive (+) input terminal of each amplifier.

The control unit 13 may perform a function of controlling the operations of the driving unit 12 and the sensing unit 11. For example, the control unit 13 may generate a driving control signal and transmit it to the driving unit 12 so that a driving signal is applied to the preset driving electrodes TX1 to TXm at a predetermined time. In addition, the control unit 13 generates a sensing control signal and transmits it to the sensing unit 11 so that the sensing unit 11 receives a first sensing signal from the preset receiving electrodes RX1 to RXn at a predetermined time, and a preset function may be performed by receiving a second sensing signal from the preset receiving dummy electrodes Dummy RX1 to Dummy RXn.

In FIG. 40, the touch detection unit 14 may be implemented by being integrated on a touch sensing integrated circuit (IC). The driving electrodes TX1 to TXm, the receiving electrodes RX1 to RXn, and the receiving dummy electrodes Dummy RX1 to Dummy RXn included in the touch sensor 10 may be connected to the driving unit 12 and the sensing unit 11 included in the touch sensing IC through a conductive trace and/or a conductive pattern printed on a circuit board, for example. The touch sensing IC may be located on a circuit board on which a conductive pattern is printed, for example, a touch circuit board (hereinafter, referred to as a touch PCB). According to an embodiment, the touch sensing IC may be mounted on a main board for operating the touch input device.

As described above, a predetermined capacitance Cm is generated at each intersection of the driving electrodes TX1 to TXm and the receiving electrodes RX1 to RXn, and when an object such as a finger or a pen approaches the touch sensor 10, the value of the capacitance Cm may be changed. In FIG. 40, the capacitance may represent a mutual capacitance Cm. By detecting these electrical characteristics by the sensing unit 11, it is possible to sense whether the touch sensor 10 is touched and/or a touch position. For example, it is possible to detect whether a touch is made and/or a location of the touch on the surface of the touch sensor 10 made of a two-dimensional plane consisting of a first axis and a second axis.

Hereinafter, with reference to FIGS. 45 to 46, the reason why a digital value (or a signal level value) output when the touch input device shown in FIGS. 36a and 38a is in a floating state, is different from a digital value (or a signal level value) output in a normal situation will be explained in detail.

Figure 45:
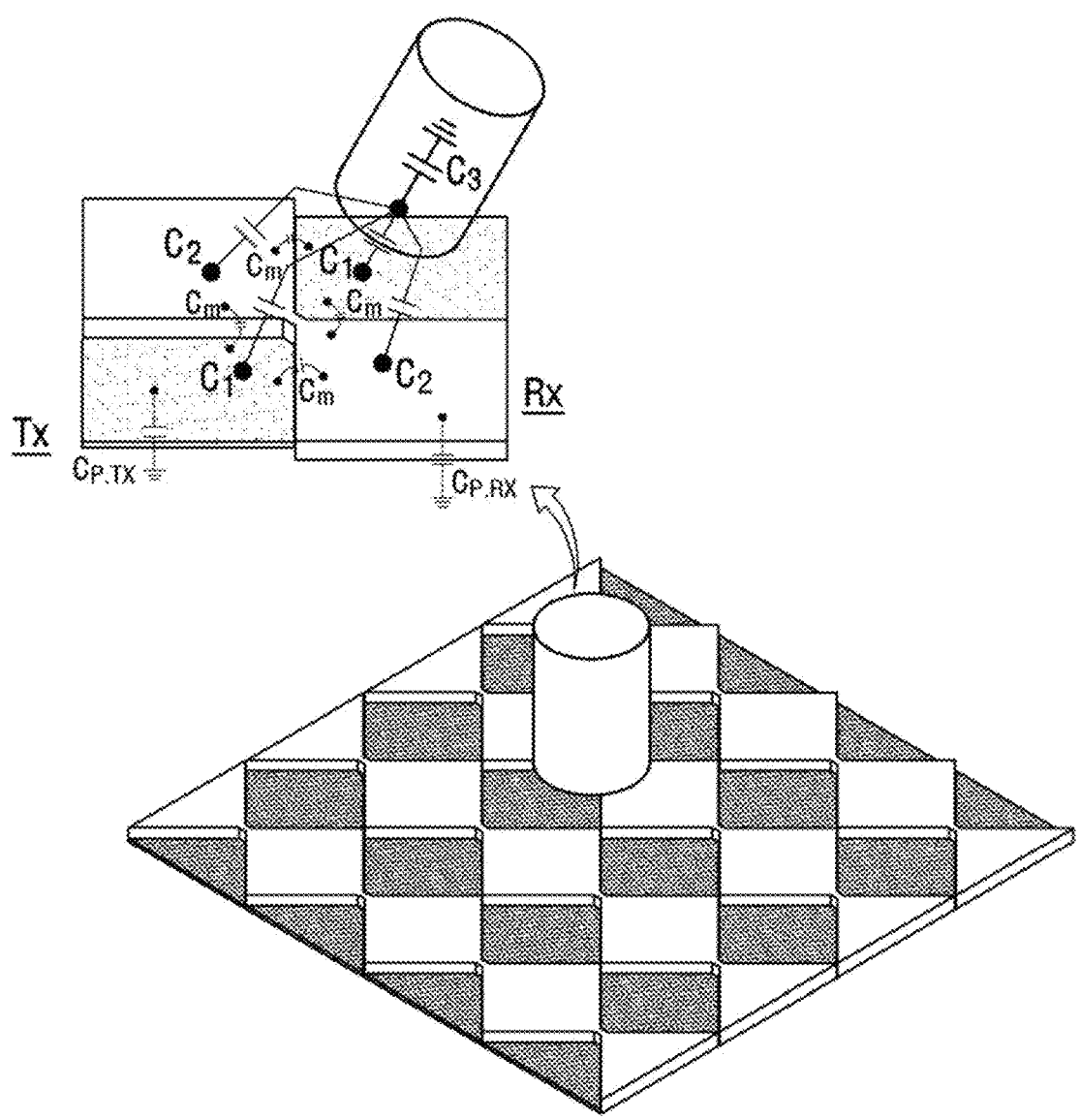
FIGS. 45 and 46 are reference views for explaining why a digital value output in a floating state is different from a digital value output in a normal situation.
Figure 46:
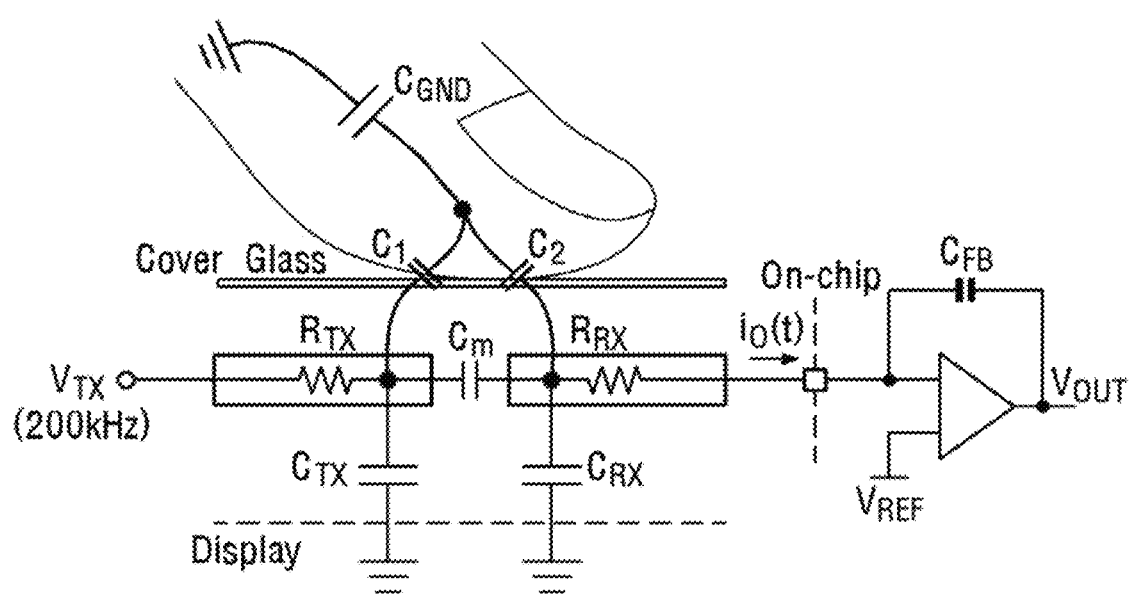

FIGS. 45 to 46 are diagrams for explaining a principle of generating an LGM interference signal in a floating state of a touch input device having a touch sensor implemented as a double layer. For reference, in the following description, an object may include a finger or a stylus.

For reference, a normal situation below exemplifies a situation in which a finger acts as a normal ground. The situation in which an LGM interference signal is generated illustrates a situation in which the finger cannot act as a normal ground due to the occurrence of floating.

For example, when the surface of the touch input device is touched with a thumb, the first mutual capacitance change amount $\Delta Cm1$ is detected between an arbitrary driving electrode and a predetermined receiving electrode in a normal situation where an LGM interference signal does not occur. However, in a situation in which an LGM interference signal is generated, the second mutual capacitance variation $\Delta Cm2$ having a smaller magnitude than the first mutual capacitance variation $\Delta Cm1$ is detected. That is, an LGM interference signal may be defined as a signal including information on capacitance that acts opposite to the first mutual capacitance variation $\Delta Cm1$ to decrease the size of the first mutual capacitance variation $\Delta Cm1$. For reference, here, $\Delta Cm1$ and $\Delta Cm2$ are defined as absolute values. In other words, when an arbitrary driving electrode and a predetermined receiving electrode are connected through a touch by a conductive object having a low ground, a separate current path is created through the coupling between the object and an arbitrary driving electrode and/or a predetermined receiving electrode, a driving signal is transmitted to a predetermined receiving electrode through this path, and an LGM interference signal as opposed to a normal touch signal is generated.

Also, in the present invention, the LGM interference signal may be formed not only between an object and an arbitrary driving electrode and/or a predetermined receiving electrode, but also between the object and an arbitrary driving electrode and/or a predetermined receiving dummy electrode.

In addition, referring to FIGS. 45 to 46, when the generation amount of the LGM interference signal is relatively large in any one cell region (including the plurality of driving electrodes and the plurality of receiving electrodes included in the dotted line region), as shown in FIGS. 36a and 38a, the digital value corresponding to the finally output first sensing signal becomes small. In particular, in the case of a big touch (in the present invention, a case having a larger area than the touch area of the other fingers, such as the touch area of a thumb, is defined as a big touch), the LGM interference signal is relatively increased.

As shown in FIGS. 45 to 46, when an object touches the touch surface of the touch input device in a floating state, the LGM interference signal C1, C2 is generated by coupling between the object and the driving electrode and/or the receiving electrode in addition to the generation of a mutual capacitance Cm between the driving electrode and the receiving electrode.

Meanwhile, the principle of generating the LGM interference signal in the touch sensor 10 of the same layer according to the same principle will be described with reference to FIGS. 49 to 50.

Figure 47:
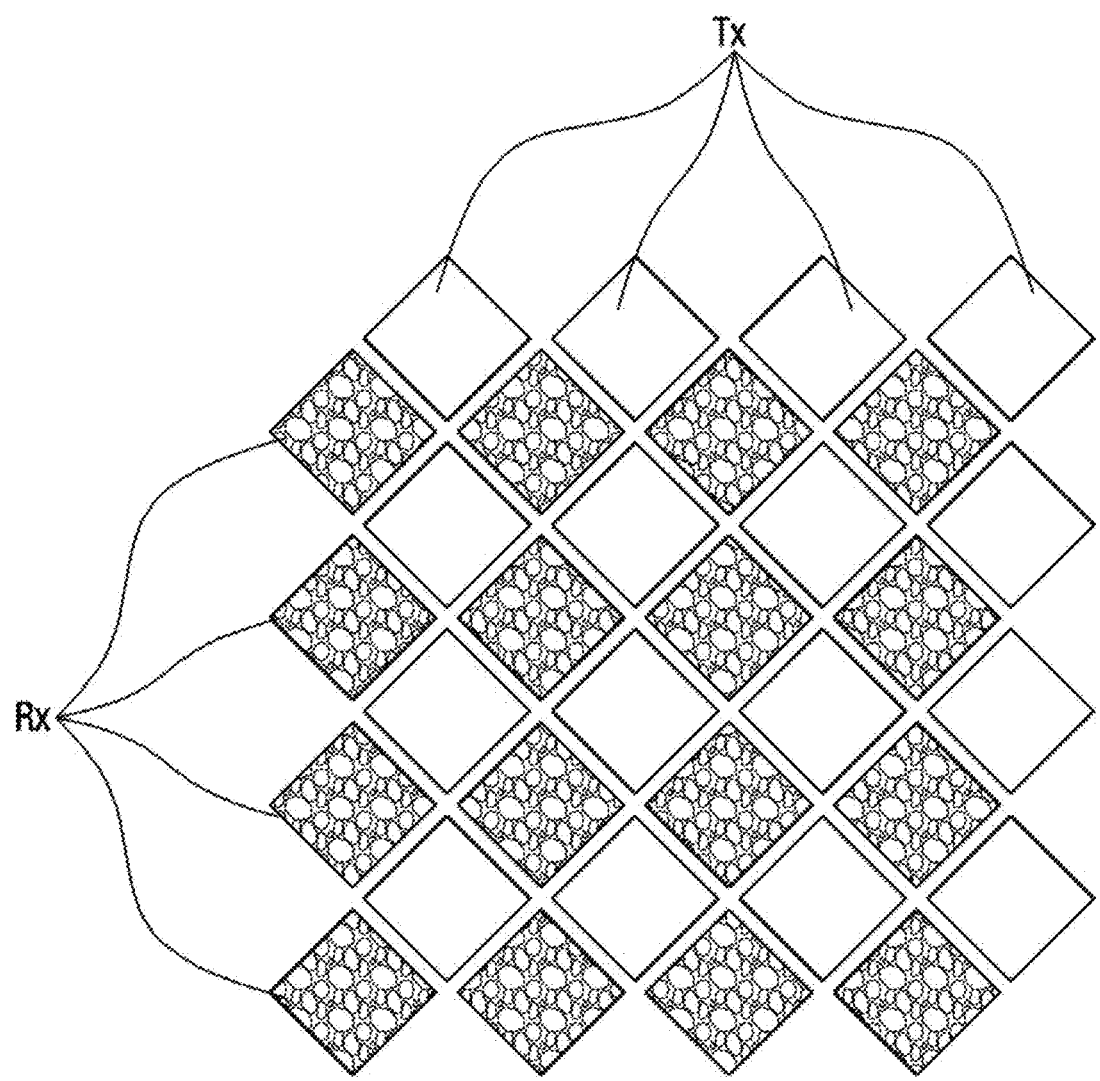
FIGS. 47 and 48 show the configuration of the touch sensor 10 disposed on the same layer according to an embodiment.
Figure 48:
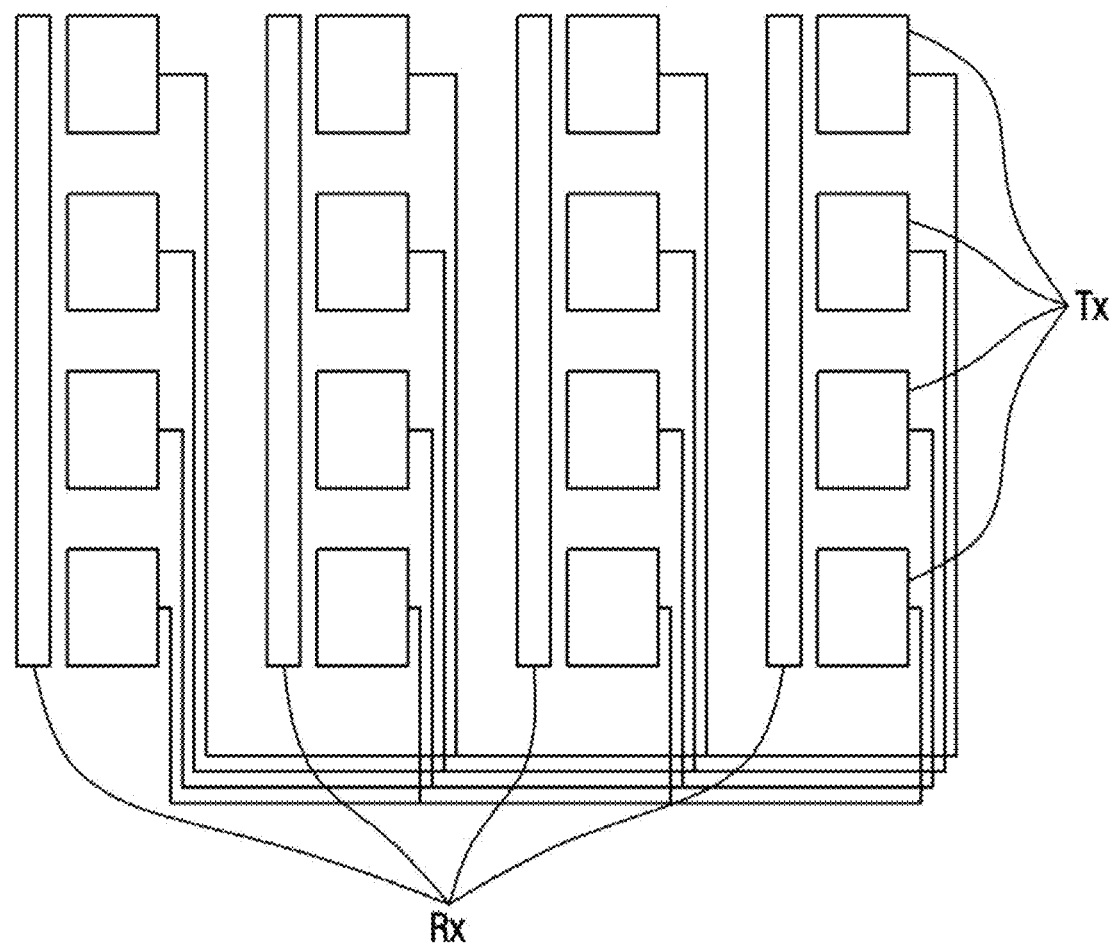

Prior to that, as shown in FIGS. 47 and 48, in the touch sensor 10 according to an embodiment of the present invention, the plurality of driving electrodes TX1 to TXn and the plurality of receiving electrodes RX1 to RXm may be formed on the same layer. For example, the plurality of driving electrodes TX1 to TXn and the plurality of receiving electrodes RX1 to RXm may be formed on the upper surface of the display panel.

FIG. 49a illustrates an electrode arrangement form in which a plurality of same receiving electrodes RX1 are disposed in the touch window region S, so that the amount of LGM interference signals is relatively increased. In the present invention, the same receiving electrodes mean electrodes connected to one sensing channel, and the same driving electrodes mean electrodes connected to one driving channel.

Meanwhile, in the present invention, the touch window region S may be defined as a larger area than any touch area of the other fingers, like the touch area of a thumb. Referring to FIG. 50e, the area of the touch window region S may be implemented in a size of about 15 mm*15 mm or more and about 20 mm*20 mm or less. Preferably, it may be implemented with a size of about 16 mm*16 mm. In particular, FIG. 50e illustrates that the area of the touch window region S is implemented in a size of about 16 mm*16 mm.

Specifically, the area of a unit cell (the hatched portion in FIG. 50e) may be implemented to be approximately 4 mm (vertical)*2 mm (horizontal). Accordingly, in the case of FIG. 50e, the vertical length of one RX electrode (the size of four-unit cells) is about 16 mm, and the horizontal length is about 2 mm. In addition, the vertical length of one TX electrode (the size of one unit cell) is about 4 mm, and the horizontal length is about 2 mm. Accordingly, it is exemplified that the area of the touch window region S is implemented in a size of about 16 mm*16 mm in FIG. 50e.

Figure 49B:
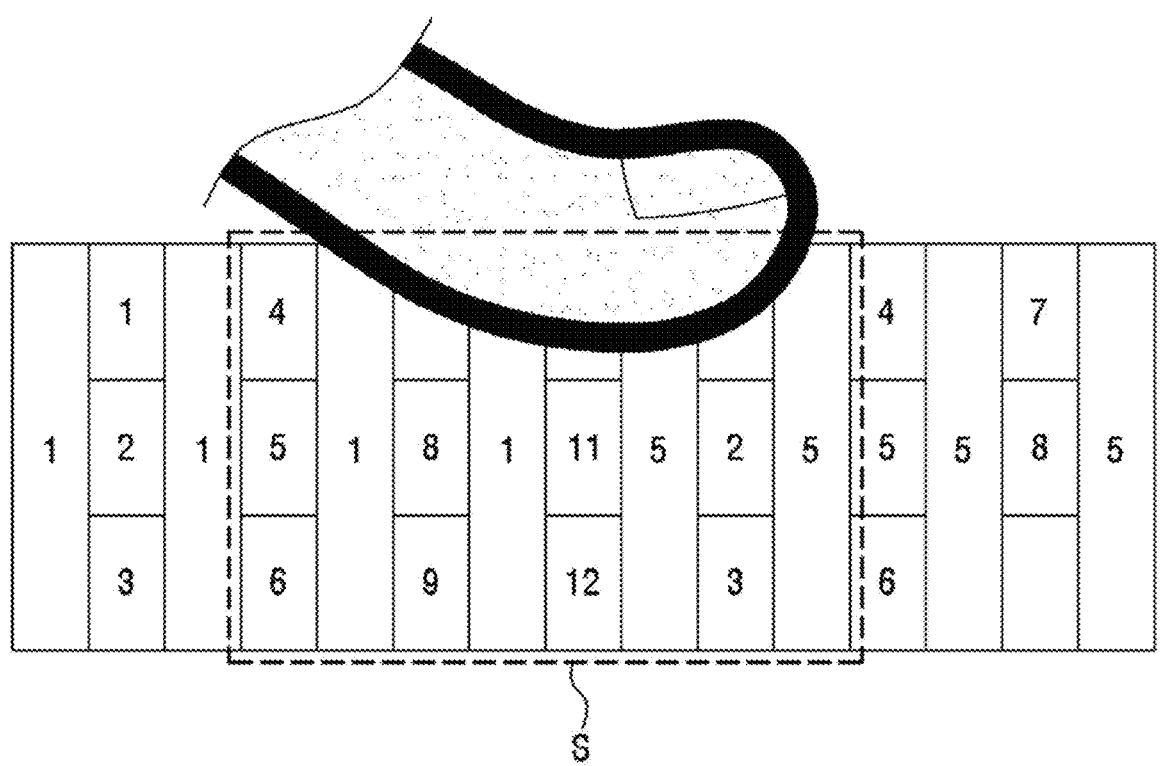
FIGS. 49 and 50 are diagrams referenced to explain a principle of generating an LGM interference signal in the touch sensor 10 of the same layer.
Figure 49C:
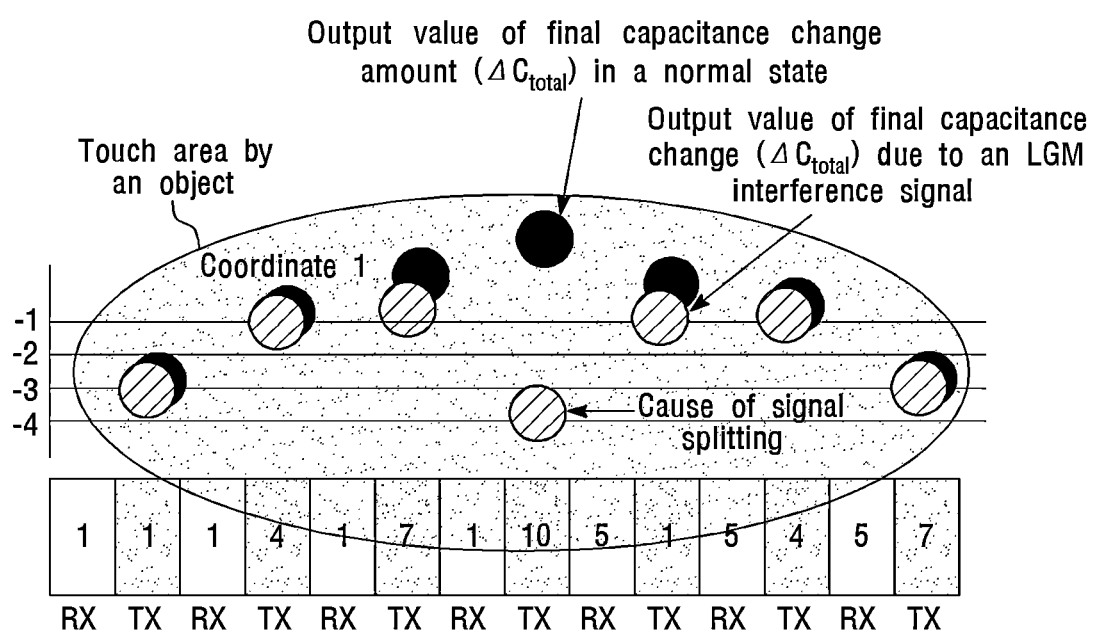

Here, as shown in FIG. 49b, when the surface of the touch sensor is touched with a thumb, in the finger touch area (touch window region S), as shown in FIG. 49c, the final capacitance change ΔCtotal consists only of a "+" capacitance value (ΔCm, e.g., >+250) under normal circumstances where an LGM (Low Ground Mass) interference signal does not occur, but a lower final capacitance change amount (ΔCtotal, e.g., >+50) is obtained by the "−" LGM interference signal (CLGM, e.g., >−200) in a situation where an LGM interference signal is generated. That is, the LGM interference signal is defined as a signal that acts opposite to the "+" capacitance value to reduce the finally obtained capacitance change amount ΔCtotal.

Figure 49D:
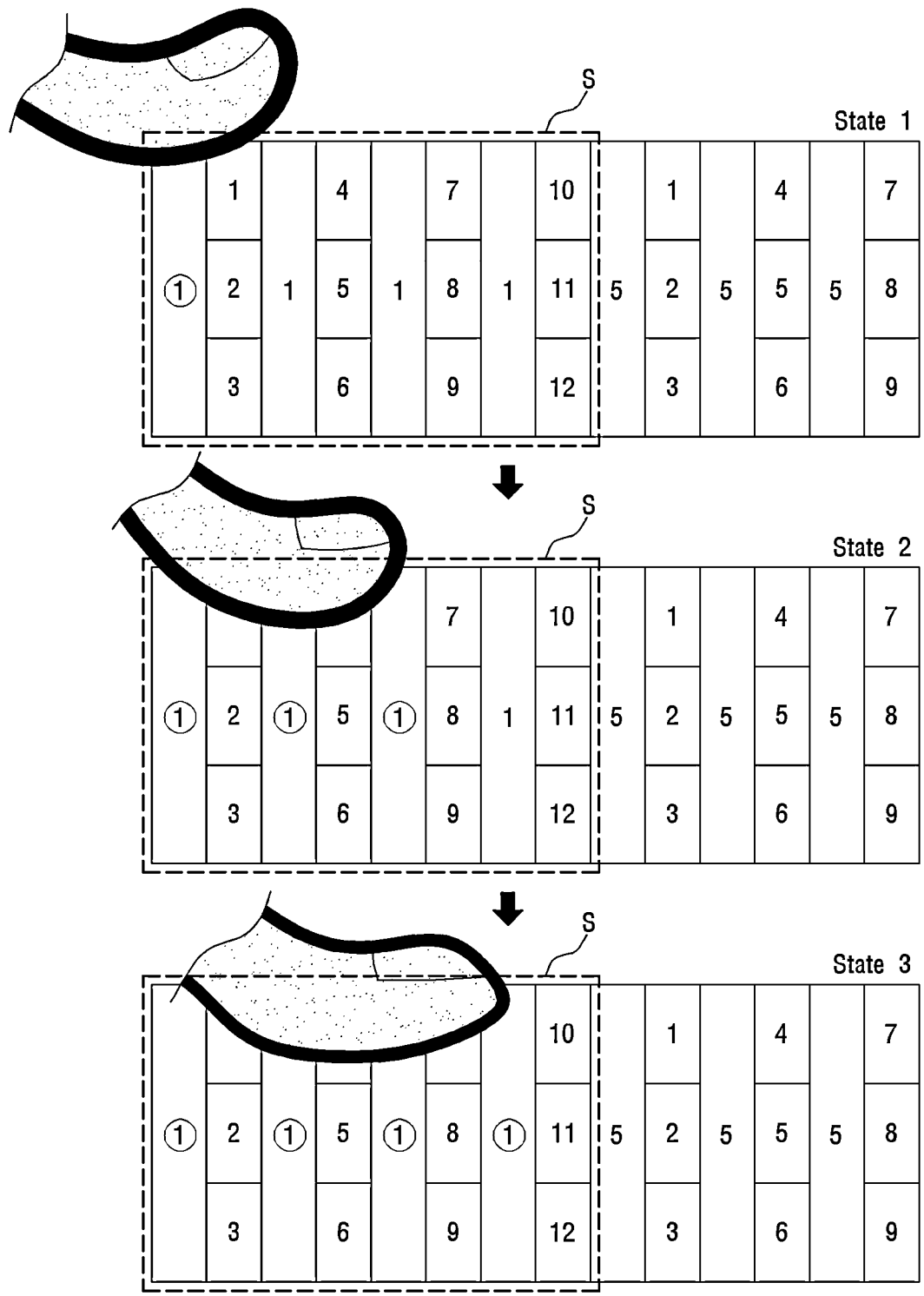

For example, in the case of FIG. 49d, as the touch area of a thumb gradually increases, the number of the same receiving electrodes RX1 included in the touch area gradually increases (1 in State 1→3 in State 2→4 in State 3).

In the finger touch area, the final capacitance change amount ΔCtotal consists only of a "+" capacitance value (ΔCm, e.g., >+250) in a normal situation where an LGM interference signal does not occur, but the capacitance change amount ΔCtotal almost disappears in a situation where an LGM interference signal is large. As such, as the number of the same receiving electrodes RX1 included in the finger touch area increases, the amplitude of an LGM interference signal gradually increases, and as a result, it can be seen that the final capacitance change amount ΔCtotal is almost eliminated.

Figure 50A:
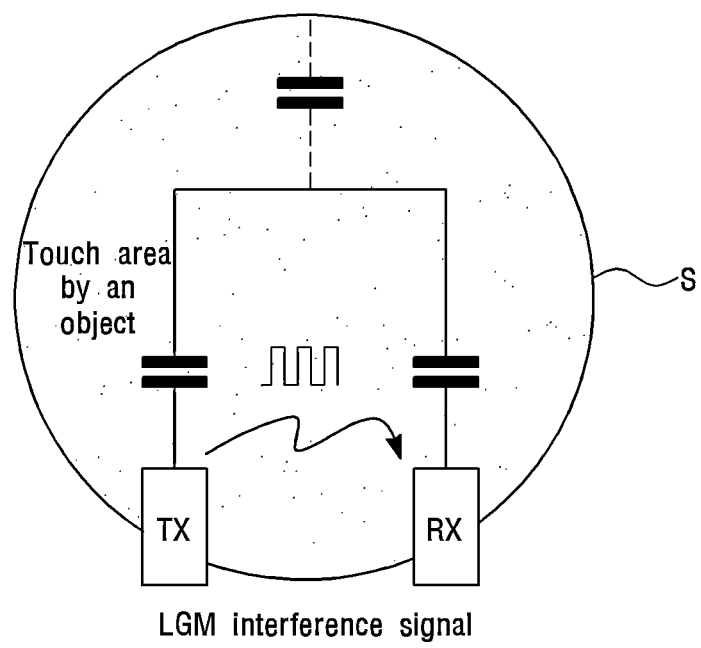

As a result, as shown in FIG. 50a, when the driving electrode and the receiving electrode are connected to a conductive object with a low ground, a separate current path is created, the TX signal is transmitted to the RX electrode through this path, and an LGM interference signal opposite to a normal touch signal is generated.

Figure 50B:
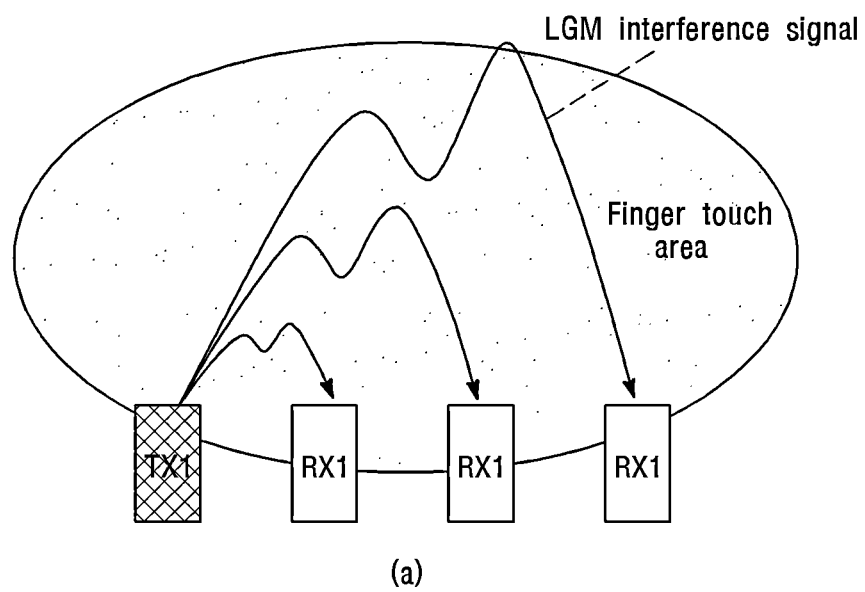
Figure 50B:
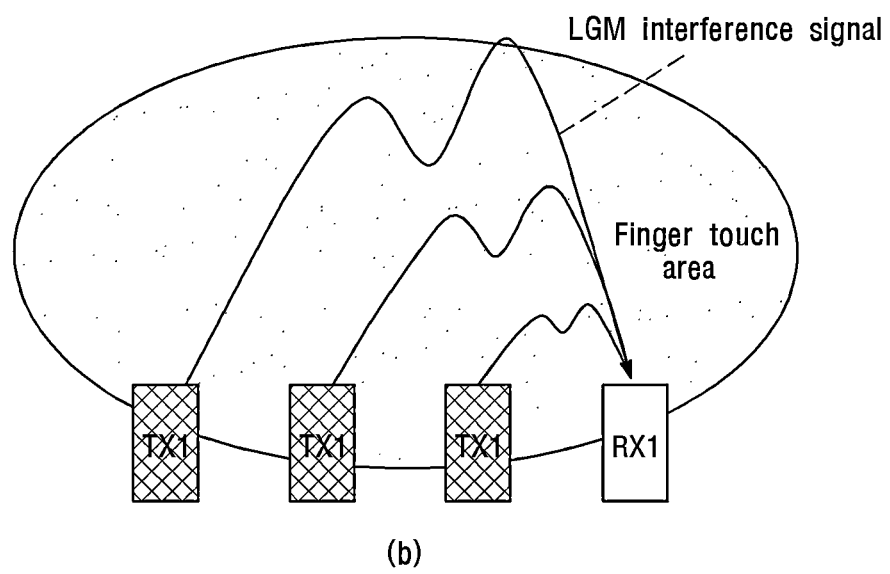
Figure 50C:
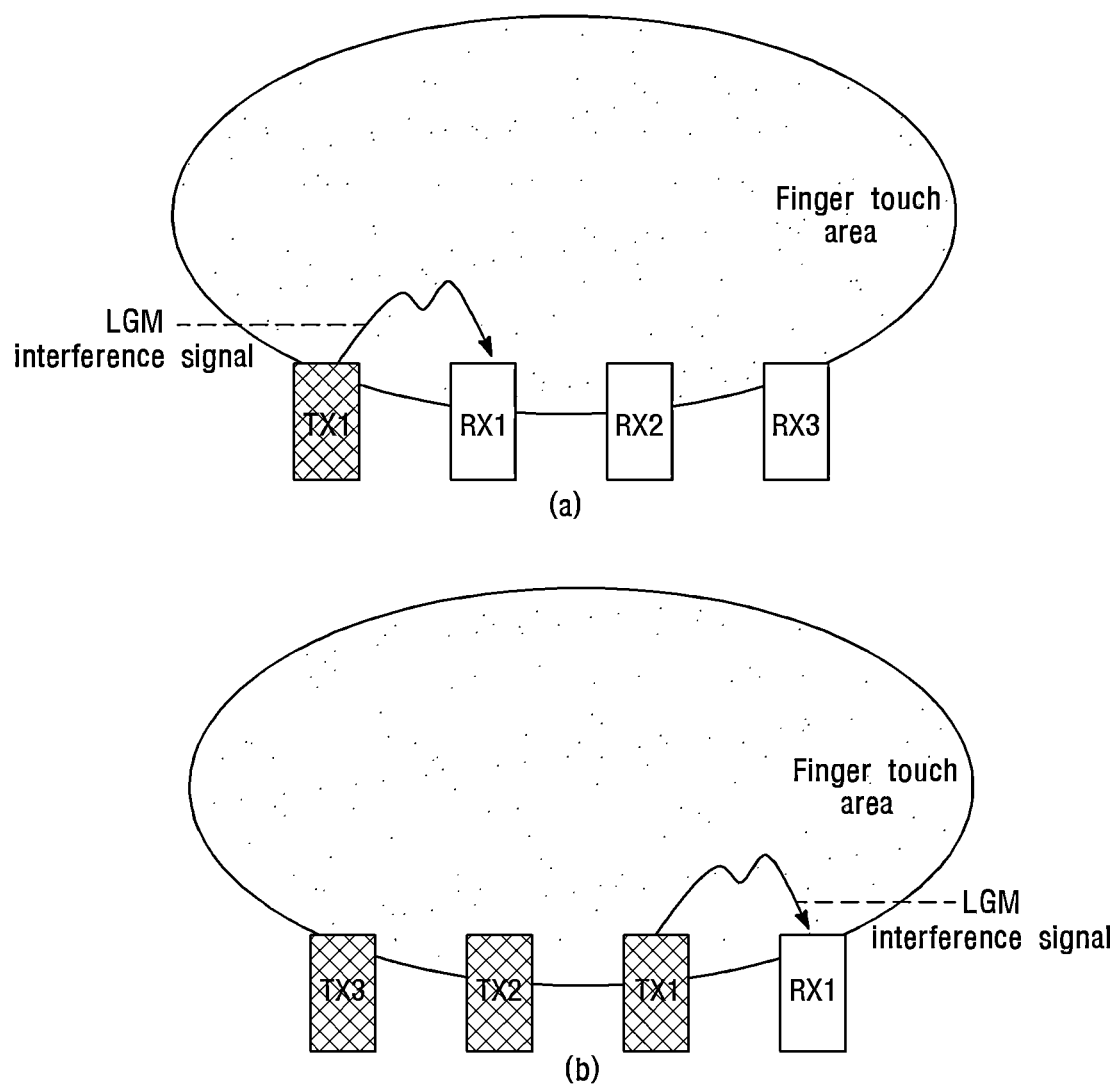
Figure 50D:
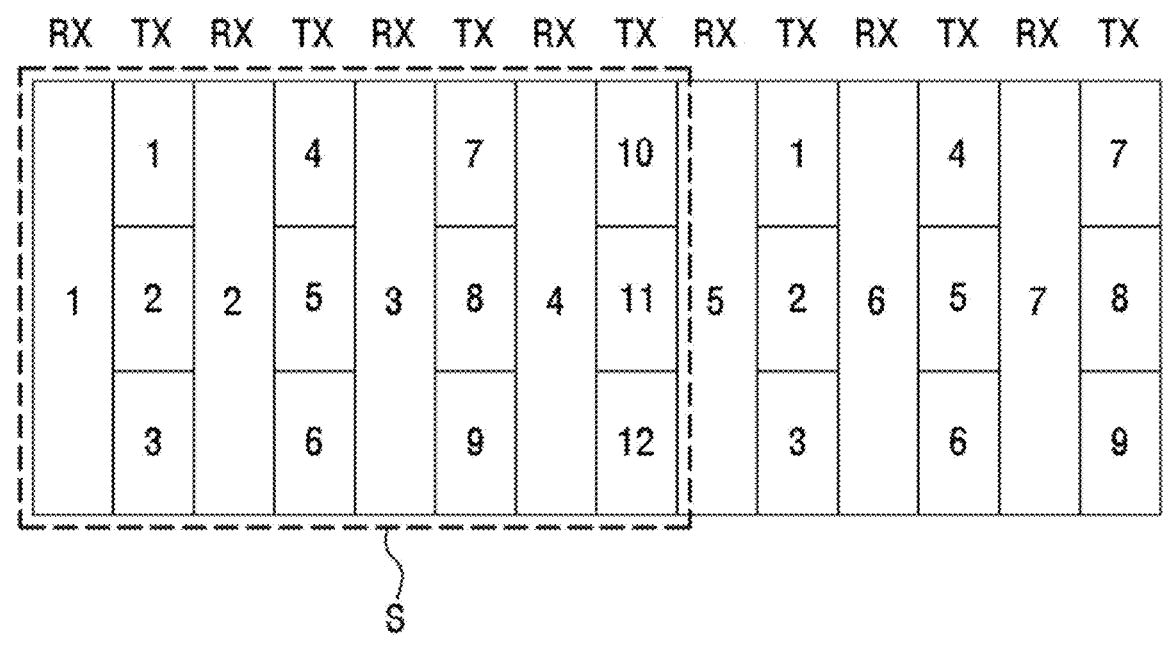
Figure 50E:
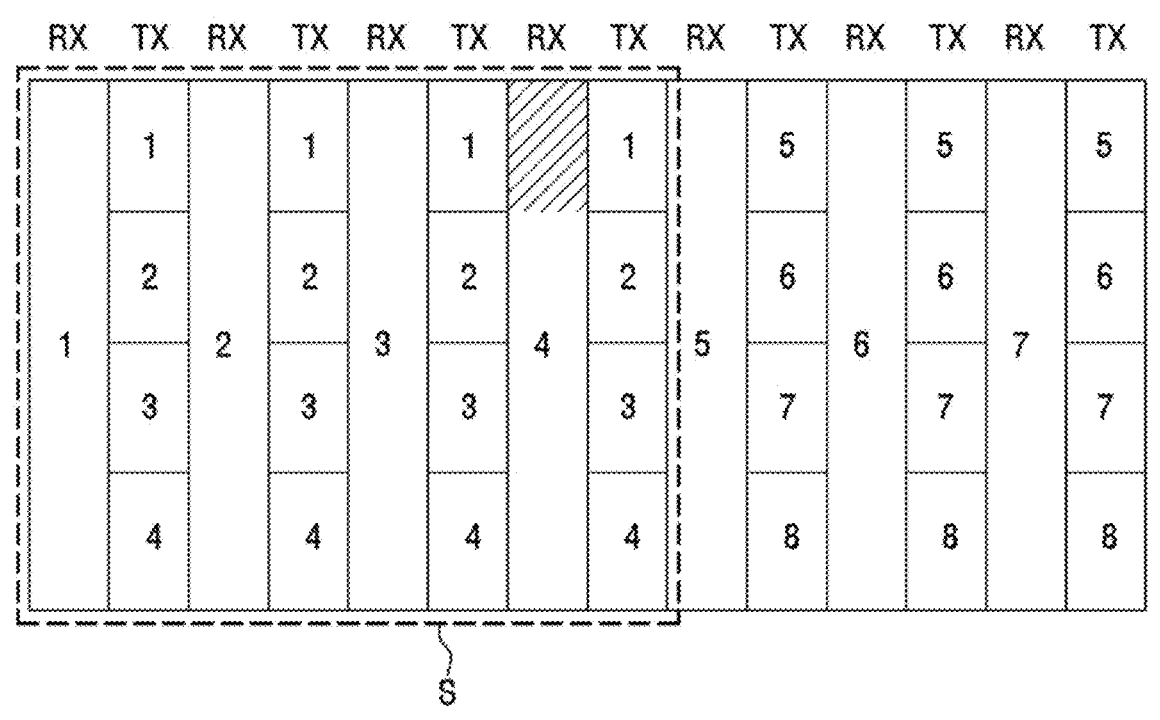

Meanwhile, as described above, according to the electrode arrangement form of the touch sensor of FIG. 49a, a plurality of same receiving electrodes RX1 are arranged in the touch window region S, and the amount of an LGM interference signal is relatively increased. That is, as shown in FIG. 50b(a), when the number of same receiving electrodes RX1 disposed in the touch area is large, or as shown in FIG. 50b(b), the number of same driving electrodes TX1 disposed in the touch area is large, it can be seen that an LGM interference signal is relatively increased. Accordingly, reducing the number of the same receiving electrodes RX1 disposed in the touch area as shown in FIG. 50c(a), or reducing the number of the same driving electrodes TX1 disposed in the touch area as shown in FIG. 50c(b) is preferable. For example, as shown in FIG. 50d, all the receiving electrodes included in the touch window region S are separated from each other and connected to different channels, and thereby the above-described LGM interference signal can be reduced and the touch sensitivity can be improved.

Hereinafter, a form of the touch sensor 10 for removing an LGM interference signal according to an embodiment will be described with reference to FIGS. 51 to 62.

Figure 51:
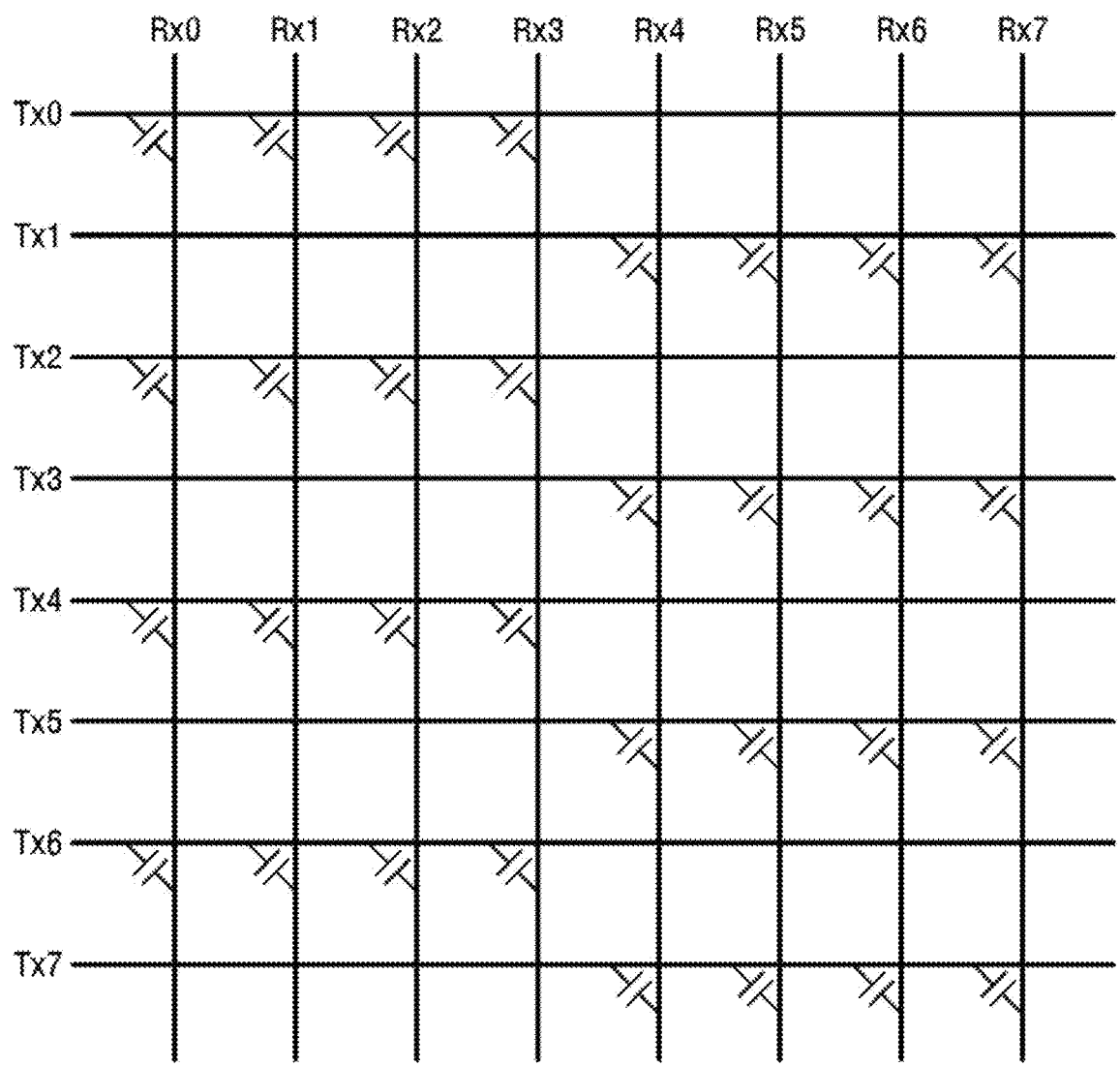
FIGS. 51 to 62 illustrate various forms of the touch sensor 10 for removing an LGM interference signal according to an embodiment.

FIG. 51 is an exemplary conceptual diagram conceptualizing a touch sensor according to an embodiment of the present invention. However, in FIG. 51, it is assumed that the receiving electrode and the receiving dummy electrode are separate electrodes physically separated from each other, but some of the receiving electrodes may function as the receiving dummy electrodes.

Referring to FIG. 51, the touch sensor according to an embodiment of the present invention includes a plurality of driving electrodes TX0 to TX7 and a plurality of receiving electrodes RX0 to RX7. Here, the plurality of driving electrodes TX0 to TX7 and the plurality of receiving electrodes RX0 to RX7 may be formed in a single layer or in a double layer.

A touch sensor according to an embodiment of the present invention including a plurality of driving electrodes TX0 to TX7 and a plurality of receiving electrodes RX0 to RX7 includes the nodes that form a mutual capacitance Cm between the plurality of driving electrodes TX0 to TX7 and the plurality of receiving electrodes RX0 to RX7, and the nodes that do not form a mutual capacitance Cm.

For example, in FIG. 51, the nodes forming the mutual capacitance Cm are (Tx0, Rx0), (Tx0, Rx1), (Tx0, Rx2), (Tx0, Rx3), (Tx1, Rx4), (Tx1, Rx5), (Tx1, Rx6), (Tx1, Rx7), (Tx2, Rx0), (Tx2, Rx1), (Tx2, Rx2), (Tx2, Rx3), (Tx3, Rx4), (Tx3, Rx5), (Tx3, Rx6), (Tx3, Rx7), (Tx4, Rx0), (Tx4, Rx1), (Tx4, Rx2), (Tx4, Rx3), (Tx5, Rx4), (Tx5, Rx5), (Tx5, Rx6), (Tx5, Rx7), (Tx6, Rx0), (Tx6, Rx1), (Tx6, Rx2), (Tx6, Rx3), (Tx7, Rx4), (Tx7, Rx5), (Tx7, Rx6), (Tx7, Rx7).

The sensing signal output from the predetermined receiving electrodes of the nodes forming the mutual capacitance Cm includes noise information as well as information on the capacitance change amount due to the touch of an object. Here, the noise information includes information on the amount of change in capacitance due to an LGM interference signal generated in a floating state. Accordingly, when the sensing signal received from the receiving electrodes of the nodes forming the mutual capacitance Cm is converted into a predetermined level value and output, the information of the mutual capacitance change amount and the noise information are reflected to the output level value.

Meanwhile, in FIG. 51, the nodes that do not form the mutual capacitance Cm are (Tx0, Rx4), (Tx0, Rx5), (Tx0, Rx6), (Tx0, Rx7), (Tx1, Rx0), (Tx1, Rx1), (Tx1, Rx2), (Tx1, Rx3), (Tx2, Rx4), (Tx2, Rx5), (Tx2, Rx6), (Tx2, Rx7), (Tx3, Rx0), (Tx3, Rx1), (Tx3, Rx2), (Tx3, Rx3), (Tx4, Rx4), (Tx4, Rx5), (Tx4, Rx6), (Tx4, Rx7), (Tx5, Rx0), (Tx5, Rx1), (Tx5, Rx2), (Tx5, Rx3), (Tx6, Rx4), (Tx6, Rx5), (Tx6, Rx6), (Tx6, Rx7), (Tx7, Rx0), (Tx7, Rx1), (Tx7, Rx2), (Tx7, Rx3).

Only noise information may be included in the sensing signal output from other predetermined receiving electrodes of nodes that do not form the mutual capacitance Cm. That is, other predetermined receiving electrodes may be used as receiving dummy electrodes.

Accordingly, the touch input device according to an embodiment of the present invention having such a touch sensor may remove noise information and obtain information on the amount of change in capacitance due to a touch of an object by subtracting a sensing signal (second sensing signal) output from predetermined receiving electrodes that do not form mutual capacitance Cm from a sensing signal (first sensing signal) output from other predetermined receiving electrodes of nodes forming mutual capacitance Cm. Therefore, a digital value (or signal level value) corresponding to a final sensing signal resulted from subtracting a sensing signal output from predetermined receiving electrodes of nodes that do not form mutual capacitance Cm from a sensing signal output from other predetermined receiving electrodes of nodes forming mutual capacitance Cm, becomes a value based on the information on the amount of change in capacitance due to the touch of the object. As a result, even when the touch input device is in a floating state, a digital value identical to or almost similar to a digital value output in a state in which the touch input device acts as a non-floating normal ground may be output.

Hereinafter, specific examples will be described with reference to FIGS. 52 to 57.

Figure 52:
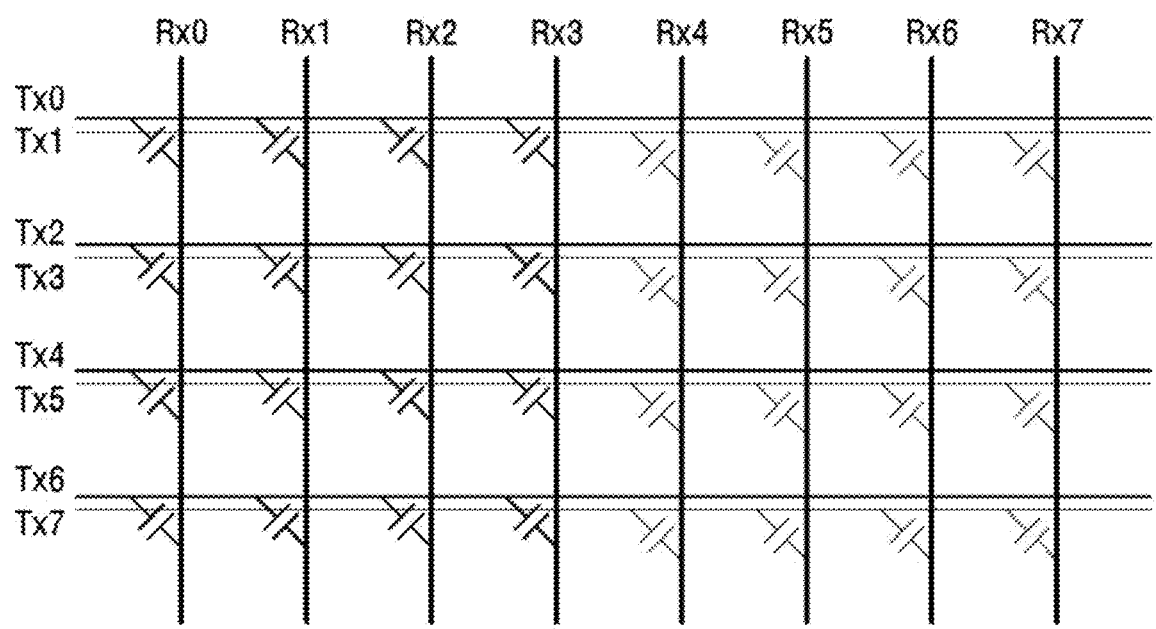

FIG. 52 is a conceptual diagram conceptualizing a touch sensor according to an embodiment of the present invention.

Referring to FIG. 52, the touch sensor according to an embodiment of the present invention includes a plurality of driving electrodes TX0 to TX7 and a plurality of receiving electrodes RX0 to RX7. Mutual capacitance may not be detected from at least some of the plurality of receiving electrodes RX0 to RX7.

Here, which of the plurality of receiving electrodes RX0 to RX7 is used as the receiving dummy electrode is determined according to the driving electrode to which a driving signal is applied.

For example, when a driving signal is applied to the 0th driving electrode TX0, the 4th receiving electrode Rx4, the 5th receiving electrode Rx5, the 6th receiving electrode Rx6, and the 7th receiving electrode Rx7 among the plurality of receiving electrodes Rx0 to Rx7 are used as receiving dummy electrodes. In other words, when a driving signal is applied to the 0th driving electrode Tx0, the 4th, 5th, 6th, and 7th receiving electrodes Rx4, Rx5, Rx6, Rx7 are used as receiving dummy electrodes that do not form mutual capacitance Cm with the 0th driving electrode Tx0, and the 0th, 1st, 2nd, and 3rd receiving electrodes Rx0, Rx1, Rx2, Rx3 become receiving electrodes forming mutual capacitance Cm with the 0th driving electrode Tx0.

If a driving signal is applied to the driving electrode Tx1, the 4th, 5th, 6th, and 7th receiving electrodes Rx4, Rx5, Rx6, Rx7 become receiving electrodes forming mutual capacitance Cm with the driving electrode Tx1, and the 0th, 1st, 2nd, and 3rd receiving electrodes Rx0, Rx1, Rx2, Rx3 are used as receiving dummy electrodes that do not form mutual capacitance Cm with the driving electrode Tx1.

The touch input device according to an embodiment of the present invention having such a touch sensor may remove noise information, in particular, information on an amount of change in capacitance due to an LGM interference signal by subtracting a sensing signal output from predetermined receiving electrodes that do not form mutual capacitance Cm from a sensing signal output from other predetermined receiving electrodes of nodes forming mutual capacitance Cm. Here, the touch input device according to an embodiment of the present invention having a touch sensor may subtract a preset factor multiplied by a sensing signal output from predetermined receiving electrodes that do not form mutual capacitance Cm from a sensing signal output from other predetermined receiving electrodes of nodes forming mutual capacitance Cm.

Figure 53A:
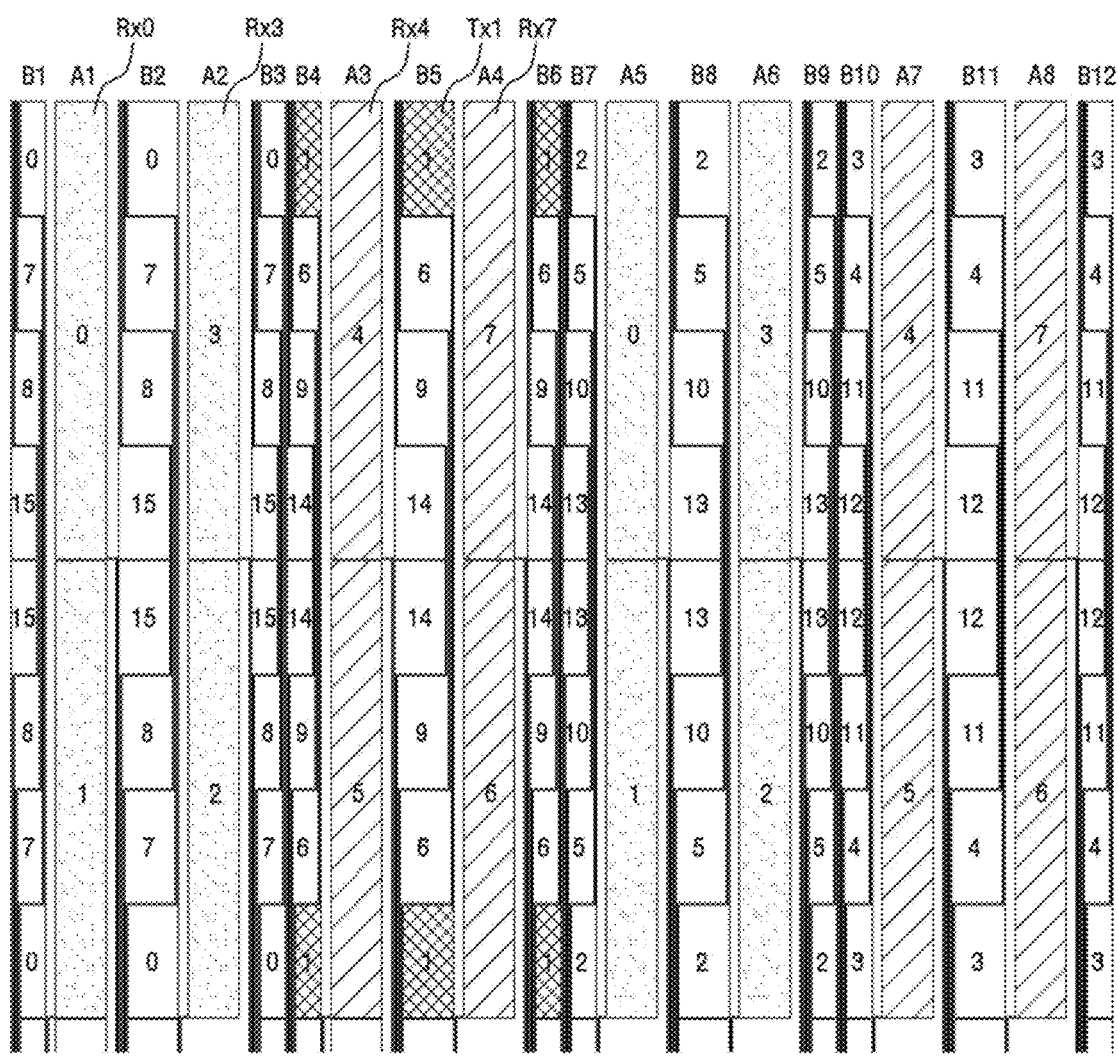

FIG. 53a is an exemplary view for explaining a case in which some of a plurality of receiving electrodes of a touch sensor are used as receiving dummy electrodes, according to an embodiment.

In particular, referring to FIG. 53a, when a driving signal is applied to the driving electrode Tx1, Rx4, Rx5, Rx6, and Rx7 disposed adjacent to the driving electrode Tx1 are used as predetermined receiving electrodes forming mutual capacitance Cm with the driving electrode Tx1, and Rx0, Rx1, Rx2, and Rx3 arranged to be spaced apart from the driving electrode Tx1 by a predetermined distance may be defined as other predetermined receiving electrodes used as receiving dummy electrodes that do not form mutual capacitance Cm with the driving electrode Tx1. Specifically, other predetermined receiving electrodes Rx0, Rx1, Rx2, Rx3 used as the receiving dummy electrodes in FIG. 53a may satisfy the conditions that they are spaced apart from the driving electrode Tx1 by a predetermined distance, do not form mutual capacitance Cm, and are respectively connected to the predetermined receiving electrodes Rx4, Rx5, Rx6, Rx7 through different channels. Here, being connected through different channels means being connected to channels of different electrode numbers that do not overlap with the electrode numbers assigned to the predetermined receiving electrodes Rx4, Rx5, Rx6, Rx7.

The sensing signal output from the predetermined receiving electrodes Rx4, Rx5, Rx6, Rx7 includes noise information as well as information on an amount of change in capacitance due to a touch of an object. Here, the noise information includes information on the amount of change in capacitance due to an LGM interference signal generated in a floating state. Accordingly, when the sensing signal output from the receiving electrodes Rx4, Rx5, Rx6, Rx7 is converted into a predetermined level value by the sensing unit 11 of the touch input device and output, the information on the amount of mutual capacitance change and the noise information are reflected to the output level value.

On the other hand, in the sensing signal output from other predetermined receiving electrodes Rx0, Rx1, Rx2, Rx3 used as receiving dummy electrodes, there is little information on the amount of change in capacitance due to the touch of an object, and only the noise information is included.

Accordingly, only a pure mutual capacitance variation value can be obtained by subtracting a signal value output from predetermined receiving electrodes used as receiving dummy electrodes from a signal value output from other predetermined receiving electrodes.

In particular, in the case of FIG. 53a, the sum of the areas of predetermined receiving electrodes used as receiving dummy electrodes may be implemented to be substantially equal to the sum of the areas of other predetermined receiving electrodes.

Since the amplitude of a detected signal is proportional to the area of an electrode, this is for the purposes that the amplitude of an LGM interference signal detected from predetermined receiving electrodes used as receiving dummy electrodes and the amplitude of an LGM interference signal detected from other predetermined receiving electrodes become as close to each other as possible, and thereby the LGM interference signal can be completely removed in the process of removing the LGM interference signal.

On the other hand, in the case of FIG. 53a, any driving electrode disposed between the predetermined receiving electrodes Rx4, Rx5, Rx6, Rx7 and other predetermined receiving electrode Rx0, Rx1, Rx2, Rx3 used as receiving dummy electrodes may be set as the ground GND so that other predetermined receiving electrodes Rx0, Rx1, Rx2, Rx3 used as receiving dummy electrodes have little information on the amount of change in capacitance due to the touch of an object. Alternatively, the predetermined receiving electrodes RX4, RX5, RX6, RX7, etc. may be set as the ground GND.

Figure 53B:
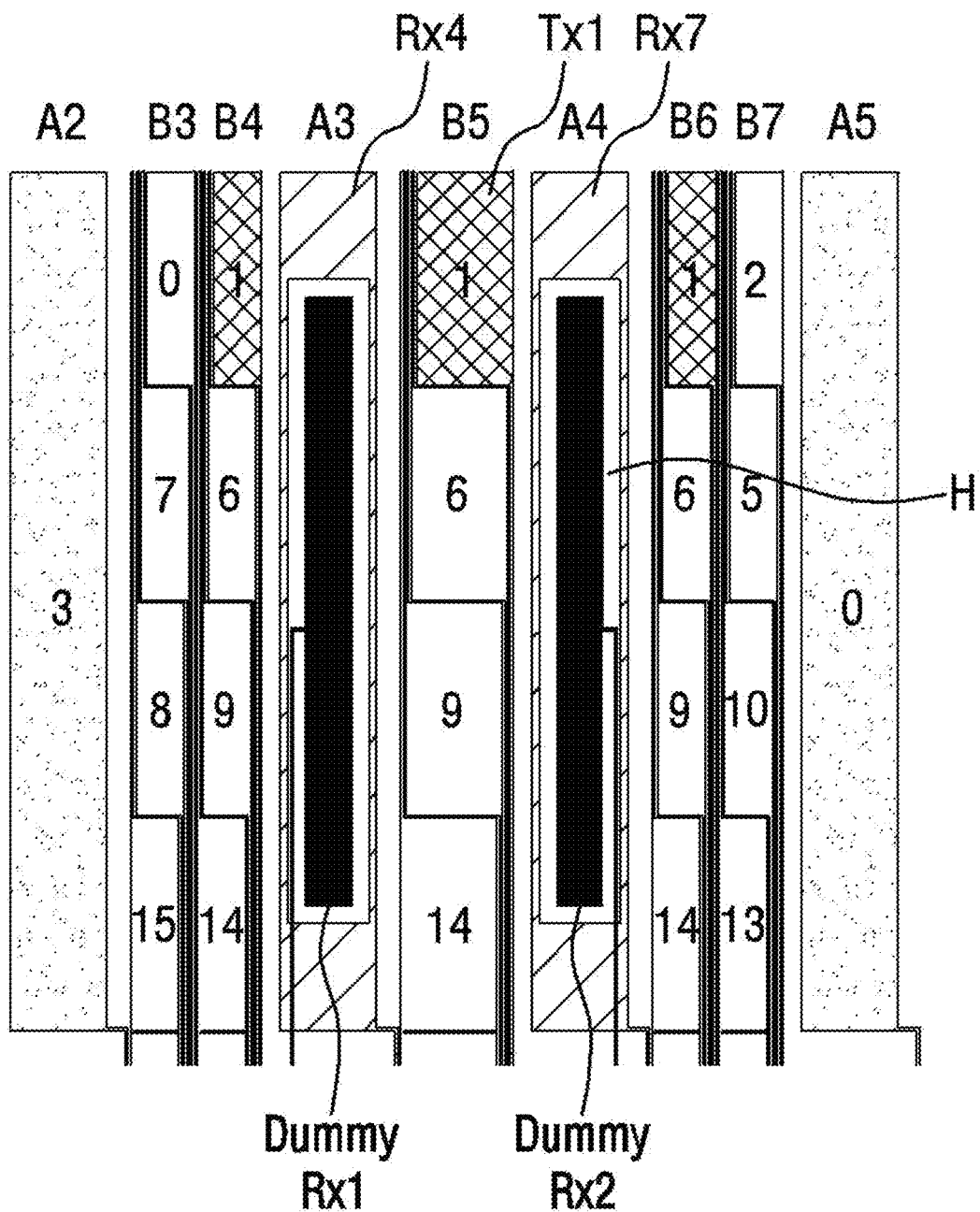

FIG. 53b (a part of FIG. 53a) illustrates that the principle described above in FIG. 53a may be applied in the same/similar manner, but physically separate receiving dummy electrodes are separately disposed. Here, physically disposing separate receiving dummy electrodes means additionally disposing in addition to the receiving electrodes of FIG. 53a. Therefore, even in the case of the receiving dummy electrodes, separate traces corresponding to the receiving electrodes are added thereto. Compared to FIG. 53a, the number of traces increases.

In particular, referring to FIG. 53b, when a driving signal is applied to the driving electrode Tx1, the receiving electrodes Rx4, Rx7 disposed adjacent to the driving electrode Tx1 form mutual capacitance Cm with the driving electrode Tx1, and the receiving dummy electrodes Dummy RX1, Dummy RX2 arranged to be spaced apart from the driving electrode Tx1 by a predetermined distance do not form mutual capacitance Cm with the driving electrode Tx1.

The sensing signal output from the predetermined receiving electrodes Rx4, Rx7 includes noise information as well as information on an amount of change in capacitance due to a touch of an object. Here, the noise information includes information on the amount of change in capacitance due to an LGM interference signal generated in a floating state. Accordingly, when the sensing signal output from the receiving electrodes Rx4, Rx7 is converted into a predetermined level value by the sensing unit 11 of the touch input device and output, the mutual capacitance change information and the noise information are reflected to the output level value.

On the other hand, in the sensing signal output from the receiving dummy electrodes Dummy RX1, Dummy RX2, there is little information on the amount of change in capacitance due to the touch of an object, and only the noise information is included.

Accordingly, by subtracting a signal value output from the receiving dummy electrodes from a signal value output from the predetermined receiving electrodes, only a pure mutual capacitance variation value can be obtained.

In the case of FIG. 53b, the receiving dummy electrodes Dummy RX1, Dummy RX2 may be disposed inside the receiving electrodes Rx4, Rx7. The receiving dummy electrodes Dummy RX1, Dummy RX2 may serve to reduce the base capacitance of the receiving electrodes Rx4, Rx7. The receiving dummy electrodes Dummy RX1, Dummy RX2 may be disposed to be spaced apart from the receiving electrodes Rx4, Rx7 by a predetermined distance by the hole H after forming the receiving electrodes Rx4, Rx7 with a metal mesh, and then cutting off or removing a part of the inner part of the receiving electrodes Rx4, Rx7.

In the case of FIG. 53a, the receiving dummy electrodes and the receiving electrodes are disposed at different positions, that is, configuring different touch coordinates, but in the case of FIG. 53b, the coordinate center points of the receiving dummy electrodes and the receiving electrodes are implemented to match. Thereby, compared to the arrangement form in FIG. 53a, it becomes possible to more effectively remove an LGM interference signal.

In addition, in the case of FIG. 53b, the sum of the areas of each of the plurality of receiving dummy electrodes Dummy RX1, Dummy RX2 may be implemented to be substantially equal to the sum of the areas of each of the plurality of receiving electrodes RX4, RX7. Since the amplitude of a detected signal is proportional to the area of an electrode, this is for the purposes that the amplitude of an LGM interference signal detected from the plurality of receiving dummy electrodes Dummy RX1, Dummy RX2 and the amplitude of the LGM interference detected from the plurality of receiving electrodes RX4, RX7 become as close to each other as possible, and thereby the LGM interference signal can be completely removed in the process of removing the LGM interference signal.

Figure 54:
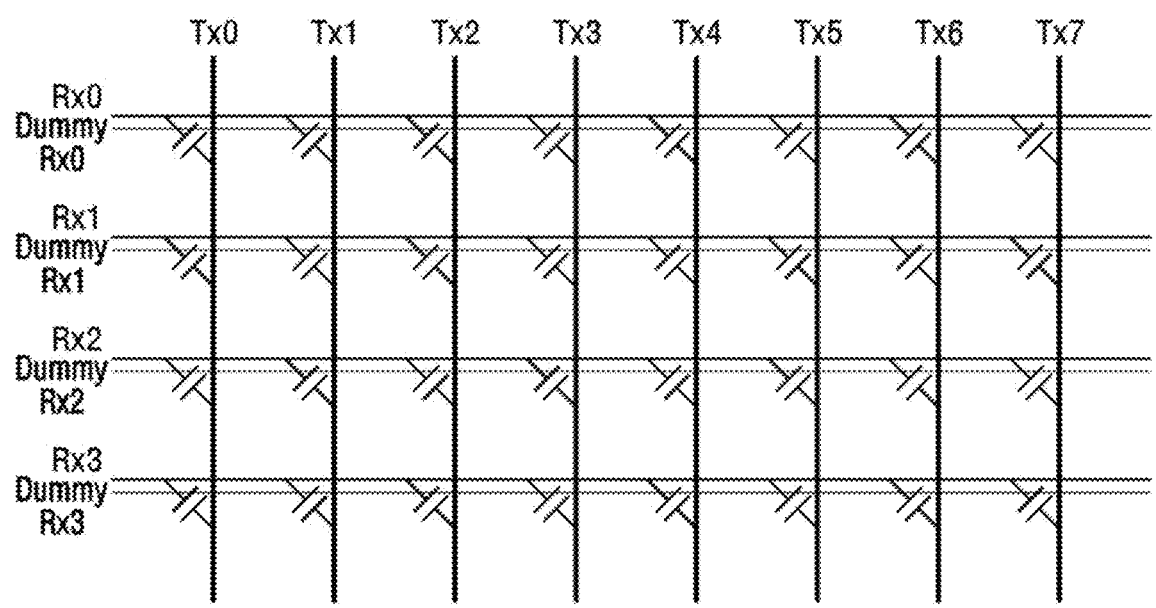

FIG. 54 is a conceptual diagram conceptualizing a touch sensor according to an embodiment of the present invention having a bridge structure.

Referring to FIG. 54, the touch sensor according to an embodiment of the present invention includes a plurality of driving electrodes TX0 to TX7 and a plurality of receiving electrodes RX0 to RX3. In addition, the touch sensor according to an embodiment of the present invention includes a plurality of receiving dummy electrodes Dummy RX0 to Dummy RX3.

Mutual capacitance Cm is formed between the plurality of driving electrodes TX0 to TX7 and the plurality of receiving electrodes RX0 to RX3, but mutual capacitance Cm is not formed between the plurality of driving electrodes TX0 to TX7 and the plurality of receiving dummy electrodes Dummy RX0 to Dummy RX3. Here, in reality, insignificant mutual capacitance may be formed between the plurality of driving electrodes TX0 to TX7 and the plurality of receiving dummy electrodes Dummy RX0 to Dummy RX3, but the insignificant mutual capacitance can be ignored when detecting whether a touch has occurred.

The touch input device according to an embodiment of the present invention having such a touch sensor may remove noise information, in particular, information on an amount of change in capacitance due to an LGM interference signal by subtracting a second sensing signal output from each receiving dummy electrode that do not form mutual capacitance Cm from a first sensing signal output from each receiving electrode of nodes forming mutual capacitance Cm. Here, the touch input device according to an embodiment of the present invention having a touch sensor may subtract a preset factor multiplied by a second sensing signal output from each receiving dummy electrode that do not form mutual capacitance Cm from a first sensing signal output from each receiving electrode of nodes forming mutual capacitance Cm.

Figure 55:
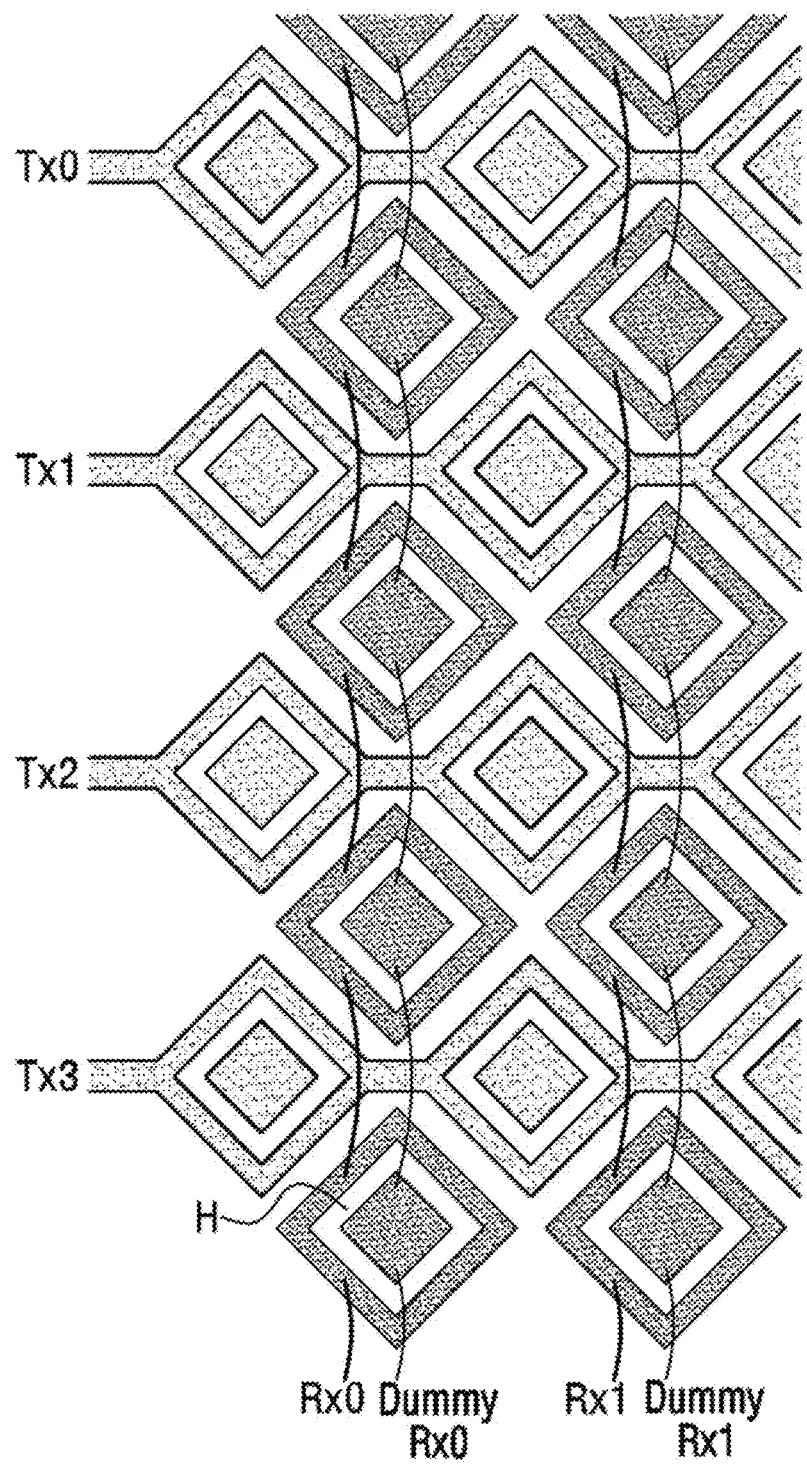

FIG. 55 is a configuration diagram of a touch sensor according to an example to which the conceptual diagram of the touch sensor shown in FIG. 54 may be applied.

Referring to FIG. 55, the plurality of driving electrodes Tx0, Tx1, Tx2, Tx3 are arranged in parallel in a horizontal direction, and the plurality of receiving electrodes Rx0, Rx1 are arranged in parallel in a vertical direction.

Each of the plurality of driving electrodes Tx0, Tx1, Tx2, Tx3 and the plurality of receiving electrodes Rx0, Rx1 has a diamond shape, and two adjacent driving electrodes and two adjacent receiving electrodes are electrically connected to each other through a conductive connecting unit.

The plurality of driving electrodes Tx0, Tx1, Tx2, Tx3 and the plurality of receiving electrodes Rx0, Rx1 may be implemented with a metal mesh. Here, a conductive connecting unit connecting the plurality of driving electrodes Tx0, Tx1, Tx2, Tx3 may also be implemented as a metal mesh. A conductive connecting unit connecting the plurality of driving electrodes Tx0, Tx1, Tx2, Tx3 may also be implemented as a metal mesh or as a conductive trace.

Each of the plurality of driving electrodes Tx0, Tx1, Tx2, Tx3 and the plurality of receiving electrodes Rx0, Rx1 has a predetermined electrically insulated pattern therein. The predetermined pattern may be formed to reduce the base capacitance of each receiving electrode and each driving electrode. After forming each driving electrode and each receiving electrode with a metal mesh, a predetermined pattern may be formed by cutting or removing the metal mesh of a portion of each driving electrode and each receiving electrode. In this case, a predetermined distance may be spaced apart by a hole H between each driving electrode and each receiving electrode and a predetermined pattern. The plurality of receiving dummy electrodes Dummy RX0, Dummy RX1 may be electrically connected to predetermined patterns inside the plurality of receiving electrodes Rx0, Rx1. Since the plurality of receiving electrodes Rx0, Rx1 are very adjacent to the plurality of driving electrodes Tx0, Tx1, Tx2, Tx3, a mutual capacitance Cm is formed, but since the plurality of receiving dummy electrodes Dummy RX0, Dummy RX1 are positioned relatively far from the plurality of driving electrodes Tx0, Tx1, Tx2, Tx3, the mutual capacitance Cm is formed to be negligible.

In particular, in the case of FIG. 55, the sum of the areas of each of the plurality of receiving dummy electrodes Dummy RX0, Dummy RX1 may be implemented to be substantially equal to the sum of the areas of each of the plurality of receiving electrodes RX0, RX1. Since the amplitude of a detected signal is proportional to the area of an electrode, this is for the purposes that the amplitude of an LGM interference signal detected from the plurality of receiving dummy electrodes Dummy RX0, Dummy RX1 and the amplitude of an LGM interference signal detected from the plurality of receiving electrodes RX0, RX1 become as close to each other as possible, and thereby the LGM interference signal can be completely removed in the process of removing the LGM interference signal.

In the case of FIG. 53*a*, the receiving dummy electrode and the receiving electrode have the same area, but are disposed at different positions, that is, constituting different touch coordinates, but in the case of FIG. 55, the receiving dummy electrode and the receiving electrode have the same area, however, it becomes possible to more effectively remove an LGM interference signal, compared to the arrangement form in FIG. 53, by implementing the coordinate center point of each electrode to match each other.

On the other hand, in the case of FIG. 55, in order to have almost no information on the amount of capacitance change due to the touch of an object in any of the receiving dummy electrodes (e.g., Dummy RX0, Dummy RX1), an arbitrary receiving electrode (e.g., RX0, RX1) disposed between an arbitrary driving electrode (e.g., TX3) and an arbitrary receiving dummy electrode (e.g., Dummy RX0, Dummy RX1) may be set as the ground (GND).

Figure 56:
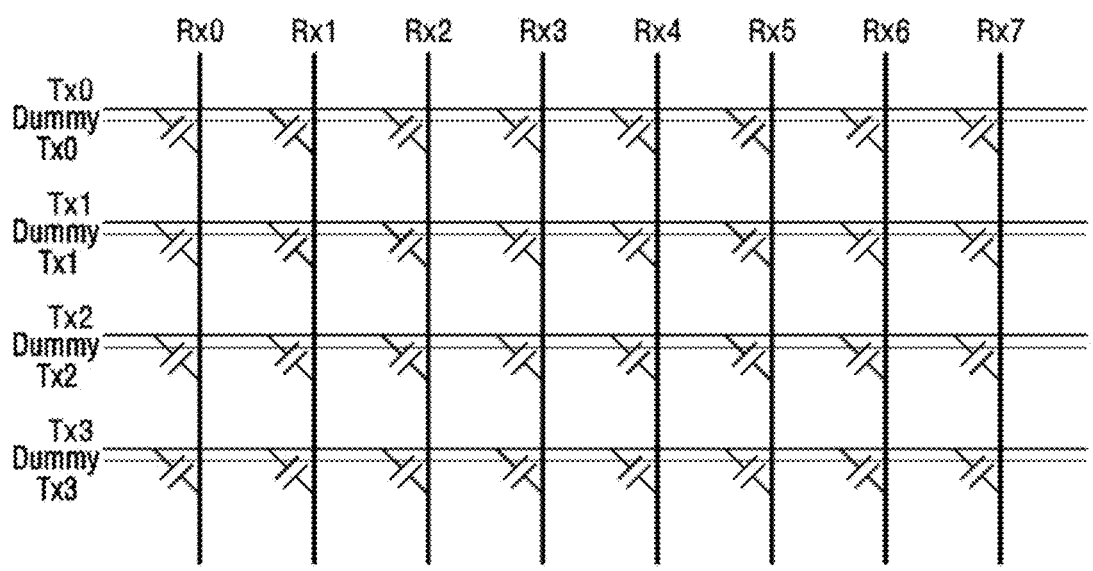

FIG. 56 is another conceptual diagram conceptualizing a touch sensor according to an embodiment of the present invention having a bridge structure. Referring to FIG. 56, the touch sensor according to an embodiment of the present invention includes a plurality of driving electrodes TX0 to TX3 and a plurality of receiving electrodes RX0 to RX7. In addition, the touch sensor according to an embodiment of the present invention includes a plurality of dummy driving electrodes Dummy Tx0 to Dummy Tx3.

A mutual capacitance Cm is formed between the plurality of driving electrodes TX0 to TX3 and the plurality of receiving electrodes RX0 to RX7, but no mutual capacitance Cm is formed between the plurality of dummy driving electrodes Dummy Tx0 to Dummy Tx3 and the plurality of receiving electrodes Rx0 to Rx7. Here, in reality, a slight mutual capacitance may be formed between the plurality of dummy driving electrodes Dummy Tx0 to Dummy Tx3 and the plurality of receiving electrodes Rx0 to Rx7, but the insignificant mutual capacitance can be ignored when detecting whether a touch has occurred.

The touch input device according to an embodiment of the present invention having such a touch sensor may remove noise information, in particular, information on an amount of change in capacitance due to an LGM interference signal by subtracting a sensing signal output from each receiving electrode that do not form mutual capacitance Cm from a sensing signal output from each receiving electrode of nodes forming mutual capacitance Cm. Here, the touch input device according to an embodiment of the present invention having a touch sensor may subtract a preset factor multiplied by a sensing signal output from each receiving electrode that do not form mutual capacitance Cm from a sensing signal output from each receiving electrode of nodes forming mutual capacitance Cm.

Figure 57:
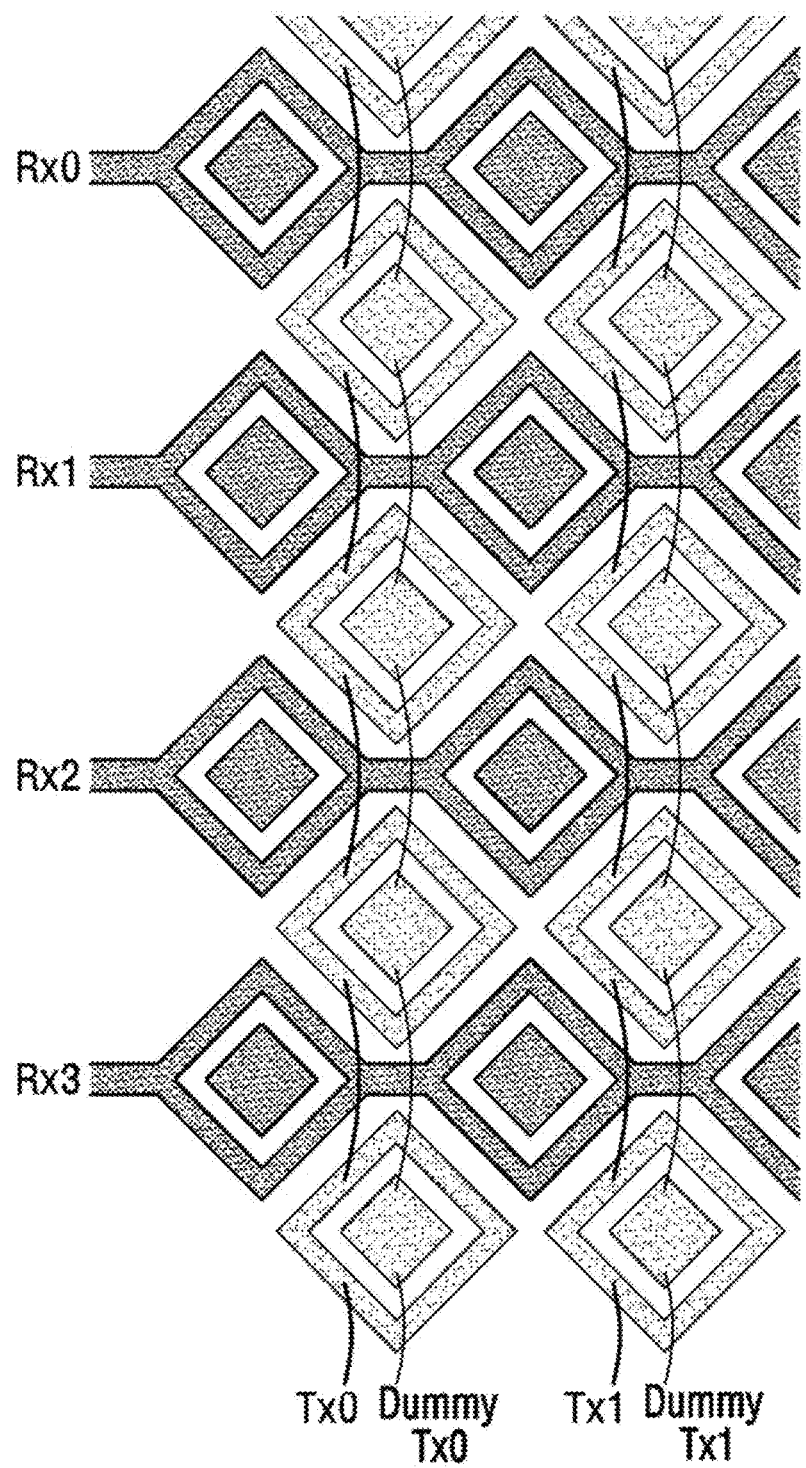

FIG. 57 is a configuration diagram of a touch sensor according to an example to which the conceptual diagram of the touch sensor shown in FIG. 56 may be applied.

Referring to FIG. 57, the plurality of receiving electrodes Rx0, Rx1, Rx2, Rx3 are arranged in parallel in a horizontal direction, and the plurality of driving electrodes Tx0, Tx1 are arranged in parallel in a vertical direction.

Each of the plurality of receiving electrodes Rx0, Rx1, Rx2, Rx3 and the plurality of driving electrodes Tx0, Tx1 has a diamond shape, and two adjacent driving electrodes and two adjacent receiving electrodes are electrically connected to each other through a conductive connecting unit.

The plurality of receiving electrodes Rx0, Rx1, Rx2, Rx3 and the plurality of driving electrodes Tx0, Tx1 may be implemented with a metal mesh. Here, a conductive connecting unit connecting the plurality of receiving electrodes Rx0, Rx1, Rx2, Rx3 may also be implemented as a metal mesh. A conductive connecting unit connecting the plurality of receiving electrodes Rx0, Rx1, Rx2, Rx3 may also be implemented as a metal mesh or as a conductive trace.

Each of the plurality of receiving electrodes Rx0, Rx1, Rx2, Rx3 and the plurality of driving electrodes Tx0, Tx1 has a predetermined pattern electrically insulated therein. The predetermined pattern may be formed to reduce the base capacitance of each receiving electrode and the driving electrode. After forming each driving electrode and each receiving electrode with a metal mesh, the metal mesh of a portion of the inside of each driving electrode Tx0, Tx1 and each receiving electrode Rx0, Rx1, Rx2, Rx3 is cut or removed so that a predetermined pattern is formed. In this case, a predetermined distance may be spaced apart by a hole H among each of the driving electrodes Tx0, Tx1, each of the receiving electrodes Rx0, Rx1, Rx2, Rx3 and a predetermined pattern.

The plurality of dummy driving electrodes Dummy Tx0, Dummy Tx1 may be electrically connected to predetermined patterns inside the plurality of driving electrodes Tx0, Tx1. Since the plurality of driving electrodes Tx0, Tx1 are very adjacent to the plurality of receiving electrodes Rx0, Rx1, Rx2, Rx3, a mutual capacitance Cm is formed, but the plurality of dummy driving electrodes Dummy Tx0, Dummy Tx1 is positioned relatively far from the plurality of receiving electrodes Rx0, Rx0, Rx2, Rx3, and thereby the mutual capacitance Cm is formed to be negligibly small.

In particular, in the case of FIG. 57, the sum of the areas of each of the plurality of dummy driving electrodes Dummy Tx0, Dummy Tx1 may be implemented to be substantially equal to the sum of the areas of each of the plurality of driving electrodes Tx0, Tx1. Since the amplitude of a detected signal is proportional to the area of an electrode, this is for the purposes that the amplitude of an LGM interference signal detected from the plurality of dummy driving electrodes Dummy Tx0, Dummy Tx1 and the amplitude of an LGM interference detected from the plurality of driving electrodes Tx0, Tx1 become as close to each other as possible, and thereby the LGM interference signal can be completely removed in the process of removing the LGM interference signal.

In addition, in the case of FIG. 57, an LGM interference signal can be more effectively removed by implementing the plurality of dummy driving electrodes and the plurality of driving electrodes to have the same area and the same coordinate center point of each electrode.

On the other hand, in the case of FIG. 57, in order to have almost no information on the amount of capacitance change due to the touch of an object in any of the dummy driving electrodes (e.g., Dummy TX0, Dummy TX1), an arbitrary dummy driving electrode (e.g., Dummy TX0, Dummy TX1) disposed between an arbitrary receiving electrode (e.g., RX3) and an arbitrary driving electrode (e.g., TX0, TX1) may be set as the ground (GND).

Figure 58:
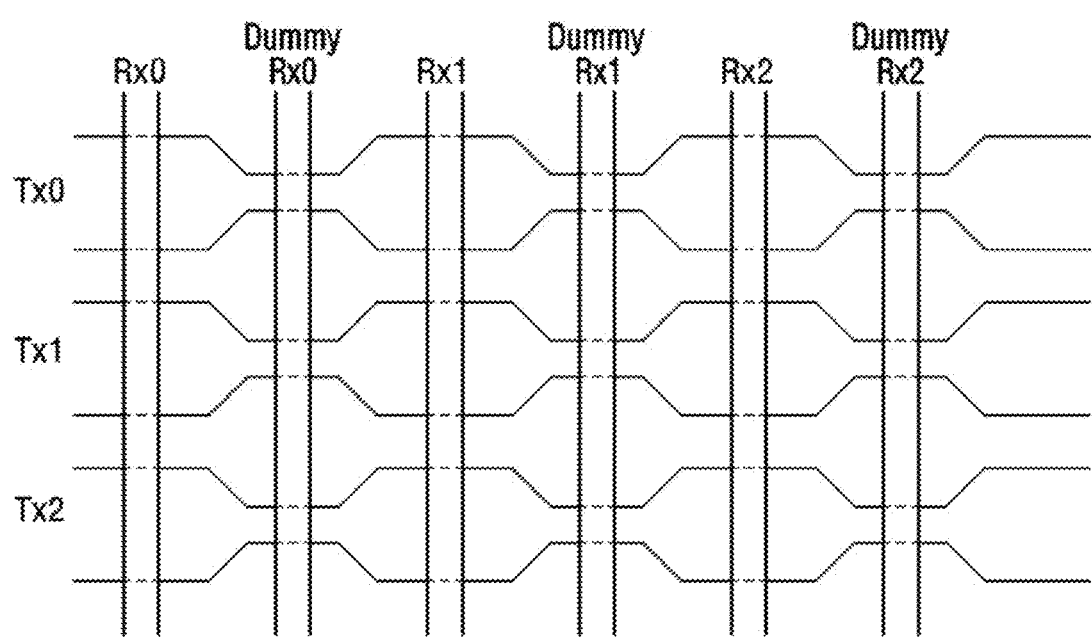

FIG. 58 is a configuration diagram of a touch sensor according to another example to which the conceptual diagram of the touch sensor shown in FIG. 54 may be applied.

Referring to FIG. 58, the plurality of receiving electrodes Rx0, Rx1, Rx2 are arranged in parallel in a horizontal direction, and the plurality of driving electrodes Tx0, Tx1, TX2 are arranged in parallel in a vertical direction. Here, the horizontal and vertical directions may be changed.

Each of the plurality of receiving electrodes Rx0, Rx1, Rx2 and the plurality of driving electrodes Tx0, Tx1, Tx2 has a bar shape.

The plurality of receiving electrodes Rx0, Rx1, Rx2 are formed on the first layer, and the plurality of driving electrodes Tx0, Tx1, Tx2 are formed on the second layer. The first layer and the second layer are not disposed on the same plane. For example, a first layer may be disposed on a second layer. An insulating layer may be disposed between the first layer and the second layer.

The plurality of receiving electrodes Rx0, Rx1, Rx2 and the plurality of driving electrodes Tx0, Tx1, Tx2 may be implemented with a metal mesh or a conductive metal.

The touch sensor illustrated in FIG. 58 includes a plurality of receiving dummy electrodes Dummy RX0, Dummy RX1, Dummy RX2. The plurality of receiving dummy electrodes Dummy RX0, Dummy RX1, Dummy RX2 are formed together on the layer on which the plurality of receiving electrodes Rx0, Rx1, Rx2 are formed, respectively, and the receiving dummy electrodes Dummy RX0, Dummy RX1, Dummy RX2 may be disposed among the plurality of receiving electrodes Rx0, Rx1, Rx2.

Each driving electrode Tx0, Tx1, Tx2 includes a first region overlapping each receiving electrode Rx0, Rx1, Rx2 and a second region overlapping each receiving dummy electrode Dummy RX0, Dummy RX1, Dummy RX2. Here, the size of the first region is larger than the size of the second region. In particular, the size of the second region is preferably formed as small as possible. This is to minimize the mutual capacitance between the receiving dummy electrode and the driving electrode. Alternatively, under the condition that the receiving electrode and the receiving dummy electrode have the same shape, the width of the first region overlapping the receiving electrode in each driving electrode may be designed to be wider than the width of the second region overlapping the receiving dummy electrode.

Since the plurality of driving electrodes Tx0, Tx1, Tx2 have relatively many regions overlapping the plurality of receiving electrodes Rx0, Rx1, Rx2, a relatively large mutual capacitance Cm is formed, but since the plurality of receiving dummy electrodes Dummy RX0, Dummy RX1, Dummy RX2 overlap the plurality of driving electrodes Tx0, Tx1, Tx2 relatively small, the mutual capacitance Cm between the two is formed to be negligible.

In particular, in the case of FIG. 58, the sum of the areas of each of the plurality of receiving dummy electrodes Dummy RX0, Dummy RX1, Dummy RX2 can be implemented to be approximately the same as the sum of the areas of each of the plurality of receiving electrodes RX0, RX1, RX2. This is because the amplitude of a detected signal is proportional to the area of an electrode, this is for the purposes that the amplitude of an LGM interference signal detected from the plurality of receiving dummy electrodes Dummy RX0, Dummy RX1, Dummy RX2 and the amplitude of an LGM interference signal detected from the plurality of receiving electrodes RX0, RX1, RX2 become as close to each other as possible, and thereby the LGM interference signal can be completely removed in the process of removing the LGM interference signal.

On the other hand, in the case of FIG. 58, in order to ensure that there is little information on the amount of capacitance change due to the touch of an object in any of the receiving dummy electrodes (e.g., Dummy RX0, Dummy RX1, Dummy RX2), an arbitrary receiving electrode (e.g., RX0, RX1, RX2) disposed between an arbitrary driving electrode (e.g., TX0) and an arbitrary receiving dummy electrode (e.g., Dummy RX0, Dummy RX1, Dummy RX2) may be set as the ground (GND).

Figure 59:
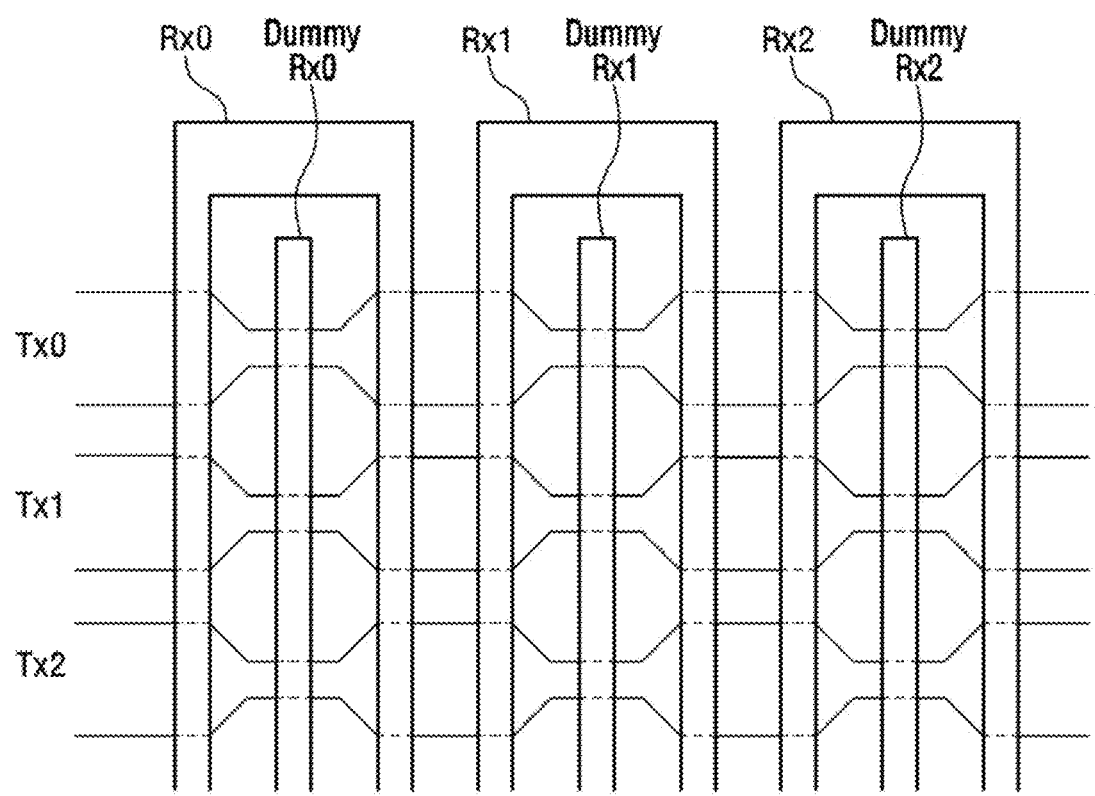

FIG. 59 is an embodiment in which the principle described in FIG. 58 may be applied in the same/similar manner, but the receiving dummy electrode is disposed inside the receiving electrode.

In the case of FIG. 59, the receiving dummy electrodes Dummy RX0, Dummy RX1, Dummy RX2 may be disposed inside the receiving electrodes RX0, RX1, RX2. The receiving dummy electrodes Dummy RX0, Dummy RX1, Dummy RX2 may serve to reduce the base capacitance of the receiving electrodes RX0, RX1, RX2. The receiving dummy electrodes Dummy RX0, Dummy RX1, Dummy RX2 may be disposed to be spaced apart from the receiving electrodes RX0, RX1, RX2 by a predetermined distance by forming the receiving electrodes RX0, RX1, RX2 with a metal mesh, and then cutting off or removing a part of the inside of the receiving electrodes RX0, RX1, RX2.

In the case of FIG. 59, each of the driving electrodes Tx0, Tx1, Tx2 includes a first region overlapping with each of the receiving electrodes Rx0, Rx1, Rx2 and a second region overlapping with each of the receiving dummy electrodes Dummy RX0, Dummy RX1, Dummy RX2. Here, the size of the first region is larger than the size of the second region. In particular, the size of the second region is preferably formed as small as possible. This is to minimize the mutual capacitance between the receiving dummy electrode and the driving electrode. Alternatively, under the condition that the receiving electrode and the receiving dummy electrode have the same shape, the width of the first region overlapping the receiving electrode in each driving electrode may be designed to be wider than the width of the second region overlapping the receiving dummy electrode.

Since the plurality of driving electrodes Tx0, Tx1, Tx2 have relatively many regions overlapping the plurality of receiving electrodes Rx0, Rx1, Rx2, a relatively large mutual capacitance Cm is formed, but since the plurality of receiving dummy electrodes Dummy RX0, Dummy RX1, Dummy RX2 overlap the plurality of driving electrodes Tx0, Tx1, Tx2 relatively small, the mutual capacitance Cm between the two is formed to be negligible.

Figure 60:
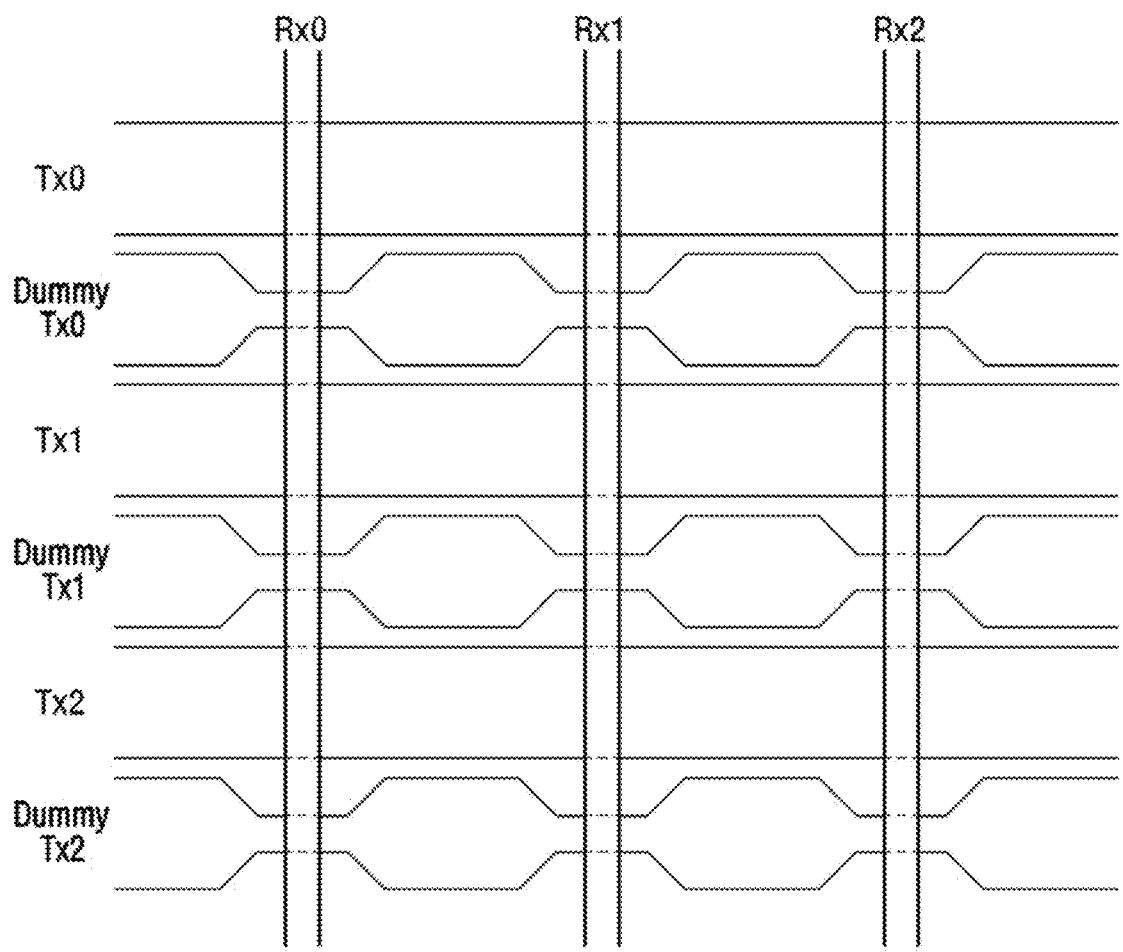

FIG. 60 is a configuration diagram of a touch sensor according to another example to which the conceptual diagram of the touch sensor shown in FIG. 56 may be applied.

Referring to FIG. 60, the plurality of receiving electrodes Rx0, Rx1, Rx2 are arranged in parallel in a vertical direction, and the plurality of driving electrodes Tx0, Tx1, TX2 are arranged in parallel in a horizontal direction. Here, the horizontal and vertical directions may be changed.

Each of the plurality of receiving electrodes Rx0, Rx1, Rx2 and the plurality of driving electrodes Tx0, Tx1, Tx2 has a bar shape.

The plurality of receiving electrodes Rx0, Rx1, Rx2 are formed on the first layer, and the plurality of driving electrodes Tx0, Tx1, Tx2 are formed on the second layer. The first layer and the second layer are not disposed on the same plane. For example, a first layer may be disposed on a second layer. An insulating layer may be disposed between the first layer and the second layer.

The plurality of receiving electrodes Rx0, Rx1, Rx2 and the plurality of driving electrodes Tx0, Tx1, Tx2 may be implemented with a metal mesh or a conductive metal.

The touch sensor illustrated in FIG. 60 includes a plurality of dummy driving electrodes Dummy TX0, Dummy TX1, Dummy TX2. The plurality of dummy driving electrodes Dummy TX0, Dummy TX1, Dummy TX2 are formed together on the layer where the plurality of driving electrodes Tx0, Tx1, Tx2 are formed, and each of the dummy driving electrodes Dummy TX0, Dummy TX1, Dummy TX2 may be disposed among the plurality of driving electrodes Tx0, Tx1, Tx2.

Each receiving electrode Rx0, Rx1, Rx2 includes a first region overlapping each driving electrode Tx0, Tx1, Tx2 and a second region overlapping each dummy driving electrode Dummy TX0, Dummy TX1, Dummy TX2. Here, the area of the first region is formed to be larger than the area of the second region. In particular, it is preferable that the area of the second region is formed as small as possible. This is to reduce the mutual capacitance between the dummy driving electrode and the receiving electrode as much as possible. Alternatively, under the condition that the receiving electrodes have the same shape, the width of the first region overlapping the driving electrode and the receiving electrode may be designed to be larger than the width of the second region overlapping the dummy driving electrode and the receiving electrode.

Since each driving electrode Tx0, Tx1, Tx2 has a relatively large area overlapping with each receiving electrode Rx0, Rx1, Rx2, a relatively large mutual capacitance Cm is formed, but since each dummy driving electrode Dummy TX0, Dummy TX1, Dummy TX2 overlaps each receiving electrode Rx0, Rx1, Rx2 relatively small, the mutual capacitance Cm between the two is formed to be negligibly small.

When the touch sensor 10 described above in FIGS. 51 to 60 is applied to the present invention, it is possible to obtain a digital value composed only of a pure mutual capacitance change value as shown in FIGS. 36b and 4b.

Figure 61:
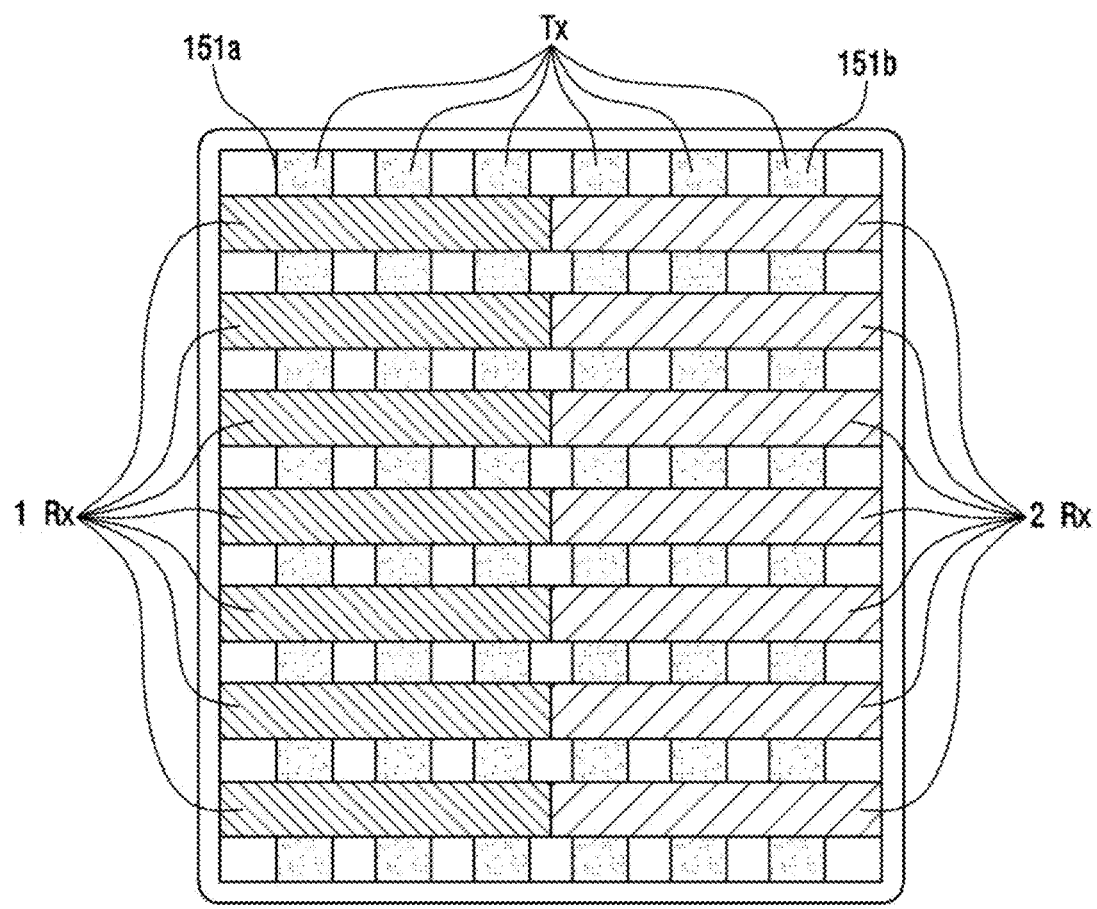

FIG. 61 illustrates a form of a touch sensor for removing an LGM interference signal according to another embodiment of the present invention.

Even in the case of the touch sensor of FIG. 61, the floating occurrence situation described above with reference to FIGS. 35 to 38 and the structure of the touch input device 1 of FIG. 39a may be applied in the same/similar manner.

Referring again to FIGS. 49 to 50, when taking a look at the electrode arrangement form of the touch sensor of FIG. 49a, a plurality of same receiving electrodes RX1 are disposed in the touch window region S, and the amount of an LGM interference signal is relatively increased. That is, as shown in FIG. 50b(a), when the number of same receiving electrodes RX1 disposed in the touch area is large, or as shown in FIG. 50b(b), the number of same driving electrodes TX1 disposed in the touch area is large, it can be seen that an LGM interference signal is relatively increased. Accordingly, reducing the number of the same receiving electrodes RX1 disposed in the touch area as shown in FIG. 50c(a), or reducing the number of the same driving electrodes TX1 disposed in the touch area as shown in FIG. 50c(b) is preferable. For example, as shown in FIG. 50d, all the receiving electrodes included in the touch window region S are separated from each other and connected to different channels, and thereby that the above-described LGM interference signal can be reduced and the touch sensitivity can be improved.

In the case of FIG. 61, to which this principle is applied, the touch sensor 10 may include a plurality of driving electrodes, and a plurality of first receiving electrodes and a plurality of second receiving electrodes formed in layers different from the plurality of driving electrodes.

The plurality of first receiving electrodes and the plurality of second receiving electrodes may be formed on the same layer.

The plurality of first receiving electrodes may be formed in the first display area 151a, and the plurality of second receiving electrodes may be formed in the second display area 151b.

Each of the plurality of first receiving electrodes and each of the plurality of second receiving electrodes may have the same area as each other.

The areas of the plurality of first receiving electrodes and the plurality of second receiving electrodes may be implemented to be smaller than the areas of the plurality of driving electrodes.

Figure 62:
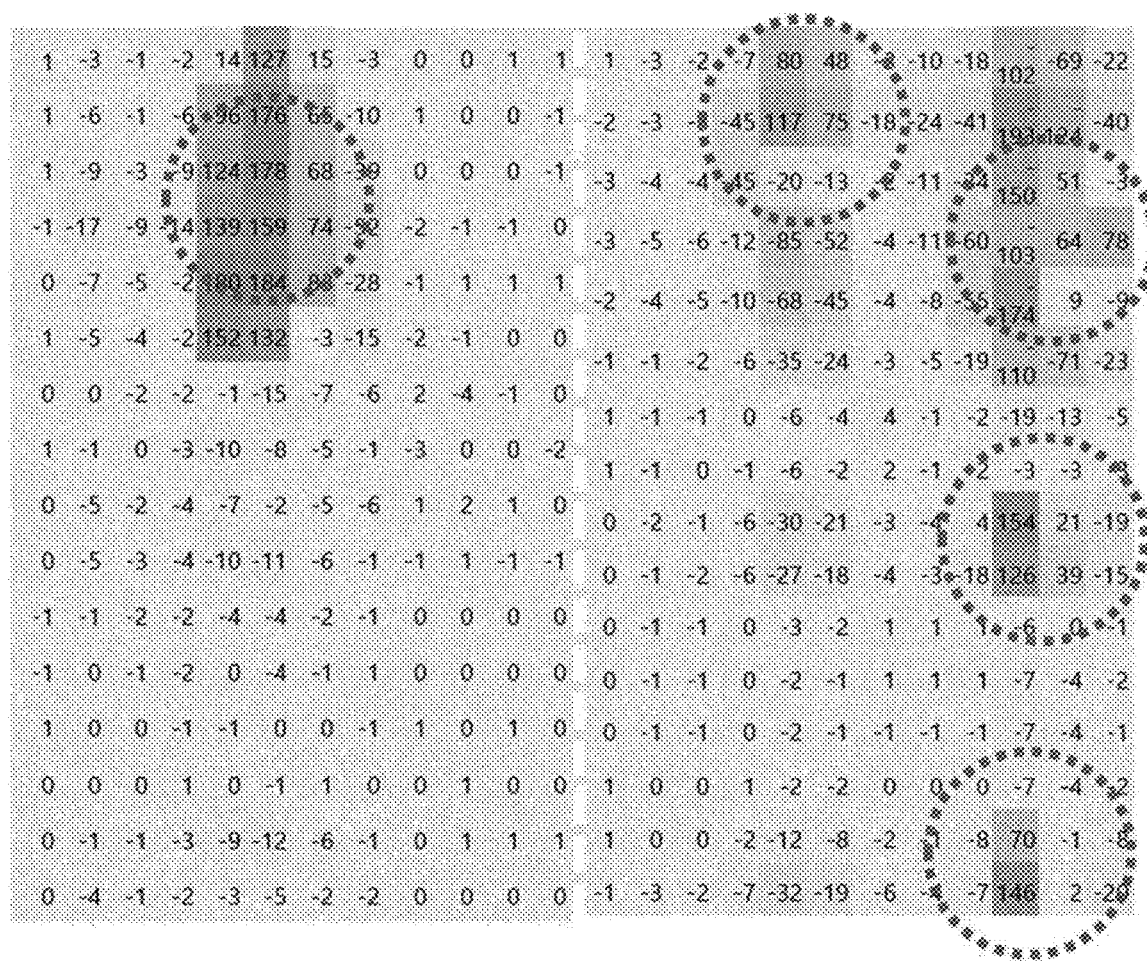

As a result, each of the plurality of first receiving electrodes and the plurality of second receiving electrodes is connected through different channels, and thereby the number of receiving electrodes increases, the number of channels increases, and a LGM interference signal is reduced. FIG. 62 is a digital value obtained when a plurality of touch inputs are applied to the touch sensor 10 of FIG. 61, and it can be seen that the digital value is improved compared to FIG. 36a.

However, in FIG. 61, a plurality of first receiving electrodes and a plurality of second receiving electrodes are used, and according to another embodiment, even when a plurality of first driving electrodes and a plurality of second driving electrodes are used, the above-described principle can be applied thereto in the same/similar manner.

That is, even when a plurality of first driving electrodes are formed in the first display area 151a and a plurality of second driving electrodes are formed in the second display area 151b, the above-described principle may be applied in the same/similar manner.

Features, structures, effects, etc. described in the above embodiments are included in one embodiment of the present invention, and are not necessarily limited to one embodiment. Furthermore, features, structures, effects, etc. illustrated in each embodiment can be combined or modified for other embodiments by those of ordinary skill in the art to which the embodiments belong. Accordingly, the contents related to such combinations and modifications should be interpreted as being included in the scope of the present invention.

In addition, although the embodiments have been described above, they are merely examples and do not limit the present invention. Those of ordinary skill in the art to which the present invention pertains will appreciate that various modifications and applications not exemplified above are possible without departing from the essential characteristics of the present embodiment. For example, each component specifically shown in the embodiments can be implemented by modification, and differences related to such modifications and applications should be construed as being included in the scope of the present invention defined in the appended claims.

The invention claimed is:

1. A touch input device, the touch input device includes a foldable display, comprising:
 a touch sensor including a plurality of receiving electrodes, a plurality of driving electrodes forming mutual capacitance with the plurality of receiving electrodes, and a plurality of driving dummy electrodes not forming mutual capacitance with the plurality of receiving electrodes; and
 a touch detector including a plurality of receivers composed of a plurality of terminals in connection with the plurality of receiving electrodes to receive a plurality of first sensing signals, and a plurality of second sensing signals,
 wherein the foldable display comprises a first display area and a second display area folded out around a hinge part,
 wherein the plurality of driving electrodes extend across the first display area and the second display area,
 wherein, when at least one first touch by a first object in a floating state is input to the first display area and at least one second touch by a second object in a floating state is input to the second display area while the first display area and the second display area are folded out, the touch detector detects touch input of the at least one first touch based on a signal in which at least one first sensing signal from at least one terminal of at least one receiver by the at least one first touch is subtracted from at least one second sensing signal from the at least one terminal by the at least one first touch,
 wherein the at least one first sensing signal comprises information on the amount of mutual capacitance change formed between at least one receiving electrode and at least one driving electrode and a first noise information between the at least one receiving electrode and the at least one driving electrode,
 wherein the first noise information comprises information on the amount of change in negative capacitance caused by a first LGM interference signal generated by coupling between the first object and the at least one driving electrode,
 wherein the at least one second sensing signal comprises a second noise information between the at least one receiving electrode and at least one driving dummy electrode,
 wherein the second noise information comprises information on the amount of change in negative capacitance caused by a second LGM interference signal generated by coupling between the first object and the at least one driving dummy electrode, and
 wherein a sign of each of the first LGM interference signal and the second LGM interference signal is opposite to a sign of a signal generated when at least one first touch by a first object in a floating state is input to the first display area.

2. The touch input device of claim 1,
wherein the plurality of driving dummy electrodes extend across the first display area and the second display area, and
wherein at least one of the plurality of driving electrodes and at least one of the plurality of driving dummy electrodes are alternately disposed with each other.

3. The touch input device of claim 2, further comprising:
a first body supporting the first display area;
a second body supporting the second display area; and
a hinge connecting the first body and the second body such that an angle between the first body and the second body is variable,
wherein the touch detector detects at least one of the touch inputs of the at least one first touch when the touch input device is in an out-folded state.

4. The touch input device of claim 3,
wherein the at least one first touch corresponds to a single first touch to the first display area,
wherein the touch input of the at least one first touch corresponds to a single touch input to the first display area, and
wherein the at least one second touch corresponds to a plurality of second touchs to the second display area.

5. The touch input device of claim 3,
wherein the at least one first touch corresponds to a plurality of first touch to the first display area, and
wherein the touch inputs of the at least one first touch correspond to a plurality of touch inputs to the first display area.

* * * * *